United States Patent
Olsson et al.

(10) Patent No.: US 10,788,901 B2
(45) Date of Patent: Sep. 29, 2020

(54) USER INTERFACE DEVICES, APPARATUS, AND METHODS

(71) Applicant: SeeScan, Inc., San Diego, CA (US)

(72) Inventors: Mark S. Olsson, La Jolla, CA (US); Michael J. Martin, San Diego, CA (US); Ray Merewether, La Jolla, CA (US); Loni M. Heyenbruch, Escondido, CA (US); Austin Rutledge, San Diego, CA (US); Alexander L. Warren, Escondido, CA (US); Amos H. Jessup, Hillsborough, NC (US); George L. Jemmott, San Marcos, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

(21) Appl. No.: 15/499,811

(22) Filed: Apr. 27, 2017

(65) Prior Publication Data
US 2018/0246584 A1 Aug. 30, 2018

Related U.S. Application Data

(63) Continuation of application No. 13/110,910, filed on May 18, 2011, now abandoned.
(Continued)

(51) Int. Cl.
*G09G 5/00* (2006.01)
*G06F 3/0346* (2013.01)
*G06F 3/0338* (2013.01)

(52) U.S. Cl.
CPC .......... *G06F 3/0346* (2013.01); *G06F 3/0338* (2013.01)

(58) Field of Classification Search
CPC .... G06F 3/0346; G06F 3/0338; G06F 3/0205; G06F 3/0213; G06F 3/02
See application file for complete search history.

(56) References Cited

U.S. PATENT DOCUMENTS

| | | | |
|---|---|---|---|
| 3,112,464 A | 11/1963 | Ratajaski | |
| 3,170,323 A | 2/1965 | Friedrich | |

(Continued)

FOREIGN PATENT DOCUMENTS

| | | |
|---|---|---|
| DE | 19501439 | 9/1996 |
| DE | 19806611 | 8/1999 |

(Continued)

OTHER PUBLICATIONS

International Searching Authority, "Written Opinion of the International Searching Authority" for PCT Patent Application No. PCT/IB10/01039, dated Oct. 15, 2011, European Patent Office, Munich.

(Continued)

*Primary Examiner* — Adam R. Giesy
(74) *Attorney, Agent, or Firm* — Steven C. Tietsworth, Esq.; Michael J. Pennington, Esq.

(57) ABSTRACT

User interface devices using magnetic sensing to provide output signals associated with motion and/or deformation of an actuator element of the interface devices are described. The output signals may be provided to an electronic computing system to provide commands, controls, and/or other data or information. In one embodiment, a user interface device may include a plurality of permanent magnets and a plurality of multi-axis magnetic sensors to generate motion and/or deformation signals to be provided to a processing element to generate the output signals.

20 Claims, 68 Drawing Sheets

Related U.S. Application Data

(60) Provisional application No. 61/345,956, filed on May 18, 2010, provisional application No. 61/363,173, filed on Jul. 9, 2010, provisional application No. 61/372,025, filed on Aug. 9, 2010, provisional application No. 61/375,679, filed on Aug. 20, 2010, provisional application No. 61/392,302, filed on Oct. 12, 2010, provisional application No. 61/411,406, filed on Nov. 8, 2010, provisional application No. 61/419,150, filed on Dec. 2, 2010, provisional application No. 61/424,496, filed on Dec. 17, 2010.

(56) References Cited

U.S. PATENT DOCUMENTS

| | | |
|---|---|---|
| 3,331,971 A | 7/1967 | Moller |
| 3,764,779 A | 10/1973 | Kadoya |
| 3,980,808 A | 9/1976 | Kikuchi |
| 4,107,604 A | 8/1978 | Bernier |
| 4,161,726 A | 7/1979 | Burson |
| 4,216,467 A | 8/1980 | Colston |
| 4,293,837 A | 10/1981 | Jaffe |
| 4,348,142 A | 9/1982 | Figour |
| 4,459,578 A | 7/1984 | Sava |
| 4,489,303 A | 12/1984 | Martin |
| 4,490,710 A | 12/1984 | Kopsho et al. |
| 4,500,867 A | 2/1985 | Ishitobo |
| 4,584,510 A * | 4/1986 | Hollow .............. B64C 13/0421 318/584 |
| 4,651,558 A | 3/1987 | Martin |
| 4,733,214 A | 3/1988 | Andresen |
| 4,774,458 A | 9/1988 | Aronoff |
| 4,785,180 A | 11/1988 | Dietrich |
| 4,825,157 A | 4/1989 | Milkan |
| 4,853,630 A | 8/1989 | Houston |
| 4,879,556 A | 11/1989 | Duimel |
| 4,998,182 A | 3/1991 | Krauter |
| 5,045,842 A | 9/1991 | Galvin |
| 5,146,566 A | 9/1992 | Hollis, Jr. |
| 5,160,918 A | 11/1992 | Saposnik |
| 5,168,221 A | 12/1992 | Houston |
| 5,450,054 A | 9/1995 | Schmersal |
| 5,504,502 A | 4/1996 | Arita |
| 5,525,901 A | 6/1996 | Clymer |
| 5,565,891 A | 10/1996 | Armstrong |
| 5,598,090 A | 1/1997 | Baker |
| 5,619,195 A | 4/1997 | Allen |
| 5,670,987 A | 9/1997 | Doi |
| 5,687,080 A | 11/1997 | Hoyt |
| 5,706,027 A | 1/1998 | Hilton |
| 5,749,577 A | 5/1998 | Couch |
| 5,767,840 A | 6/1998 | Selker |
| 5,831,554 A | 11/1998 | Hedayat |
| 5,831,596 A | 11/1998 | Marshall |
| 5,850,142 A | 12/1998 | Rountos |
| 5,939,679 A | 8/1999 | Olsson |
| 5,959,863 A | 9/1999 | Hoyt |
| 5,969,520 A | 10/1999 | Schottler |
| 6,002,184 A | 12/1999 | Delson |
| D421,433 S | 3/2000 | Alviar et al. |
| D422,996 S | 4/2000 | Alviar et al. |
| 6,129,527 A | 10/2000 | Donahoe |
| 6,144,125 A | 11/2000 | Birkestrand |
| 6,184,868 B1 * | 2/2001 | Shahoian ................ A63F 13/06 345/161 |
| 6,225,980 B1 | 5/2001 | Weiss |
| 6,329,812 B1 | 12/2001 | Sundin |
| 6,333,734 B1 | 12/2001 | Rein |
| 6,353,430 B2 | 3/2002 | Cheng et al. |
| 6,462,731 B1 | 10/2002 | Stoffers |
| 6,501,458 B2 | 12/2002 | Baker |
| 6,550,346 B2 | 4/2003 | Gombert |
| 6,573,709 B1 | 6/2003 | Gandel |
| 6,593,729 B2 | 7/2003 | Sundin |
| 6,597,347 B1 | 7/2003 | Yasutake |
| 6,614,420 B1 | 9/2003 | Han et al. |
| 6,664,946 B1 | 12/2003 | Stipes et al. |
| 6,707,446 B2 | 3/2004 | Nakamura |
| 6,727,889 B2 | 4/2004 | Shaw |
| 6,738,043 B2 | 5/2004 | Endo |
| 6,753,519 B2 | 6/2004 | Gombert |
| 6,762,748 B2 | 7/2004 | Maatta |
| 6,804,012 B2 | 10/2004 | Gombert |
| 6,822,635 B2 | 11/2004 | Shahoian |
| 6,831,679 B1 | 12/2004 | Olsson |
| 6,879,316 B2 | 4/2005 | Kehlstadt |
| 6,891,526 B2 | 5/2005 | Gombert |
| 6,925,975 B2 | 8/2005 | Ozawa |
| 6,928,886 B2 | 8/2005 | Muesel |
| 7,084,856 B2 | 8/2006 | Huppi |
| 7,145,551 B1 | 12/2006 | Bathiche et al. |
| 7,148,880 B2 | 12/2006 | Magara |
| 7,151,526 B2 | 12/2006 | Endo |
| 7,164,412 B2 | 1/2007 | Kao |
| 7,233,318 B1 | 6/2007 | Farag |
| 7,474,296 B2 | 1/2009 | Obermeyer |
| 7,552,541 B2 | 6/2009 | Sakuri |
| 7,733,327 B2 | 6/2010 | Harley |
| 7,737,945 B2 | 6/2010 | West |
| 7,753,788 B2 | 7/2010 | Lum et al. |
| 7,800,581 B2 | 9/2010 | Lye |
| 7,825,903 B2 | 11/2010 | Anastas |
| 7,958,782 B2 | 6/2011 | Le |
| 7,978,175 B2 | 7/2011 | Orsley |
| 8,089,039 B2 | 1/2012 | Pascucci |
| 8,100,030 B2 | 1/2012 | Koschke |
| 8,139,033 B2 | 3/2012 | Yamamoto |
| 8,274,358 B2 | 9/2012 | Ando |
| 8,289,385 B2 | 10/2012 | Olsson |
| 8,497,767 B2 | 7/2013 | Hollis, Jr. |
| 9,134,817 B2 | 9/2015 | Olsson |
| 2002/0033795 A1 | 3/2002 | Shahoian |
| 2002/0033798 A1 | 3/2002 | Nakamura et al. |
| 2003/0107551 A1 | 6/2003 | Dunker |
| 2003/0126980 A1 | 7/2003 | Barden |
| 2006/0106454 A1 | 5/2006 | Osborne et al. |
| 2006/0256075 A1 | 11/2006 | Anastas |
| 2006/0290670 A1 | 12/2006 | Ishimaru |
| 2007/0182842 A1 | 8/2007 | Sonnenschein |
| 2007/0216650 A1 | 9/2007 | Frohlich |
| 2007/0262959 A1 | 11/2007 | Gu |
| 2008/0001919 A1 | 1/2008 | Pascucci |
| 2008/0174550 A1 | 7/2008 | Laurila |
| 2008/0290821 A1 | 11/2008 | Brandt |
| 2009/0025094 A1 | 1/2009 | York |
| 2009/0058802 A1 | 3/2009 | Orsley |
| 2009/0071808 A1 | 3/2009 | Kang |
| 2009/0115749 A1 | 5/2009 | Kim |
| 2010/0265176 A1 | 10/2010 | Olsson |
| 2011/0050405 A1 | 3/2011 | Hollis, Jr. |
| 2011/0102382 A1 | 5/2011 | Shimizu |
| 2011/0234218 A1 * | 9/2011 | Lagouge .............. G01R 33/072 324/247 |
| 2012/0215475 A1 | 8/2012 | Rutledge |
| 2012/0256821 A1 | 10/2012 | Olsson |
| 2012/0274563 A1 | 11/2012 | Olsson |

FOREIGN PATENT DOCUMENTS

| | | |
|---|---|---|
| DE | 19954497 | 4/2001 |
| EP | 0628976 | 12/1994 |
| EP | 0982646 | 3/2000 |
| EP | 1193643 | 4/2002 |
| EP | 1708074 A2 | 10/2006 |
| EP | 1926016 A1 | 5/2008 |
| EP | 1953621 | 6/2008 |
| JP | 03036946 | 2/1991 |
| WO | WO 01/69343 | 9/2001 |
| WO | WO 04/049092 A1 | 6/2004 |
| WO | WO 06/106454 A1 | 10/2006 |

(56) References Cited

FOREIGN PATENT DOCUMENTS

| WO | WO 11/146668 A2 | 11/2011 |
|----|-----------------|---------|
| WO | WO 12/075468 A1 | 6/2012  |

OTHER PUBLICATIONS

International Searching Authority, "Written Opinion of the International Searching Authority" for PCT Patent Application No. PCT/US11/37069, dated Nov. 18, 2012, European Patent Office, Munich.

International Searching Authority, "Written Opinion of the International Searching Authority" for PCT Patent Application No. PCT/US11/48535, dated Feb. 20, 2013, European Patent Office, Munich.

International Searching Authority, "Written Opinion of the International Searching Authority" for PCT Patent Application No. PCT/US11/56039, dated Apr. 12, 2013, European Patent Office, Munich.

International Searching Authority, "Written Opinion of the International Searching Authority" for PCT Patent Application No. PCT/US11/59835, dated May 8, 2013, European Patent Office, Munich.

International Searching Authority, "Written Opinion of the International Searching Authority" for PCT Patent Application No. PCT/US11/63186, dated Jun. 2, 2013, European Patent Office, Munich.

International Searching Authority, "Written Opinion of the International Searching Authority" for PCT Patent Application No. PCT/US14/38656, dated Nov. 17, 2015, European Patent Office, Munich.

Melexis Microelectronic Integrated Systems, Product Information on Absolute Position Sensor IC, MLX90333.

Tietsworth, Steven C., Response to Non-Final Office Action and Amendment (dated Jan. 7, 2012), regarding Magnetic Manual User Interface Devices, U.S. Appl. No. 12/756,068.

* cited by examiner

USER INTERFACE DEVICES, APPARATUS, AND METHODS

CROSS-REFERENCE TO RELATED APPLICATION AND PATENTS

This application claims priority under 35 U.S.C. § 119(e) to U.S. Provisional Patent Application Ser. No. 61/345,956, filed on May 18, 2010, entitled SPRING SUSPENDED MAGNETICALLY SENSED USER INTERFACE DEVICES, to U.S. Provisional Patent Application Ser. No. 61/363,173, filed Jul. 9, 2010, entitled SPRING SUSPENDED MAGNETICALLY SENSED USER INTERFACE DEVICES, to U.S. Provisional Patent Application Ser. No. 61/372,025, filed Aug. 9, 2010, entitled SPRING SUSPENDED MAGNETICALLY SENSED USER INTERFACE DEVICE, to U.S. Provisional Patent Application Ser. No. 61/375,679, filed on Aug. 20, 2010, entitled METHOD FOR PROCESSING OUTPUT SIGNALS OF MAGNETICALLY SENSED USER INTERFACE DEVICES, to U.S. Provisional Patent Application Ser. No. 61/392,302, filed Oct. 12, 2010, entitled MAGNETIC THUMBSTICK DEVICES, to U.S. Provisional Patent Application Ser. No. 61/411,406, filed Nov. 8, 2010, entitled SLIM PROFILE MAGNETIC USER INTERFACE DEVICES, to U.S. Provisional Patent Application Ser. No. 61/419,150, filed Dec. 2, 2010, entitled MAGNETICALLY SENSED KNOB-ACTUATOR USER INTERFACE DEVICE, and to U.S. Provisional Patent Application Ser. No. 61/424,496, filed Dec. 17, 2010, entitled KNOB-ACTUATOR USER INTERFACE DEVICE WITH MAGNETIC SENSORS. The content of each of these applications is hereby incorporated by reference herein in its entirety for all purposes.

FIELD

The present invention relates generally to user interface devices. More particularly, but not exclusively, the invention relates to manual user interface devices including magnetic sensing functionality to measure multiple degrees of freedom of motion and/or deformability and generate output signals usable by electronic computing systems based on the sensing.

BACKGROUND

There are a multitude of manual user interface devices that enable two to three degrees of freedom for use with electronic computing systems. The QWERTY keyboard, computer mouse devices, track balls, drag pads, joy sticks, and touch screens are examples of such manual user interface devices. Whereas these devices may enable translational control over two and three axes, they do not allow control of pitch, yaw, and roll or other movements or deformations. Prior art manual user interface devices that have attempted, thus far, to enable control over three or more degrees of freedom, leave much room for improvement.

SUMMARY

The present disclosure relates generally to user interface devices as well as methods for making and using such devices.

In one aspect, the disclosure relates to a user interface device including multi-axis magnetic sensing. The user interface device may include, for example, at least one spring having an upper end and a lower end, a manual actuator element coupled to the upper end of the spring, a base element coupled to the lower end of the spring, at least one permanent magnet supported by one of the manual actuator and the base, and at least one three-axis magnetic sensor supported by the other one of the manual actuator and the base. The magnetic sensor and the permanent magnet may be operatively positioned so that when the manual actuator is displaced from a released state the magnetic sensor generates one or more motion signals in response to the displacement.

In another aspect, the disclosure relates to a user interface device. The user interface device may include a deformable actuator element actuator element, a movable actuator element, and one or more sensing elements positioned in proximity to the movable element and deformable element. The sensing element may be configured for generating one or more displacement signals representative of a displacement of the deformable element from a neutral or released state position in one or more dimensions, and/or one or more deformation signals representative of a deformation caused by a squeezing or other force applied to the deformable actuator.

In another aspect, the disclosure relates to a method of providing a output signal from a user interface device. The method may include, for example, receiving, a user deformation action at the deformable actuator element, receiving a displacement action at a movable actuator element, sensing one or both of the deformation and displacement, and providing an output signal based at least in part on the motion, deformation, or both.

In another aspect, the disclosure relates to a method of processing signals in a processing element of a manual user interface device where an actuator element or other movable element of an actuator assembly can be moved from a released state and will return to its released state as a result of restorative forces, where movement of the manual actuator causes relative movement between a plurality of magnets and a plurality of corresponding multi-axis magnetic sensors that each generate signals representing independent magnetic field components, such as three independent magnetic field components detected within each sensor. The method may include, for example, generating a field model for each sensor in which motion signals from each sensor correspond to a predetermined set of position and/or movement data, comparing the position and/or movement data for each of the sensors to determine a displacement of the manual actuator from the released state, and generating an output signal for transmission to an electronic computing system.

In another aspect, the disclosure relates to an electronic computing system including a user interface device, such as the user interface devices described above and/or subsequently herein.

In another aspect, the disclosure relates to method for making and operating a user interface device such as the user interface devices described above and/or subsequently herein.

In another aspect, the disclosure relates to computer-readable medium for causing a processor to implement methods associated with a user interface device such as the devices described above.

Various additional aspects, features, and functions are described below in conjunction with the appended Drawings.

DETAILED DESCRIPTION OF EMBODIMENTS

Overview

Figure 1:
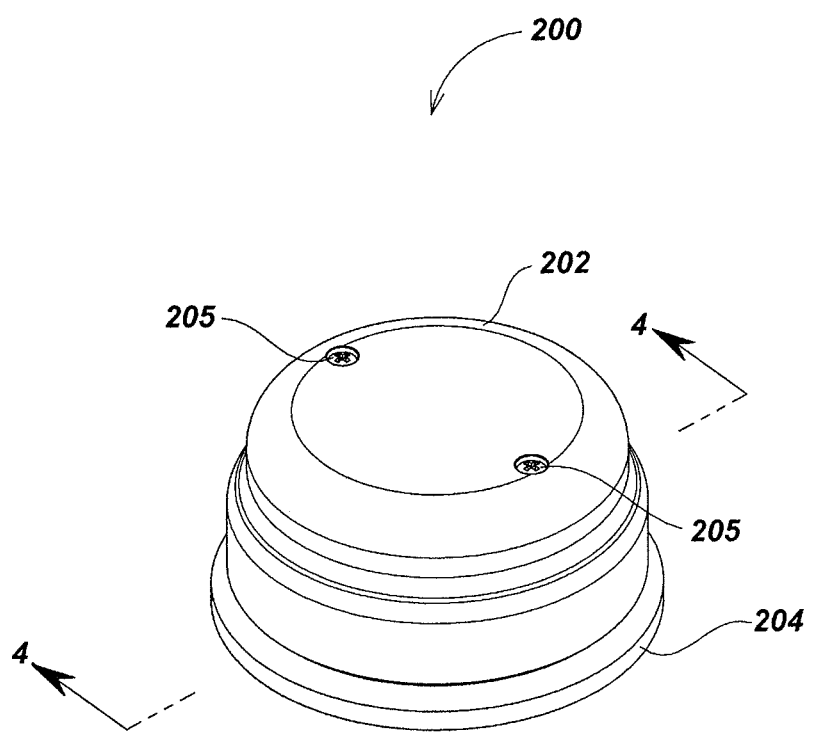
FIG. 1 is an isometric view of details of an embodiment of a manual user interface device without a mounting base.

The present invention relates generally to user interface devices and associated systems, as well as methods for making and using such devices. Various embodiments of the present invention may provide improved user interface devices, which may be base on motion and/or orientation sensing, position and/or deformation sensing, as well as other sensing as described subsequently herein. The sensing may be provided in various embodiments using actuator and other mechanical elements, base elements, magnets and magnetic sensing elements, as well as other sensor elements such as accelerometers, gyroscopic sensors, pressure sensors, temperature sensors, electrical and mechanical switching elements, movable elements, deformable elements. Processing elements may be configured to receive and process signals from the sensing elements and/or other elements, such as switching elements, to provide output signals that may be used by an electronic computing system or other device or system.

In one aspect, the disclosure relates to a user interface device. The user interface device may include, for example, at least one spring having an upper end and a lower end, a manual actuator element coupled to the upper end of the spring, a base element coupled to the lower end of the spring, at least one permanent magnet supported by one of the manual actuator and the base, and at least one three-axis magnetic sensor supported by the other one of the manual actuator and the base. The magnetic sensor and the permanent magnet may be operatively positioned so that when the manual actuator is displaced from a released state the magnetic sensor generates one or more motion signals in response to the displacement.

The permanent magnet may be positioned within a volume defined by the spring that supports the manual actuator element. The user interface device may include a plurality of springs that are configured to support that manual actuator element, and the magnet may be positioned between the springs. The permanent magnet may have a cylindrical shape. The permanent magnet may have a lower end with a conical shape or wedge shape. The manual actuator element may include an elastomeric cover.

The user interface device may further include a mechanical switching element disposed to be actuated by movement of the manual actuator element. The user interface device may further include an electrical switching element disposed to be actuated by movement of the manual actuator element. The user interface device may further include a plurality of mechanical stops configured to limit a range of motion of the actuator element. A released state distance between the magnetic sensor and the magnet may be less than four magnet diameters.

The plurality of permanent magnets may, for example, be supported by one of the manual actuator and the base, and a plurality of three-axis magnetic sensors may be supported by the other one of the manual actuator and the base. The magnetic sensors and the permanent magnets may be operatively positioned in adjacent corresponding pairs such that when the manual actuator is displaced from a released state the magnetic sensors generate motion signals in response to the displacement. The permanent magnets may be positioned within a volume defined by the spring supporting the manual actuator. The magnetic sensors may be mounted on a common planar circuit element. The manual actuator and the base may be coupled by a plurality of springs. The magnetic sensors may be mounted between the springs. The spring may be a helically coiled spring. The spring may be a flat wire spring. Ends of the spring may be coupled to the manual actuator element with one or more mounting rings. A dipole axis of the permanent magnet may be positioned to approximately point at a magnetic sensor when the manual actuator is in the released state.

In another aspect, the disclosure relates to a user interface device. The user interface device may include, for example, a base element and an actuator assembly coupled to the base element. The actuator assembly may include a movable element, a motion sensing apparatus configured to magnetically sense a motion of the movable element and provide, responsive to the sensed motion, a motion signal, a deformable element, a deformation sensor apparatus configured to magnetically sense a deformation of the deformable element and provide, responsive to the deformation, a deformation signal, a fixed element coupled to the base element, and a processing element coupled to the motion sensor apparatus and the deformation sensor apparatus, the processing element configured to receive one or both of the motion and deformation signals and provide, based on one or both of the motion and deformation signals, an output signal.

The motion sensing apparatus may be configured, for example, to sense the motion in a plurality of degrees of freedom of motion. The plurality of degrees of freedom of motion may be four or more degrees of freedom of motion. The movable element and deformable element may be disposed in an integral configuration. The actuator element may further include a vibration element. The actuator assembly may further include an elastomeric cover. The elastomeric cover may include a bellows section. The actuator assembly may further include a dampening element configured to dampen vibrations associated with a motion of the movable element.

The motion sensing apparatus may include, for example, one or more magnets and one or more magnetic sensors. The one or more magnetic sensors may comprise multi-axis magnetic sensors. The multi-axis magnetic sensors may be three-axis magnetic sensors. The motion sensing apparatus may consists of three magnets and a corresponding three of the three-axis magnetic sensors.

The deformation sensing apparatus may include, for example, one or more magnets and one or more magnetic sensors. The one or more magnetic sensors may comprise multi-axis magnetic sensors. The multi-axis magnetic sensors may be three-axis magnetic sensors. The motion sensing apparatus may consists of three magnets and a corresponding three of the three-axis magnetic sensors.

The actuator assembly may further include, for example, a limiting element configured to limit a motion of the movable element during a displacement. The base element may further include one or more buttons configured to provide a push-button actuation function. The base element may include a top half element and a bottom half element configured to enclose one or more additional sensor elements. The base element may include other element configurations, such as two or more side-by-side elements. The one or more sensor elements may include one or more of an accelerometer, a gyroscope, and a pressure or barometric sensor.

The actuator assembly may include, for example, an upper actuator sub-assembly and a lower actuator sub-assembly. The upper actuator sub-assembly and the lower actuator sub-assembly may be configured to be mated in a substantially spherical configuration, wherein the spherical configuration may be restorably deformable by a user deformation action.

The motion sensing apparatus may include, for example, a plurality of permanent magnets mounted within the upper actuator sub-assembly. The motion sensor apparatus may include a plurality of permanent magnets mounted within the lower actuator sub-assembly. The upper actuator sub-assembly may include a top actuator half including a top deformation slot section configured to allow restorable deformation of the top actuator half responsive to a user deformation action. The deformation slot section may include a plurality of ribs or finger elements extending from the top to the sides of the top actuator half. The lower actuator sub-assembly may include a bottom actuator half including a bottom deformation slot section configured to allow restorable deformation of the bottom actuator half responsive to a user deformation action. The deformation sensor apparatus may be disposed in the lower actuator sub-assembly.

In another aspect, the disclosure relates to a user interface device. The user interface device may include, for example, means for generating a first varying magnetic field responsive to a motion of a movable actuator element, means for generating a motion signal in multiple axes based on the first varying magnetic field, means for generating a second varying magnetic field responsive to a deformation of a deformable actuator element, means for generating a deformation signal in multiple axes based on the second varying magnetic field, and means for receiving the motion signal and deformation signal and generating, based at least in part on one or more of the motion signal and the deformation signal, an output signal usable by an electronic computing system.

In another aspect, the disclosure relates to a method for providing an output signal from a user interface device. The method may include, for example, generating, at a motion sensing apparatus including one or more magnetic multi-axis sensor elements, one or more motion signals corresponding to movement of a movable actuator element, generating, at a deformation sensing apparatus including one or more magnetic multi-axis sensor elements, one or more deformation signals corresponding to a deformation of a deformable actuator element, receiving, at a processing element, the one or more motion signals and the one or more deformation signals, and generating, at the processing element, based at least in part on one or more of the one or more motion signals and the one or more deformation signals, an output signal usable by an electronic computing system.

In another aspect, the disclosure relates to a computer-readable medium including instructions for causing a computer to receive, from a motion sensing apparatus including one or more magnetic multi-axis sensor elements, one or more motion signals corresponding to movement of a movable actuator element, receive, from a deformation sensing apparatus including one or more magnetic multi-axis sensor elements, one or more deformation signals corresponding to deformation of a deformable actuator element, and generate, based at least in part on one or more of the more or more motion signals and the one or more deformation signals, an output signal usable by an electronic computing system.

In another aspect, the disclosure relates to a system. The system may include an electronic computing system and a user interface device coupled to the electronic computing system. The user interface device may include, for example, a base element and an actuator assembly coupled to the base element. The actuator assembly may including a movable element, a motion sensor apparatus configured to sense a motion of the movable element and provide, responsive to the sensed motion, a motion signal, a deformable element, a deformation sensor apparatus configured to sense a deformation of the deformable element and provide, responsive to the deformation, a deformation signal, a fixed element coupled to the base element, and a processing element coupled to the motion sensor apparatus and the deformation sensor apparatus, the processing element configured to receive one or both of the motion and deformation signal and provide, based on one or both of the motion and deformation signal, an output signal to the electronic computing system.

In another aspect, the disclosure relates to a method of processing signals in a processing element of a manual user interface device where an actuator element or other movable element of an actuator assembly can be moved from a released state and will return to its released state as a result of restorative forces, where movement of the manual actuator causes relative movement between a plurality of magnets and a plurality of corresponding multi-axis magnetic sensors that each generate signals representing independent magnetic field components, such as three independent magnetic field components detected within each sensor. The method may include, for example, generating a field model for each sensor in which motion signals from each sensor correspond to a predetermined set of position and/or movement data, comparing the position and/or movement data for each of the sensors to determine a displacement of the manual actuator from the released state, and generating an output signal for transmission to an electronic computing system.

The position or motion data may be stored, for example, in a lookup table. The method may further include compensating for variations in a released state position of the manual actuator. The variation may be due to environmental conditions or parameters, such as pressure or temperature variations. The method may further include compensating for unintended displacement of the manual actuator below a predetermined minimum threshold. Alternately, or in addition, the method may include generating a center calibration prism including a predetermined set of boundaries of the magnetic field components detected by each sensor, and repeatedly re-defining the center calibration prism to auto-zero the released stare position.

In another aspect, the disclosure relates to a user interface device. The user interface device may include, for example, a spring mechanism, an actuator element coupled to the spring mechanism, a base element coupled to the spring mechanism, a processing element, and a motion sensing apparatus comprising one or more magnets and one or more multi-axis magnetic sensor elements, wherein the motion sensing apparatus is coupled between the actuator element and the base element to magnetically sense a motion of the actuator element and provide, to the processing element, one or more motion signals corresponding to the sensed motion.

The motion sensing apparatus may be configured, for example, to magnetically sense the motion in a plurality of degrees of freedom of motion. The plurality of degrees of freedom may be four or more degrees of freedom of motion. The processing element may be further configured to provide an output signal corresponding to the sensed motion to an electronic computing system. The actuator element may be coupled to an upper end of the spring element and the base element may be coupled to a lower end of the spring element. The actuator element may comprise a dome shape.

The one or more magnets may be configured so as to move with the actuator element relative to corresponding one or more multi-axis magnetic sensor elements. The one or more multi-axis magnetic sensor elements may be configured so as to move with the actuator element relative to corresponding one or more magnets. The actuator element may be pivotably mounted to the base element. The spring mechanism may include a helical coil center spring. The one or more magnets may be positioned within a space defined by an interior of the helical coil center spring. The helical coil center spring may be coupled to the actuator element with an upper mounting element. The helical coil center spring may be coupled to the base element with a lower mounting element.

The device may further comprise, for example, a motion resistance apparatus configured to provide resistance to a motion of the helical coil center spring. The spring mechanism may include a plurality of spaced coil springs. The spaced coil springs may be circumferentially spaced. Two or more of the plurality of spaced coil springs are of a different aspect ratio, coil pitch, or wire cross-section. The magnetic multi-axis sensors may be disposed between the plurality of spaced coil springs.

The spring mechanism may include, for example, one or more leaf springs. The spring mechanism may include a flat wire spring. The device may further include a plurality of motion limiting elements configured to limit the range of motion of the actuator element.

The actuator element may for example, be configured in a substantially cylindrical shape. The actuator element may include a flexible cover material. The base element may include a bottom plate.

The processing element may be configured, for example, to generate, based at least in part on the one or more motion signals, an output signal corresponding to one or more of a lateral shift, a rotation, a translation, a tilt, a roll, a yaw, an upward pull, and a downward pull of the actuator element relative to the base element.

The one or more magnets may include a plurality of permanent magnets. The one or more magnetic multi-axis sensor elements may include a plurality of magnetic multi-axis sensor elements. The one or more magnetic multi-axis sensor elements may include a dual die magnetic multi-axis sensor. The plurality of permanent magnets may be attached directly to the actuator element. The one or more magnetic multi-axis sensor elements may include three-axis magnetic sensor elements. The three-axis magnetic sensor elements may include Hall-Effect sensor elements. The one or more magnets may include cylindrical magnets. The one or more magnets may include a conical tip magnet. The one or more magnetic multi-axis sensor elements may include a single die sensor mounted to a keyed substrate. The in the one or more magnets comprise a chiseled tip magnet.

The device may include, for example, one or more magnetic pole pieces placed to shape the magnetic field of the conical or chiseled tip magnet. The in the one or more magnets comprise a chisel tip magnet. The one or more magnetic multi-axis sensor elements may comprise a single die sensor mounted to a keyed substrate.

The spring mechanism may include, for example, a plurality of circumferentially spaced coil springs. The one or more magnets consist four magnets, and the one or more multi-axis magnetic sensors consist of four multi-axis magnetic sensors. The magnetic multi-axis sensors may be positioned between the circumferentially spaced coil springs. One or more magnetic pole pieces configured to shape the magnetic field of the one or more magnets.

The actuator may include, for example, one or more dome switches configured to receive a push input. The one or more dome switches may be configured to provide tactile feedback responsive to the push input. The processing element may be further configured to generate, responsive to the push input and one or more motion signals, a pushbutton control signal to be provided to the electronic computing system.

The device may further include, for example, one or more switch bumps configured to receive a push input. The processing element may be further configured to generate, responsive to the push input, a pushbutton control signal to be provided to the electronic computing system.

The processing element may include, for example, a programmable device configured to receive the motion signals and generate, based at least in part on the motion signals, one or more output signals to be provided to an electronic computing system. The programmable device may include a processor and a memory. The programmable device may include a programmable logic device.

A spring of the spring element may, for example, be thermally bound to the actuator element. A spring of the spring element is thermally bound to the base element.

In another aspect, the disclosure relates to a user interface device. The user interface device may include means for generating a varying magnetic field responsive to motion of an actuator element, means for generating a motion signal in multiple axes based on the varying magnetic field, and means for receiving the motion signal and generating, based at least in part on the motion signal, an output signal usable by an electronic computing system.

In another aspect, the disclosure relates to a method for providing an output signal from a user interface device. The method may include, for example, generating, at a motion sensing apparatus including one or more magnetic multi-axis sensor elements, one or more motion signals corresponding to movement of an actuator element relative to a base element;

receiving, at a processing element, the one or more motion signals, and generating, at the processing element, based at least in part on the one or more motion signals, an output signal usable by an electronic computing system. The output signal may be generated to correspond to sensed motion in a plurality of degrees of freedom of motion.

In another aspect, the disclosure relates to a computer-readable medium. The computer readable medium may include instructions for causing a computer to receive, from a motion sensing apparatus including one or more magnetic multi-axis sensor elements, one or more motion signals corresponding to movement of an actuator element relative to a base element, and generate, based at least in part on the one or more motion signals, an output signal usable by an electronic computing system.

In another aspect, the disclosure relates to a system. The system may include, for example, an electronic computing system, and a user interface device coupled to the electronic computing system. The user interface device may include a spring mechanism, an actuator element coupled to the spring mechanism, a base element coupled to the spring mechanism, a processing element, and a motion sensing apparatus comprising one or more magnets and one or more multi-axis magnetic sensor elements, wherein the motion sensing apparatus is coupled between the actuator element and the base element to magnetically sense a motion of the actuator element and provide, to the processing element, one or more motion signals corresponding to the sensed motion.

Various additional aspects, details, features, elements, components, apparatus, and methods are further described below in conjunction with the appended Drawings.

Terminology

The term "permanent magnet" as used herein refers to any object that is magnetized and creates its own persistent magnetic field. Suitable ferromagnetic materials for a permanent magnet include, for example, iron, nickel, cobalt, rare earth metals and their alloys, e.g. Alnico and Neodymium, as well as other magnetizable materials, such as powderized ferromagnetic material held together with organic binder, ceramic materials, and/or other magnetizable materials.

The term "released state" as used herein describes a state in which no forces are acting upon embodiments of user interface devices besides those which are inherent to the structure of the device itself or gravitational forces.

The terms "displace" and "displacement," when used herein in reference to the user interface devices and associated elements, such as actuators, movable and/or deformable actuator elements, magnets, and magnetic sensors, refers to various manual movements thereof from a neutral or released state position, including, but not limited to, lateral movements along the X and Y axes, vertical movements along the Z axis, tilts, rotations, yaws, rolls, pitches, pulls (e.g. upward pulls of the actuator or actuator element), pushes, as well as permutations and combinations thereof.

The term "electronic computing system" as used herein refers to any system by which an embodiment of a manual user interface device (also denoted herein as a "user interface device" or "interface device" for brevity) may be used as a control device, input device, and/or output device (e.g., to provide tactile feedback). Examples of such as electronic computing system include, but are not limited to; video game systems, robotic arms, control or other robotic elements, graphical art and design systems such as computer aided design (CAD) systems, machinery or instrumentation controllers, test and diagnostic equipment, land vehicles, underwater vehicles, air vehicles, autonomous underwater vehicles, drone vehicle steering and control devices, and other electronic systems capable of interacting with user interface devices. Some embodiments may incorporate embodiments of a manual user interface device such as described herein into or within the electronic computing system, such as on or in vehicles, machinery, robotic devices, test equipment, instrumentation equipment, etc.

The term "processing element" as used herein refers to an component or apparatus which receives data from magnetic sensors, processes the data into a usable format for the electronic computing system, and transmits the data to the electronic computing system. A processing element may include or be coupled to a memory element to store data, retrieve processor instructions, share data with other devices, and/or implement other data storage functions. In some systems that can utilize the user interface device embodiments described herein, the electronic computing system and the processing element may be one and the same unit (along with other elements including memory elements and/or other elements described subsequently herein). Processing elements may be disposed, in whole or in part, on a rigid or flexible substrate, such as on a printed circuit board (PCB) flex circuit substrate, and/or other electronics mounting apparatus.

The term "exemplary" is used herein to mean "serving as an example, instance, or illustration." Any aspect and/or embodiment described herein as "exemplary" is not necessarily to be construed as preferred or advantageous over other aspects and/or embodiments.

Example Movable Actuator Embodiments

Referring to FIG. 1, an embodiment of the present invention is illustrated in the form of a user interface device 200 that includes a manual actuator element (also denoted herein as an actuator element) which may be dome shaped, such as manual actuator element 202, and/or which may be configured in a generally spherical or cylindrical fashion or in another ergonomic configuration, such as in shape conforming to a human hand. The actuator element may be movably mounted to a base element, such as via a pivoting mechanism. In the examples shown, the base element may comprise a bottom plate 204.

The manual actuator element may also be coupled to other components or elements as shown in FIG. 1 and the subsequent drawings. For example, a set of screws 205 as illustrated in the top of the manual actuator element 202 in FIG. 1 may be used to mount manual actuator element 202 to an upper attachment apparatus, such as upper mounting ring 206 (illustrated in FIGS. 2-5) or other upper attachment mechanisms (not shown). The upper attachment apparatus may be used to provide a connection between the actuator element and other elements, such as a spring mechanism, to facilitate restorably controlled movement of the actuator element.

By being pivotably mounted, the manual actuator element may be physically tilted, rotated, moved in side to side lateral directions, upward and downward direction, yawed, pitched, and/or rolled in relation to the base element (e.g. bottom plate 204) or other reference elements of the user interface device by the user. By sensing these various movements using a motion sensing apparatus, each specific movement of the manual actuator element (e.g., motion generated by user actions applied to the actuator element) may be used to generate signals to be received by a processing element to further generate one or more output signals corresponding to specific commands to be provided to an electronic computing system. These signals may be sent to the electronic computing system by wired or wireless connections, such as via a cable or via transmitter/receiver elements. As such, the actuator element may be used to receive mechanical input from a user and move (e.g., by tilting, rotating, moving laterally, up and/or down, yawing, pitching, rolling, etc.) in response. The motion sensing apparatus may be able to provide corresponding motion signals to the processing element, which may then generate output signals, such as analog or digital data signals, which may be mapped from the motion signals to be provided to the electronic computing system in response to the movement. By generating such output signals, motions of the actuator element by the user may be provided directly to the electronic computing system as motion signals and/or may be translated or converted to other output signals to be provided to the electronic computing system as inputs, controls, display data, commands, and/or other types of data or information. In an exemplary embodiment, the processing element may generate output signals representing motion in multiple degrees of freedom, such as in four to six degrees of freedom. Additional user interactions, such as deformations, switch actuation, etc. may also be sensed in addition to motion (as described subsequently herein).

In various embodiments, the manual actuator element may have varying ergonomic shapes, and may be surrounded by a cover element which may, for example, be made of a flexible material, such as an elastomeric material (as illustrated in, for example, FIGS. 12-19), in order to improve the grip and/or tactile sensation for the user when the manual actuator element is engaged by a user's hand, thumb, and/or finger(s).

Figure 2:
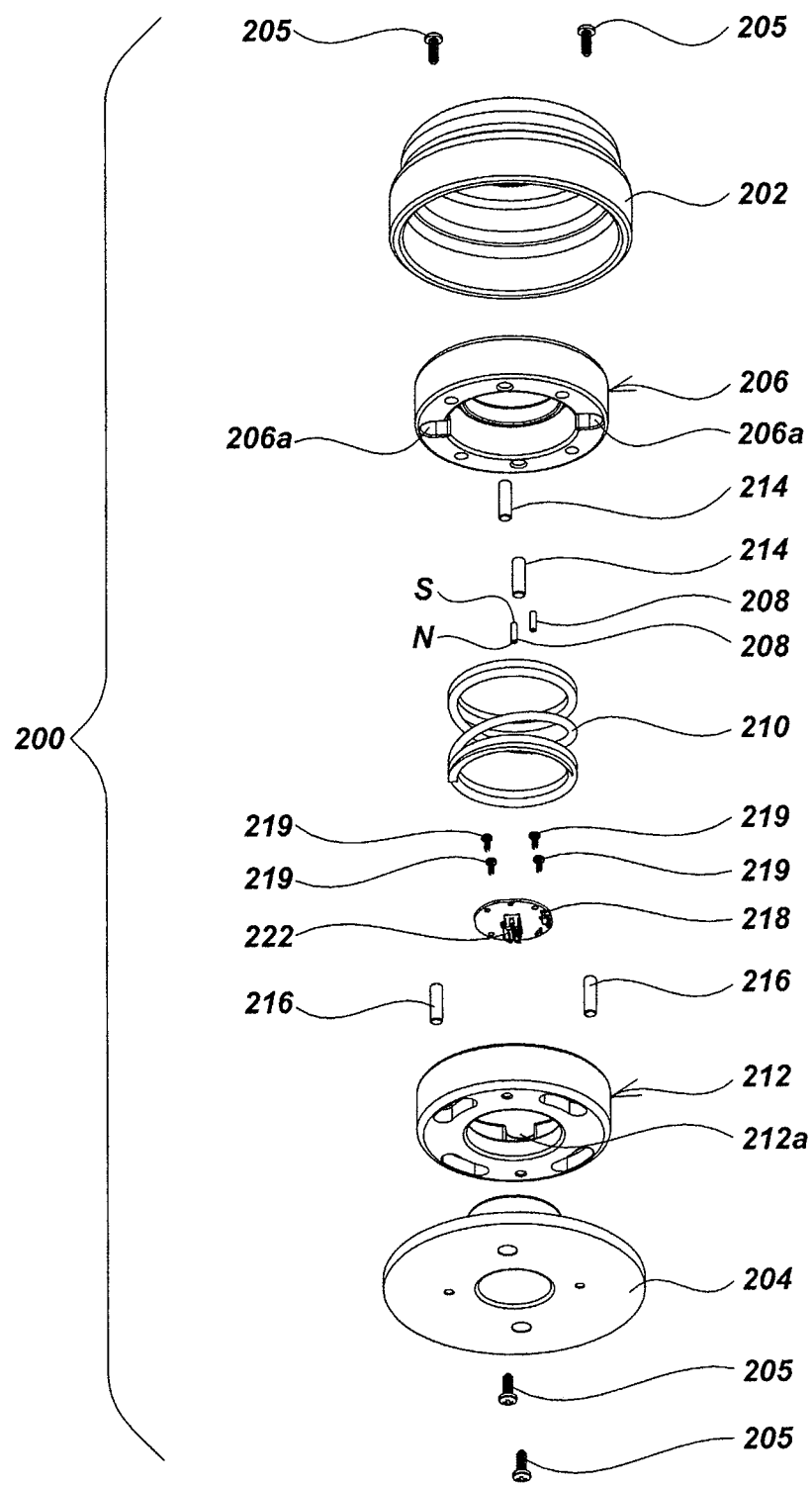
FIG. 2 is a reduced exploded view of the user interface device embodiment of FIG. 1 seen from below.
Figure 3:
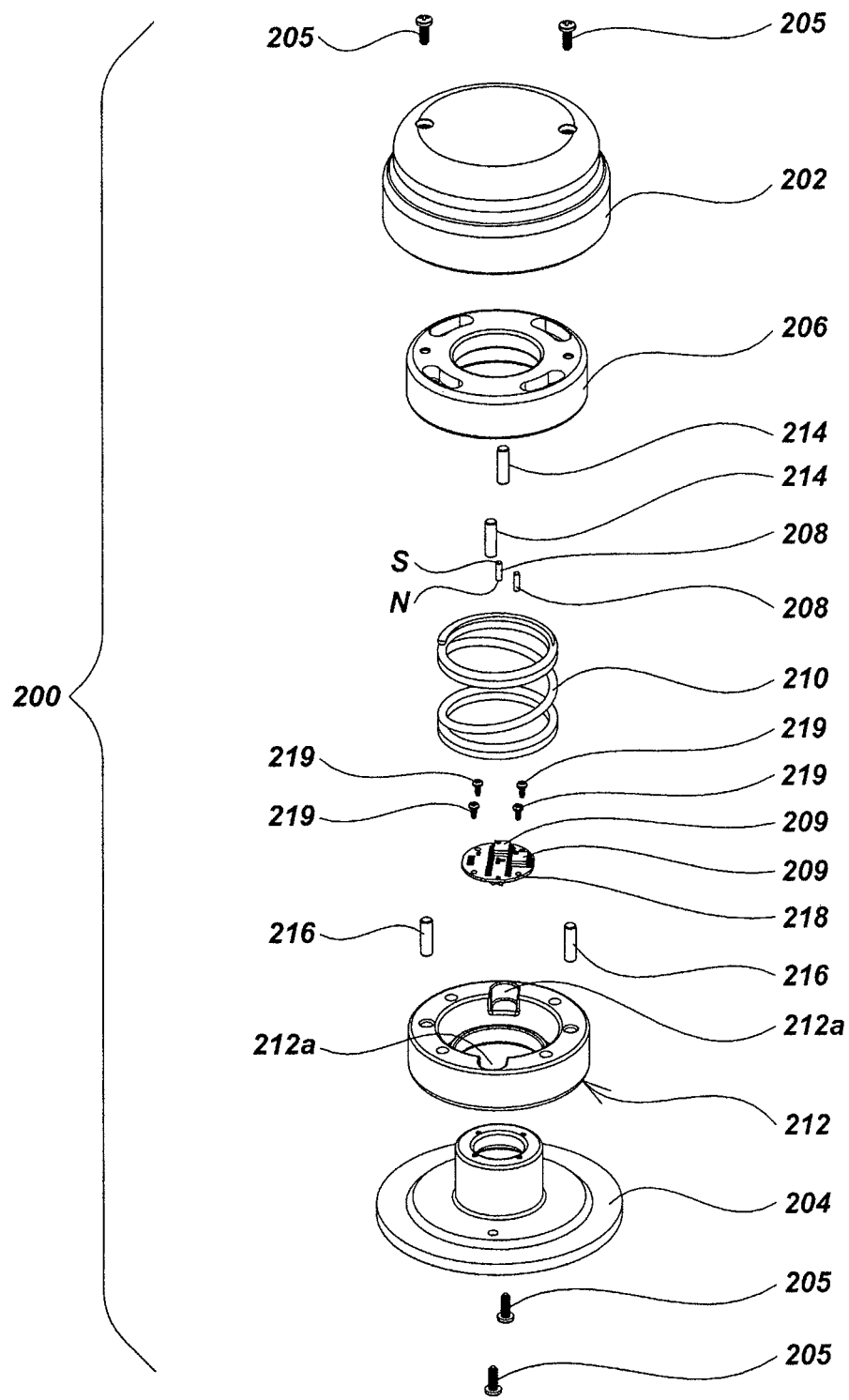
FIG. 3 is an exploded view similar to FIG. 2 seen from above.

Referring to FIGS. 2 and 3, by means of the screws 205, an upper mounting mechanism, such as upper mounting ring 206, may be mounted to, and may be concentrically enclosed within, the upper section of the manual actuator element 202. A motion sensing apparatus, which may comprise one or more magnets, such as, for example, a pair of cylindrical permanent magnets 208 as shown (or other magnet configurations, such as those described subsequently herein), may be mounted an off-set distance from a central axis of the manual actuator element 202. The permanent magnets 208 may be mounted such that they move with the manual actuator element 202. The motion sensing apparatus may further include magnetic sensor elements, such as magnetic sensors 209 (as shown in, for example, FIG. 3). The magnetic sensor elements may be configured so as to be fixed relative to the base or other elements of the user device, such as by being attached or coupled to the base.

In a typical embodiment, each of the permanent magnets 208 may be matched to or correspond with a magnetic sensor 209 to comprise the motion sensing apparatus. The motion sensing apparatus may include other mechanical, magnetic, and/or electrical components to facilitate sensing, such as the various components described subsequently herein.

In some embodiments, such as in the embodiment described above, the magnets and sensor elements may be configured so that the magnets move with the actuator element or other movable element of an actuator assembly (e.g., when a user moves the actuator element the magnets move in tandem) relative to the magnetic sensors, which may be attached or coupled to the base element or other fixed elements of the user device. In other embodiments, the magnets and magnetic sensors may be switched such that the magnetic sensors are mounted to move with the actuator element, in which case the magnets may be attached or coupled to the base or other fixed elements of the user device.

In an exemplary embodiment, the magnetic sensors may be multi-axis magnetic sensor elements. For example, in an exemplary embodiment where a three-axis magnetic sensor, such as three-axis magnetic sensor 209, is used, each three axis magnetic sensor 209 may be configured to sense three independent magnetic field components approximately at a single compact point in space within the sensor device (e.g., within an integrated circuit package or other sensor device configuration). When the position of the magnetic sensor 209 is referenced herein, the referenced sensor position refers to a point within the sensor device where the magnetic fields are measured.

In operation in the embodiments shown, a magnetic field is generated by the permanent magnets 208 during movement, with the magnetic field moving in conjunction with the movement of the magnets. The magnets and sensors may be configured so that the magnetic field of each permanent magnet 208 is substantially independent of influence or interference from the magnetic field of the other permanent magnet 208 at each of the magnetic sensors 209. For example, in an exemplary embodiment, a dipole axis of each of the permanent magnets 208 is approximately pointed at the corresponding magnetic sensor 209 when the manual actuator element 202 is in a neutral or released state position (e.g., in a state free of user contact with the actuator element).

The magnetic sensors 209 and associated ones of the permanent magnets 208 may be operatively positioned so that when the manual actuator element 202 is displaced from the released state position (e.g., by movement caused by a user action) the magnetic sensors 209 generate motion signals in response to and corresponding with the displacement. The motion signals generated by the magnetic sensors 209 may then be provided to a processing element, such as electronic circuitry on a PCB or other circuit apparatus or substrate, where the motion signals may then be interpreted by the processing element to determine commands and/or other data or information to be provided to an electronic computing system (not illustrated). For example, in some embodiments, the motion signals may be digitized (if provided in analog format) or merely passed through (if in digital form) the processing element to the electronic computing system. Alternately, or in addition, the motion signals may be processed, translated, mapped, etc. to data signals to be provided to the electronic computing system, such as to provide commands, display data, control inputs, or other data or information to be signaled to the electronic computing system. Various aspects and details of methods for processing motion signals as may be done in such a processing element are further described in U.S. Provisional Patent Application Ser. No. 61/375,679, entitled METHOD FOR PROCESSING OUTPUT SIGNALS OF MAGNETICALLY SENSED USER DEVICES, the entire content of which is incorporated by reference herein.

In various embodiments the processing element and circuit apparatus may include one or more electronic processing devices, such as microprocessors, microcontrollers, digital signal processors, programmable devices, ASICs, memory devices, analog circuitry, and/or other devices capable of receiving input signals from the magnetic sensors and generating corresponding output signals associated with movement of the manual actuator element relative to the neutral or released state position.

Although the permanent magnets 208 are shown in the illustrated embodiments as cylindrical in shape and two in quantity, in various other embodiments, other quantities, shapes, and/or types or arrangements of magnets may also be used to create magnetic fields that are substantially separate or distinguishable from the magnetic fields of the other permanent magnets 208. For example, three or more permanent magnets may be used in some embodiments, which may provide additional sensitivity or resolution. Further, it is noted that in the embodiment shown, the permanent magnets 208 are similarly oriented with their North poles facing upwards towards the bottom of the manual actuator element 202 and their South poles facing downward, away from the manual actuator element 202. The permanent magnets 208 may alternately be oriented so that their South poles face upwards toward the manual actuator element 202, or they may be oriented so that their poles are oppositely oriented. In addition, the permanent magnets 208 may be placed in other orientations relative to the magnetic sensors 209 in some embodiments.

Referring to FIGS. 2-5, a spring mechanism may be used to control movement of the actuator element. For example, in one embodiment a helical coil center spring 210 may be mounted so that its central axis extends vertically as shown. An upper end of the spring 210 may be coupled to the actuator element and a lower end of the spring may be coupled to a base element, such as bottom plate 204, which forms a base or lower support of the device. In this configuration, the actuator element may move relative to the base, with the movement controlled and/or limited by the spring mechanism.

The upper end of the center spring 210 may be coupled to the actuator element by being seated in the upper mounting ring 206, and the lower end of the spring 210 may be seated in a lower mounting ring 212. The center spring 210 may be formed of steel or other suitable metal wire or other spring materials known or developed in the art. In an exemplary embodiment, the upper mounting ring 206 may be formed with a pair of diametrically spaced upper cavities 206a, which may be of semi-circular cylindrical shape. Likewise, the lower mounting ring 212 may be formed with a pair of diametrically spaced lower cavities 212a, which may also be of a semi-circular cylindrical shape.

The spring mechanism provides a way for movably and resiliently supporting the actuator element in a neutral orientation relative to a base so that the actuator element may be maintained in or be returned to the released state position absent applied force. For example, in the embodiment shown, the center spring 210 provides for pivotably and resiliently supporting the manual actuator element 202 in a neutral orientation above the bottom plate 204.

In general, it may be desirable to secure the ends of the center spring 210 to minimize contact between the moving coils of the center spring 210 and any surface so to reduce friction against the center spring 210. For example, the center spring 210 may be sized and configured so that any frictional surface contact between the center spring 210 and adjacent structures is minimized or eliminated. This may be done by dimensioning the components to provide required clearances. By configuring the device in this way, the manual actuator element 202 and the permanent magnets 208 may readily return to the neutral or released state position whenever the actuator element is released by the operator.

In addition, an "I" fastener (or other motion resistance apparatus not illustrated), consisting of an "I" shaped piece of nylon securing the upper mounting ring 206 to the lower mounting ring 212, may be used to help the center spring 210 provide resistance to the user's movements and/or allow the center spring 210 to restore the manual actuator element 202 to a released state. The "I" fasteners or other motion resistance apparatus may be used to prevent over-extension of the center spring 210. Several "I" fasteners may be used at once, for example circumferentially spaced between the upper mounting ring 206 and the lower mounting ring 212. Other elements may also be used to provide resistance to a user's movements and/or restore the actuator element to a neutral or released state position and/or prevent over-extension of the spring mechanism.

Referring still to FIGS. 2-5, a plurality of motion limiting elements, such as pins and cavities or other motion limiting mechanisms, may be used to limit the range of motion of the actuator element. For example, pins and cavities as shown may be used to limit motion of manual actuator element 202 so as to limit stress to the center spring 210 and/or keep magnetic field measurements within a predetermined range. In the illustrated embodiment, a pair of upper pins 214 are mounted within the bottom of the upper mounting ring 206 so that they protrude from the bottom thereof. Each of the upper pins 214 may be mounted vertically along the periphery of the upper mounting ring 206. For example, the upper pins 214 may be located one hundred eighty degrees radially about the center of the upper mounting ring 206 from one another.

In addition, a pair of lower pins 216 may be mounted within the top of the lower mounting ring 212 so that they protrude from the top thereof. Each of the lower pins 216 may be mounted vertically along the periphery of the lower mounting ring 212. The lower pins 216 may likewise be located one hundred eighty degrees radially about the center of the top surface of the lower mounting ring 212 from one another. The pair of lower pins 216 may also be located ninety degrees radially about the center of the top surface of the lower mounting ring 212 from the lower cavities 212a.

The pair of upper pins 214 and the pair of lower pins 216 may be aligned with the lower cavities 212a and the upper cavities 206a respectively so that when the manual actuator element 202 is depressed, the pair of upper pins 214 fit within the pair of lower cavities 212a and the pair of lower pins 216 fit within the pair of upper cavities 206a. The lower cavities 212a and the upper cavities 206a may be substantially larger than the pair of upper pins 214 and the pair of lower pins 216 so that they are permitted movement but the range of such movement is also restricted. Other configurations of pins and cavities, or other motion limiting elements, may likewise be used to control and restrict movement, such as to avoid overextension and/or limit or control magnetic field measurements or measurement ranges.

Referring again to FIGS. 2 and 3, an electronic circuit element or elements may be included in the device. The electronic circuit element may include magnetic sensors, magnets, analog or digital electronic components, optical components, accelerometers, gyroscopic sensors, pressure sensors, barometric sensors, and/or other components configured to generate magnetic fields, sense magnetic fields, provide motion signals, process motion signals, and/or provide output signals corresponding to movement of the actuator element. The electronic circuit elements may include all or part of the magnets, magnetic sensing elements, processing elements, and/or other elements associated with electronically, magnetically, optically, or otherwise generating, receiving, processing, and/or outputting signals associated with actuator element movement.

For example, a printed circuit board 218 may be mounted to the bottom plate 204 using a set of small screws 219 or other attachment mechanisms. In an exemplary embodiment, the printed circuit board 218 may be round in shape and may be sized to fit horizontally within the center spring 210 and the lower mounting ring 212. In this configuration, the printed circuit board 218 may support or incorporate the magnetic sensors, such as the pair of magnetic sensors 209 as shown. In an exemplary embodiment, each of the magnetic sensors 209 may be a three-axis Hall Effect magnetic sensor, such as, for example, a single die version of the current commercially available Melexis MLX90333 sensor or an equivalent. Alternately, other magnetic sensor devices known or developed in the art may also be used.

Further technical details regarding particular Melexis magnetic sensor devices may be found in associated product documentation as well as in co-pending U.S. patent application Ser. No. 12/756,068, the entire disclosure of which is hereby incorporated by reference herein.

Figure 6:
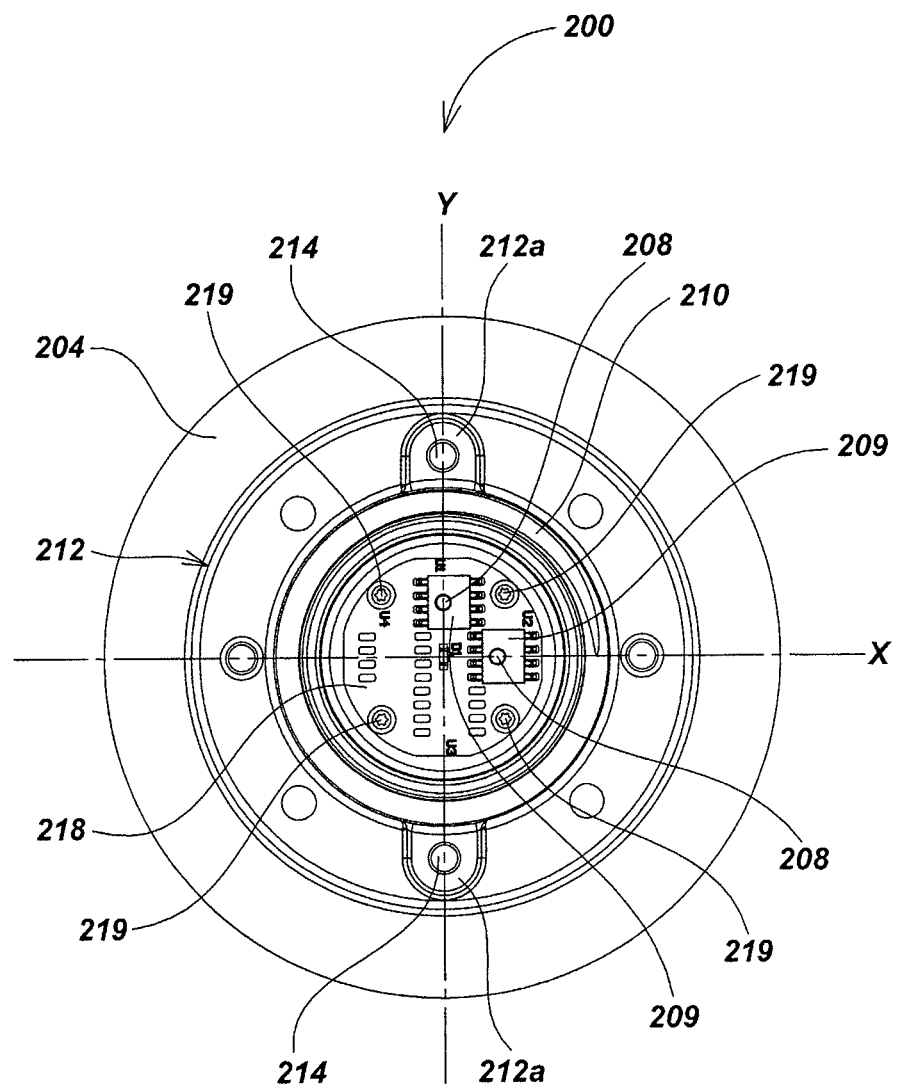
FIG. 6 is a top plan view of the user interface device embodiment of FIG. 1 with the manual actuator embodiment removed.

In the embodiment shown, the magnetic sensors 209 are positioned ninety degrees radially about the center of the printed circuit board 218 from one another, as best seen in FIG. 6. The magnetic sensors 209 and associated ones of the permanent magnets 208 may be operatively positioned so that when the manual actuator element 202 is displaced from a released state the magnetic sensor 209 generates signals in response to the displacement, which may then be processed by the processing element or other circuitry (not illustrated) to generate signals that may be provided to or associated with commands to be provided to an electronic computing system.

As noted previously, up to six degrees of freedom control may be enabled through the movements of the actuator element, which may be used to provide corresponding controlling movements in the electronic computing system. For example, these movements may include lateral, upwards, and downwards movements, tilt movements, rotational movements, translation movements, pitch, roll, and yaw movements, and/or other movements or displacements of the actuator element.

Generally, when increasingly larger permanent magnets are used, the magnetic sensors may become more susceptible to measurement saturation of the magnetic field components. For example, in the embodiment shown, if the magnetic sensors 209 become saturated with the magnetic fields, subtle movements of the manual actuator element 202 and the permanent magnets 208 may become less distinguishable by the processing element, lessening the degree of sensitivity to such movements.

In addition, when the magnets are positioned further from the magnetic sensors, the magnetic fields will typically fall off. For example, if the permanent magnets 208 are positioned further from the magnetic sensors 209, the relative magnitude of each magnetic field will fall off approximately as the inverse power of three. Therefore, precise measurements of the magnitude and direction of the magnetic fields becomes increasingly more difficult as the pair of magnetic sensors 209 are positioned further from the permanent magnets 208. Accordingly, in the exemplary embodiment 200 as shown, permanent magnets 208 that are relatively small and closely positioned to the magnetic sensors 209 are used.

In typical embodiments, the magnetic sensors may be mounted within a volume defined by the spring mechanism. For example, magnetic sensors 209 may be mounted within a volume bounded by the center spring 210 to provide potential advantages. In an exemplary embodiment, the mounting distance between the permanent magnets 208 and the magnetic sensors 209 is less than four magnet diameters when positioned at a neutral or released state. If magnets that are not round are used, this mounting distance may be measured at a right angle to the dipole axis.

Figure 4:
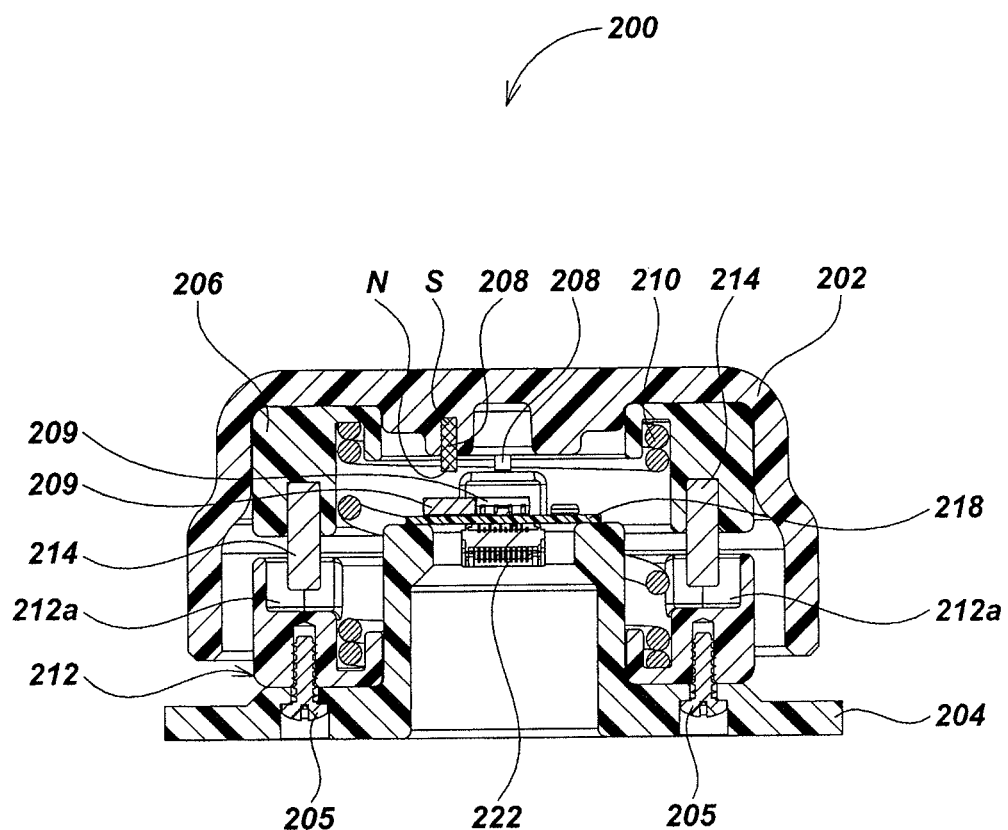
FIG. 4 is an enlarged vertical sectional view of the user interface device embodiment of FIG. 1 taken along line 4-4 of FIG. 1.

FIG. 4 illustrates details of an embodiment of positioning of permanent magnets 208 above corresponding magnetic sensors 209, and the pair of upper pins 214 positioned to be centered within the pair of lower cavities 212a of the manual user interface device embodiment of FIG. 1 in a released state taken along line 4-4. This example configuration of pins and cavities may be used to prevent over-stressing of the center spring 210.

An electrical connector, such as connector 222, may be mounted on the bottom of the printed circuit board 218. The electrical connector 222 may, for example, be a ten pin connector that connects to traces on the printed circuit board 218 leading to the leads of the magnetic sensors 209. The electrical connector may be connected to wiring (not illustrated) that transmits motion signals from the magnetic sensors to the processing element and then, after processing, to the electronic computing system. In some embodiments, wireless connection elements (not illustrated), such as radio frequency or infrared transmitters, may be used to transmit signals from the processing element to the electronic computing system.

Figure 5:
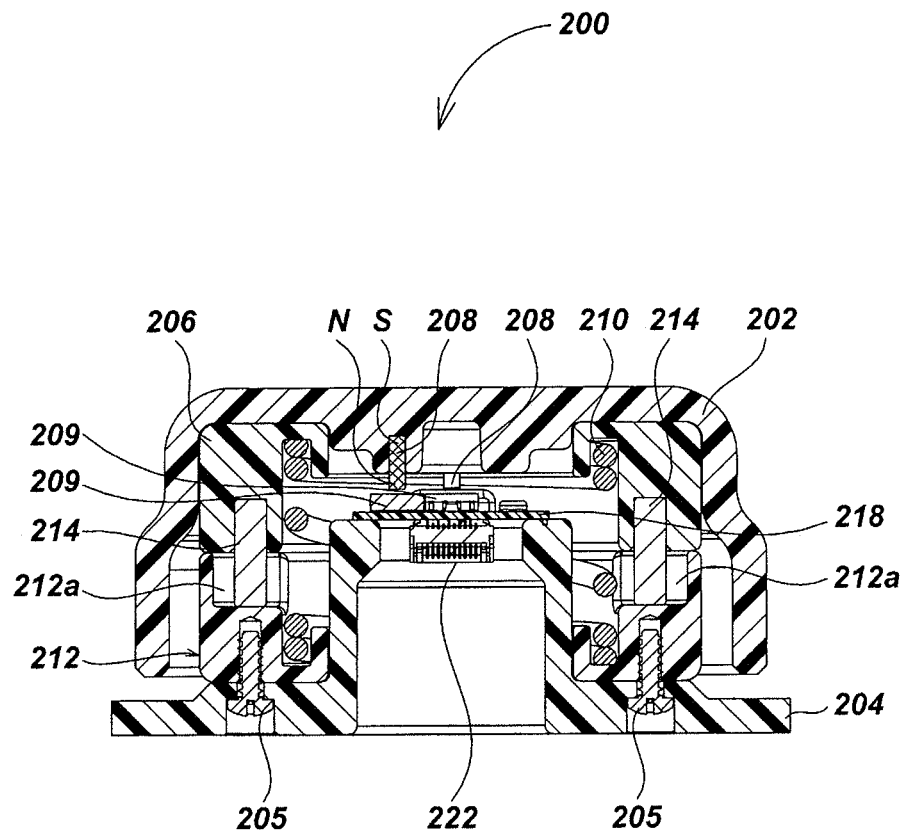
FIG. 5 is a view similar to FIG. 4 with a manual actuator embodiment of the user interface device shown in a depressed position.

FIG. 5 illustrates the actuator element embodiment 202 in a depressed position of a user interface device, such as the user interface device embodiment 200 of FIG. 1, taken along line 4-4. When the manual actuator element 202 is depressed, the upper pins 214 may move downward until their lower ends engage the bottom surfaces of the lower cavities 212a. This same downward movement of the manual actuator element 202 may also lower the permanent magnets 208 with respect to the corresponding magnetic sensors 209, without causing damage to either sensor.

The vertical length of the upper pins 214 may be selected to prevent the lower ends of the permanent magnets 208 from physically contacting and possibly damaging the magnetic sensors 209. As this movement of the manual actuator element 202 occurs, the motion signals generated by the magnetic sensors 209 in response may be interpreted by the processing element to determine commands and transmit those commands to the electronic computing system as movement along a vertical axis in, for example, degree and direction. For example, the motion signals may be interpreted by the processing element to determine output signals, such as commands or other output signals, and send those output signals to the electronic computing system as, for example, data defining specific movements along a vertical axis in magnitude and/or direction.

FIG. 6 illustrates a positioning of the permanent magnets 208 and the upper pins 214 when the embodiment 200 is in a released or neutral state. As shown in FIG. 6, the permanent magnets 208 are positioned above each of the magnetic sensors 209, and the upper pins 214 are positioned centrally within the lower cavities 212a.

Figure 7:
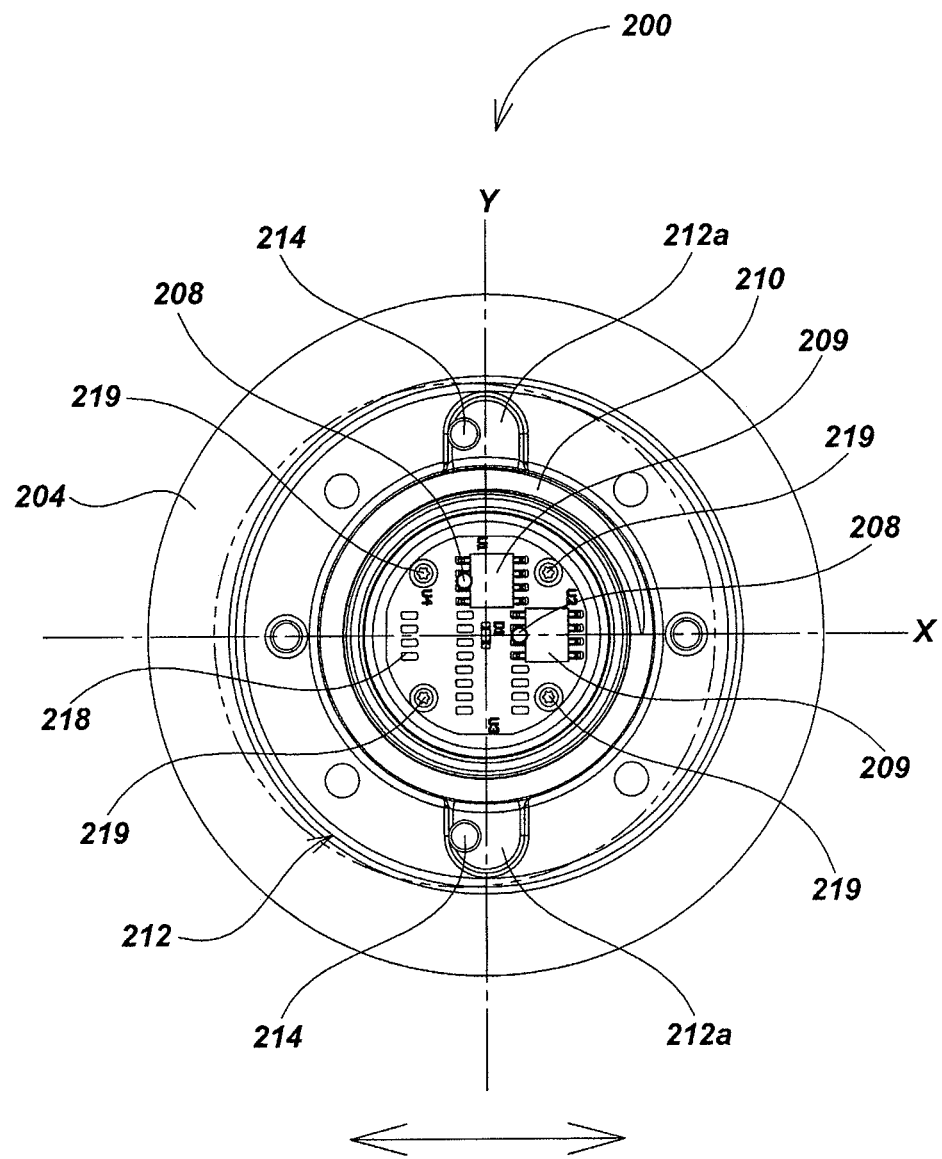
FIG. 7 is a view similar to FIG. 6 illustrating lateral movement of the manual actuator embodiment.

FIG. 7 illustrates positions the permanent magnets 208 in relation to the magnetic sensors 209 when the manual actuator element embodiment 202 (as illustrated in FIGS. 1-4) is laterally shifted, i.e. moved in a horizontal plane along the X and/or Y axes. In FIG. 7, the permanent magnets 208 and the upper pins 214 are positioned to indicate movement of the manual actuator element 202 (as illustrated in FIGS. 1-4) to the left or along the X axis in the negative direction. As the manual actuator element 202 (as illustrated in FIGS. 1-4) moves along the horizontal axes, the permanent magnets 208 and therefore the associated magnetic fields also move along the horizontal axes, creating a specific change in the magnetic field information. As this movement of the manual actuator element 202 occurs, the motion signals generated by the magnetic sensors 209 in response may be interpreted by the processing element to determine output signals, such as commands or other output signals, and send those output signals to the electronic computing system as, for example, data defining specific horizontal movement in magnitude and/or direction.

Figure 8:
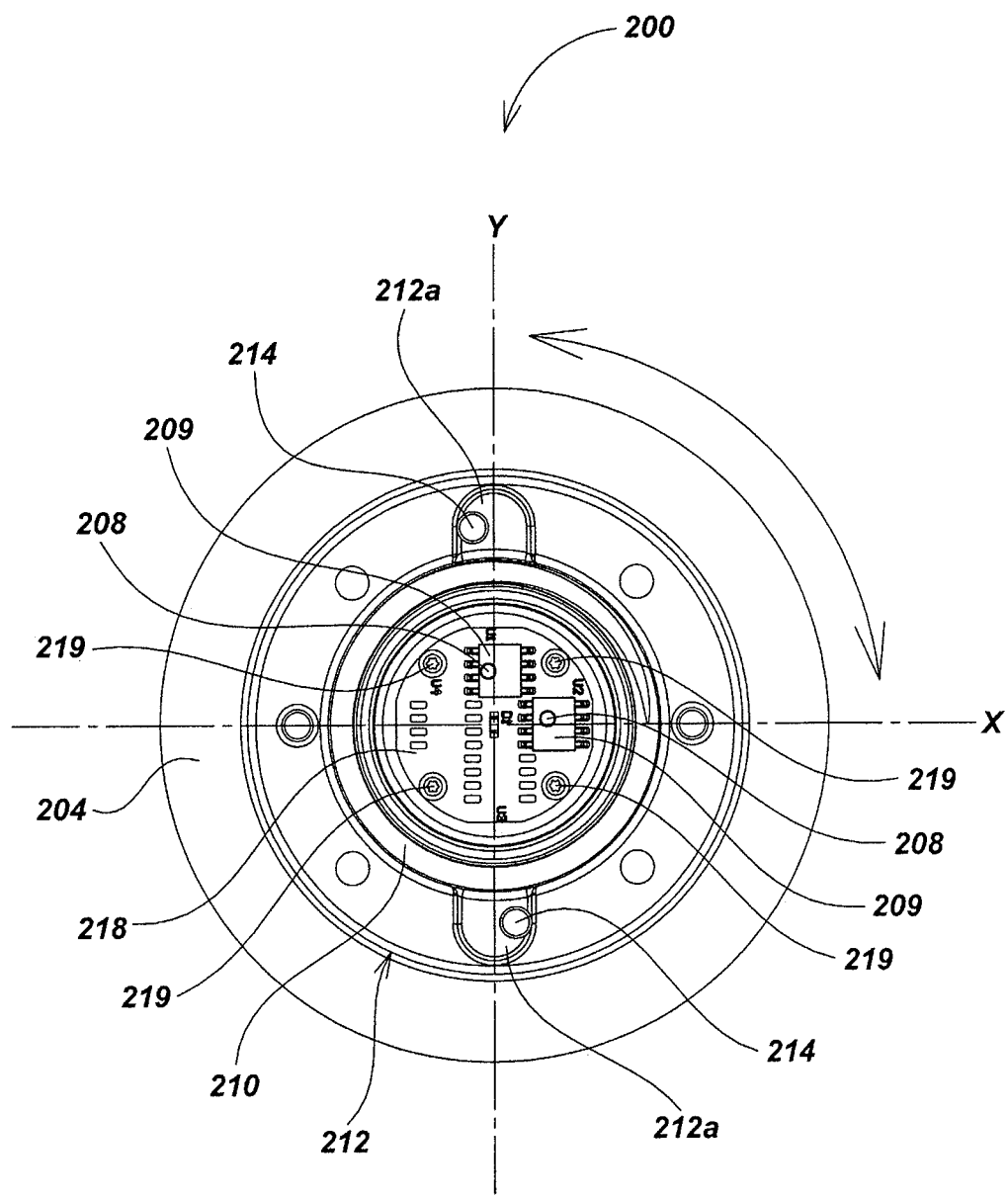
FIG. 8 is a view similar to FIG. 6 illustrating rotation of the manual actuator embodiment about a vertical axis.

FIG. 8 illustrates a position of the permanent magnets 208 when the manual actuator element embodiment 202 (as illustrated in FIGS. 1-4) is rotated about the Z axis of embodiment 200. In FIG. 8, the permanent magnets 208 and the upper pins 214 are positioned to indicate a rotation of the manual actuator element 202 (as illustrated in FIGS. 1-4) in the counter-clockwise direction. The magnitude and direction of rotation about the Z axis may be received and interpreted by the processing element to provide a corresponding output signal or signals to the electronic computing system, such as commands or other output signals, and send those output signals to the electronic computing system as, for example, data defining specific rotational movement in magnitude and/or direction.

Figure 9:
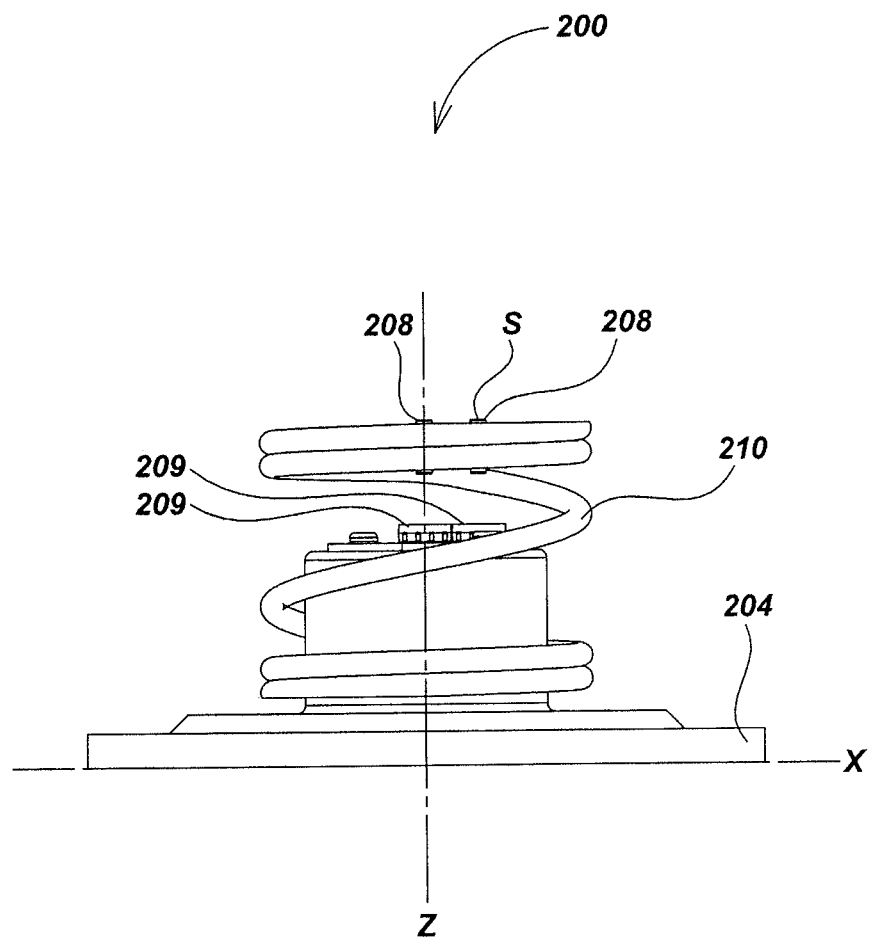
FIG. 9 is an enlarged side elevation fragmentary view of the user interface device embodiment of FIG. 1, illustrating an example structural relationship of a printed circuit board, center spring, pair of magnetic sensors, and pair of cylindrical permanent magnets.

FIG. 9 illustrates a positioning of the permanent magnets 208 when the embodiment 200 is in a released state. As shown in this embodiment, the permanent magnets 208 are positioned upright in a vertical orientation above each of the magnetic sensors 209.

Figure 10:
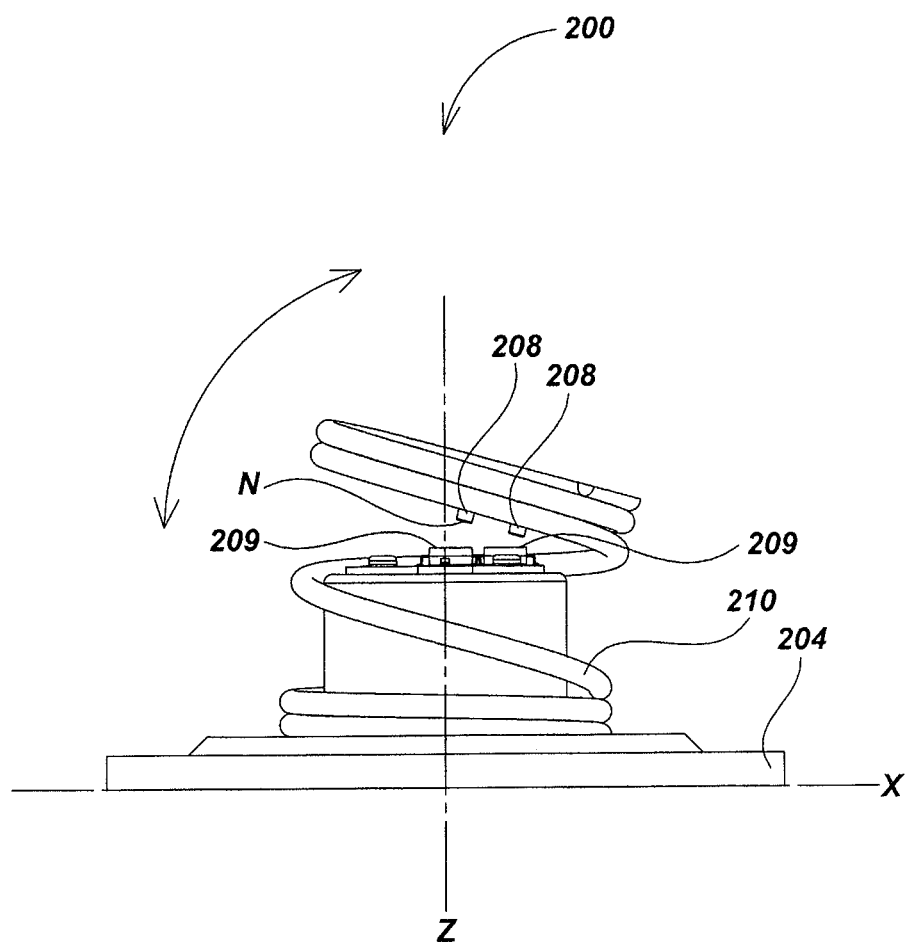
FIG. 10 is a view similar to FIG. 9 illustrating lateral flexing of the center spring and resulting displacement of the pair of cylindrical permanent magnets.

FIG. 10 illustrating a tilting action of the manual actuator element embodiment 202 (as illustrated in FIGS. 1-4) along the X axis, which causes rotation of the permanent magnets 208 about the Y axis. Similarly, tilting of the manual actuator element 202 along the Y axis rotates the permanent magnets 208 about the X axis. Regardless of the axis in which the tilt is applied to the manual actuator element embodiment 202, the permanent magnets 208 may be configured so as to also tilt in a similar relative manner in relation to the magnetic sensors 209. As this movement of the manual actuator element 202 occurs, the signals generated by the magnetic sensors 209 in response may be interpreted by the processing element to determine commands and transmit those commands to the electronic computing system. For example, the corresponding motion signals associated with the tilting action may be received and interpreted by the processing element to provide a corresponding output signal or signals to the electronic computing system, such as commands or other output signals, and send those output signals to the electronic computing system as, for example, data defining specific tilting action.

Figure 11:
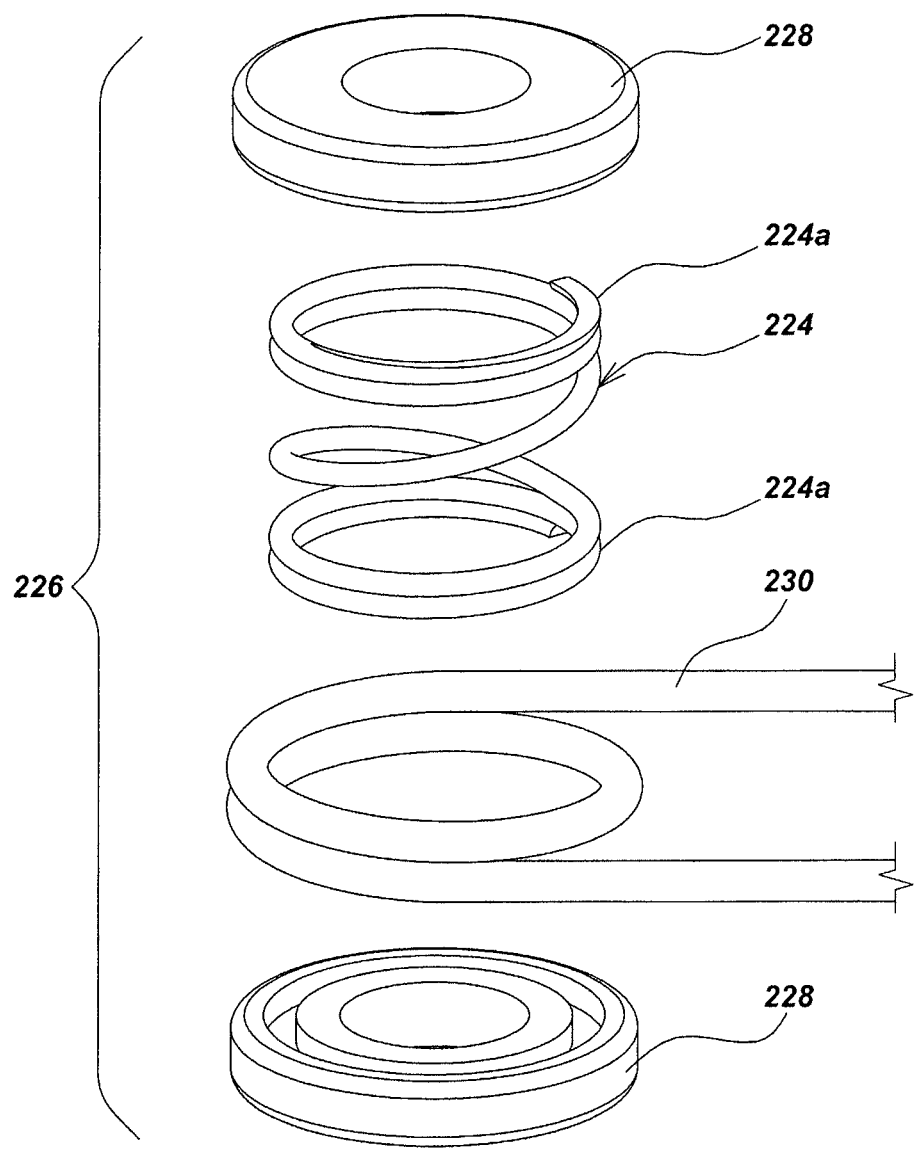
FIG. 11 is an exploded view illustrating the use of a coil to generate magnetic induction in mounting the spring during manufacture.
Figure 12:
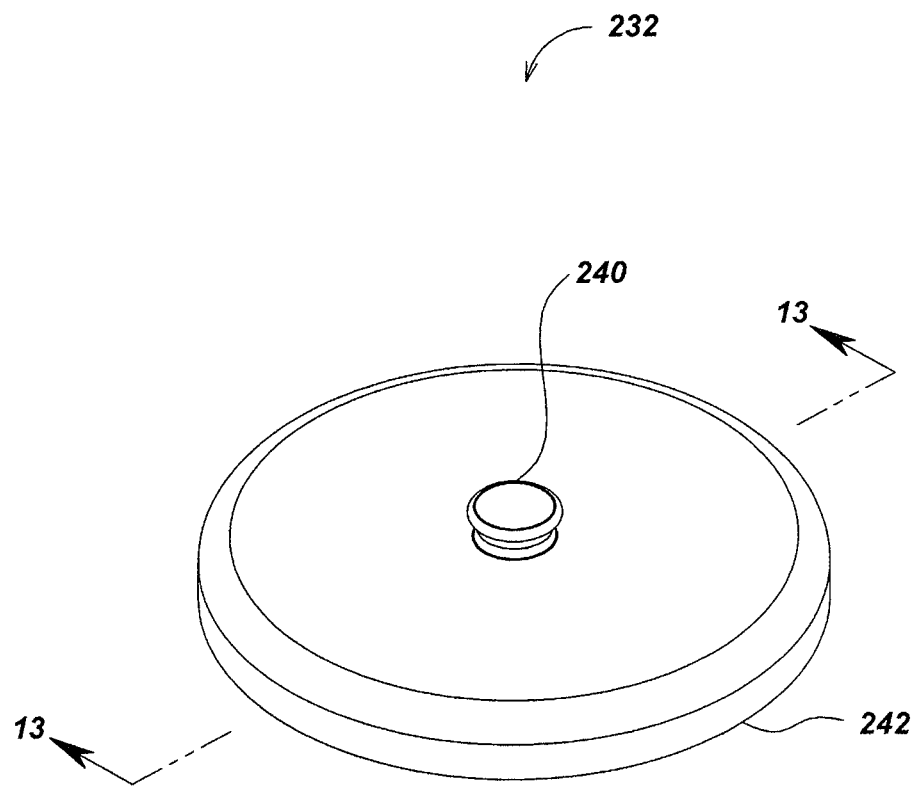
FIG. 12 is an isometric view of another embodiment of a manual user interface device having a single small cylindrical permanent magnet and a dual sensor.

Referring to FIG. 11, the ends of an electrically conductive coil spring 224, of which the center spring 210 (illustrated in FIGS. 2-10) is an example, may be mounted into thermoplastic components. This may be done by, for example, using a magnetic induction method illustrated in a magnetic induction assembly 226.

In this approach, a closed loop spring coil end 224a may be formed on each end of the conductive coil spring 224. A set of cylindrical thermoplastic caps 228 are illustrated and representative of any thermoplastic piece in which the upper end of the conductive coil spring 224 may be mounted, such as, for example, the upper mounting ring 206 (as illustrated in FIGS. 2-5) and/or the lower mounting ring 212 (as illustrated in FIGS. 2-5).

During manufacture, there are various ways in which the conductive coil spring 224 may be mounted into embodiments of the present invention. Example ways in which this may be manufactured include; mechanically mounting by threading coil ends around an inner core or into an outer ring, bonding with adhesive or using some other bonding agent, insert molding the spring into plastic parts, as well as heating the spring and allowing an adjoining thermoplastic material to flow around the ends of the heated spring.

These approaches may, however, create problems. For example, mechanically mounting the conductive coil spring 224 by threading coil ends onto an inner core or an outer ring requires a very high degree of precise control over the shape and size of the coil ends. Because of difficulties in precisely winding of the conductive coil spring 224, the result is frequently an imprecise final shape and position of the conductive coil spring 224 within the device itself. Bonding the springs using adhesive or some other bonding agent, such as solder, requires longer cure or heating times and are subject to misalignment from handling during manufacture. A spring that is insert molded into plastic components is typically done so using complicated molds and associated shutoffs, and can still result in misaligned springs.

Alternately, a low stress, highly aligned method of installation and spring retention is provided by heating the springs and allowing an adjoining thermoplastic material to flow around the ends thereof. Using the method of magnetic induction to heat the spring may be a particularly cost effective and quick method by which embodiments of the present invention mount the conductive coil spring 224, requiring no additional calibration to align the spring. For example, as illustrated in FIG. 11, an induction coil 230 may be utilized to heat the closed coil ends of the conductive coil spring 224 using magnetic induction. The conductive coil spring 224 is generally electrically conductive and may be configured so that each end coil wraps tightly making contact with itself, i.e. overlaps, and a shorting loop occurs when placed inside the induction coil 230.

In some embodiments, stainless steel springs, which may have a closed end configuration, may be used. However, it may be advantageous to use a magnetic steel alloy rather than stainless steel. For example, inductive heating may be more effective using magnetic steel. Further, springs having a closed-end configuration (e.g., to provide a shorted turn/loop for heating) may not bee needed as the heating may be substantially generated by magnetic domain flipping (i.e., hysteresis).

When an electric current is induced in a coil from magnetic induction, the closed coiled ends of the conductive coil spring 224 for example, the current loops about the closed loop spring coil ends 224a, causing the conductive material to quickly become hot due to the resistive heating. The heated closed coil ends of the conductive coil spring 224 may be configured to melt the thermoplastic caps 228. The thermoplastic caps 228 may each melt and flow into each of the closed loop spring coils ends 224a, thereby forming a mechanical coupling between the closed loop coil spring coils ends 224a and the thermoplastic caps 228. This method may work best when the induction coil 230 is only slightly larger in diameter than the conductive coil spring 224, or high induction power may be used to fuse smaller springs.

A magnetic induction method such as by which the center spring 210 of FIGS. 1-10 may be mounted may also be used to cure certain adhesives or other bonding agents. In this way, a more precise centering of the permanent magnets 208 (as illustrated in FIGS. 2-4) about each of the magnetic sensors 209 may be achieved because the magnetic induction method of assembly is both low stress and allows a high degree of alignment. The precise aligning of the center spring 210 at a released state of the manual actuator element 202 may maximize the available dynamic range of the manual user interface device 200, and may thereby improve its overall sensitivity and performance.

Although the previously described embodiments illustrate certain exemplary configurations, it is recognized that other types, numbers, and/or configurations of elements may alternately be used in various embodiments. For example, referring to FIGS. 12-15, an alternate embodiment 232 of a manual user interface device is illustrated. This embodiment utilizes a small permanent magnet 234 and a dual die magnetic sensor 236, such as the Melexis MLX90333 three-axis Hall Effect sensor. Such a dual die magnetic sensor 236 combines two three-axis magnetic sensors into one component but still functions as two separate three-axis magnetic sensors otherwise.

The small permanent magnet 234 of the embodiment 232 may be mounted to an actuator support 238. The actuator support 238 may be composed of a thermoplastic material in order to be mounted to a restorative spring 239, such as through magnetic induction as described previously herein.

The actuator support 238 may be encased by a rubber cover 240. The rubber cover 240 may contain a male rubber cover top keying feature 240a which fits into a female actuator support keying feature 238a positioned on the top of the actuator support 238, thereby allowing the rubber cover 240 to optimally connect to the actuator support keying feature 238a. A lower section of the rubber cover 240 may also has a series of rubber cover bottom keying features 240b, which may be used to secure the bottom portion of the central opening of the rubber cover 240 between a device case 242 and a thermoplastic securing ring 244 into a series of securing ring female keying features 244a.

The device case 242 is illustrated as a cylindrical component with a substantially larger diameter than height, however, other configurations may be used in some embodiments. The device case 242 encloses the inner components of the embodiment 232. The thermoplastic securing ring 244 may be attached to the bottom of the restorative spring 239 by the method of heating the ends of the restorative spring 239 via magnetic induction. The thermoplastic securing ring 244 may also be secured to a keyed printed circuit board 246 by a securing ring male keying feature 244b fitted into a printed circuit board female keying feature 246a. The securing ring male keying feature 244b may comprise a post extending from the bottom surface of the thermoplastic securing ring 244 along one side.

The printed circuit board female keying feature 246a may be designed so that the post aligns with and fits snuggly within the hole and will secure the thermoplastic securing ring 244 to the keyed printed circuit board 246. The keyed printed circuit board 246 may be secured to the bottom surface of the device case 242 with small screws 219.

The resilience of the rubber cover 240 may also aid the restorative spring 239 in restoring the components to an appropriate released state. This manual user interface device configuration of the embodiment 232 may be used to provide a device that is particularly small in size. Furthermore, two such small devices used in tandem may be used to enable six degrees of freedom control within an electronic computing system, such as directly on or in a instrument, tool, keyboard, or other device or system.

Referring to FIGS. 16-19, another embodiment 248 of a manual user interface device is illustrated. The embodiment 248 includes a device shell 250, a rubber actuator column cover 252, an actuator column 254, and an inner spring 255. Similar to the embodiment 232 of FIGS. 12-15, the embodiment 248 may also contain a dual die magnetic sensor 236 and/or the thermoplastic securing ring 244. Instead of the keyed printed circuit board 246 (as illustrated in FIGS. 12-15), the embodiment 248 may utilize a large keyed printed circuit board 256.

Figure 13:
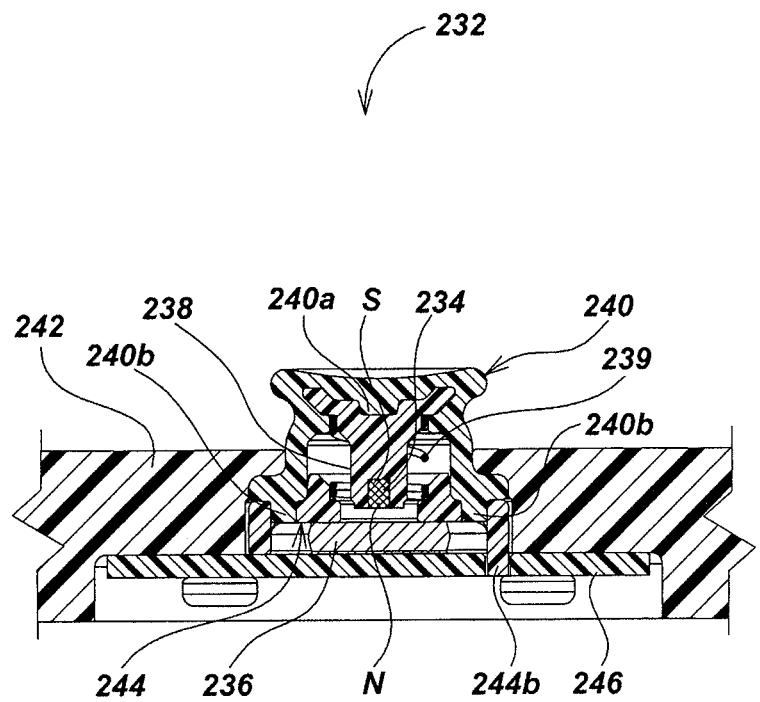
FIG. 13 is a fragmentary vertical sectional view of the embodiment of FIG. 12 seen along line 13-13.
Figure 14:
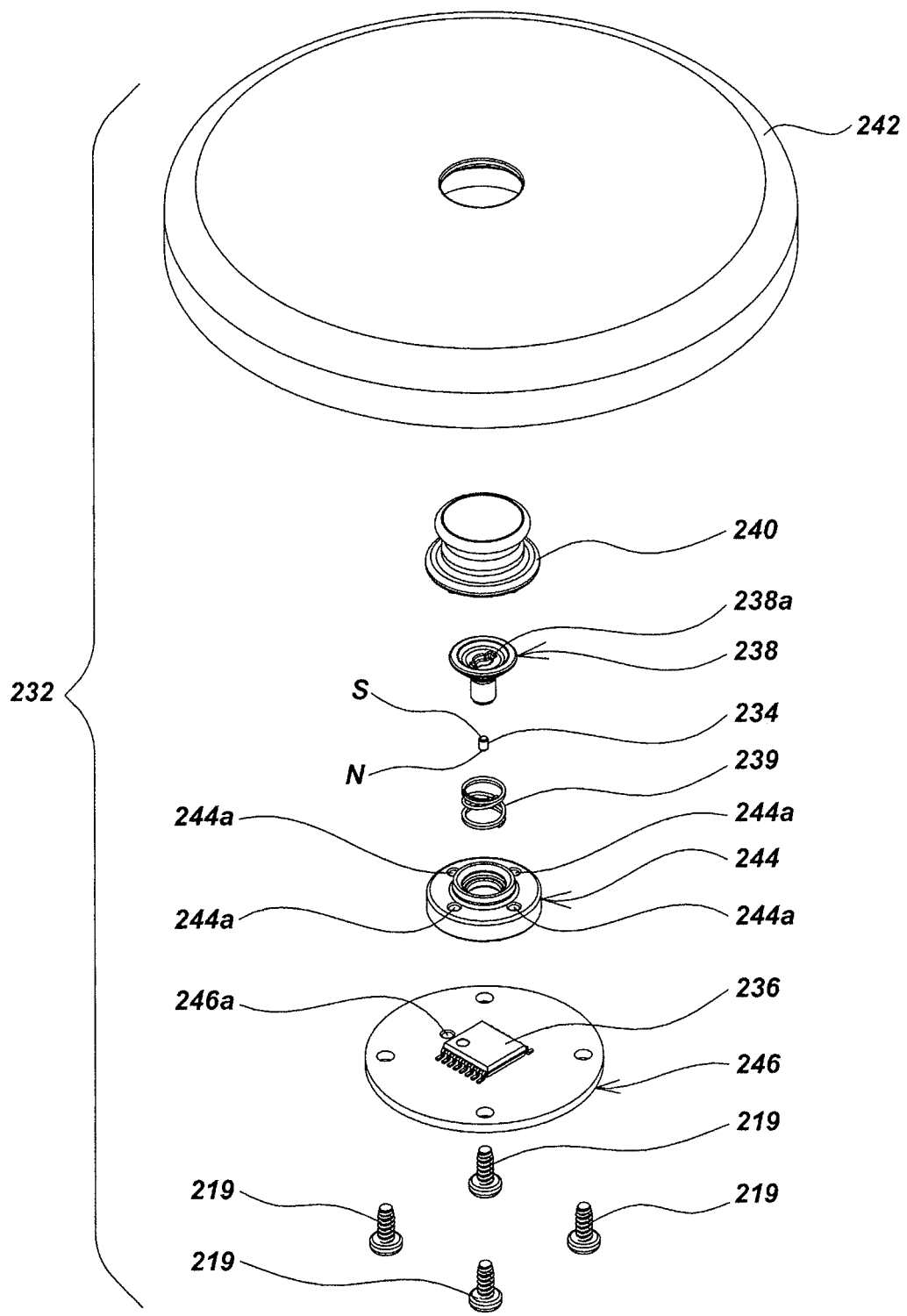
FIG. 14 is an exploded view of the embodiment of FIG. 12 seen from above.
Figure 15:
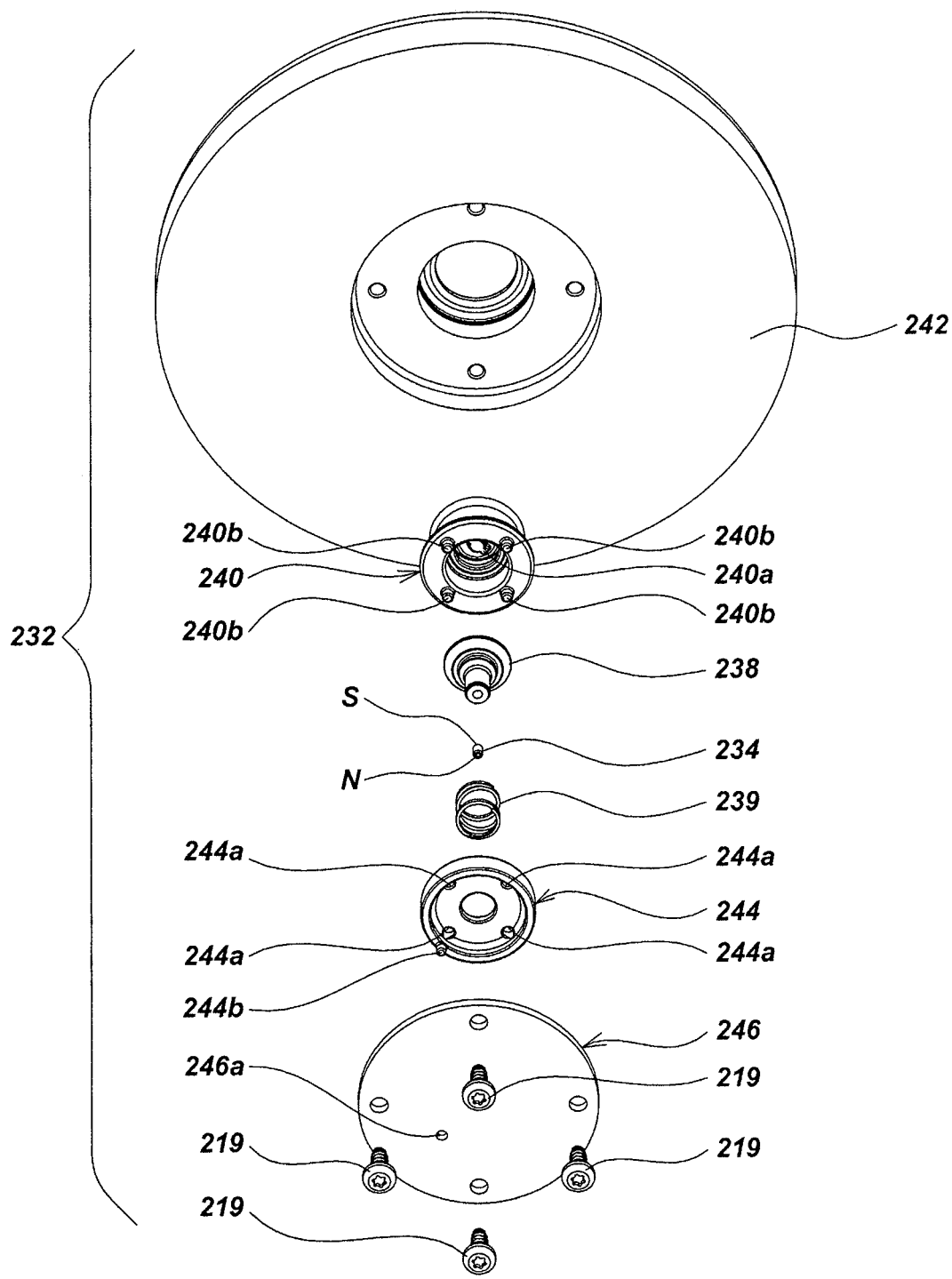
FIG. 15 is a view similar to FIG. 14 seen from below.
Figure 16:
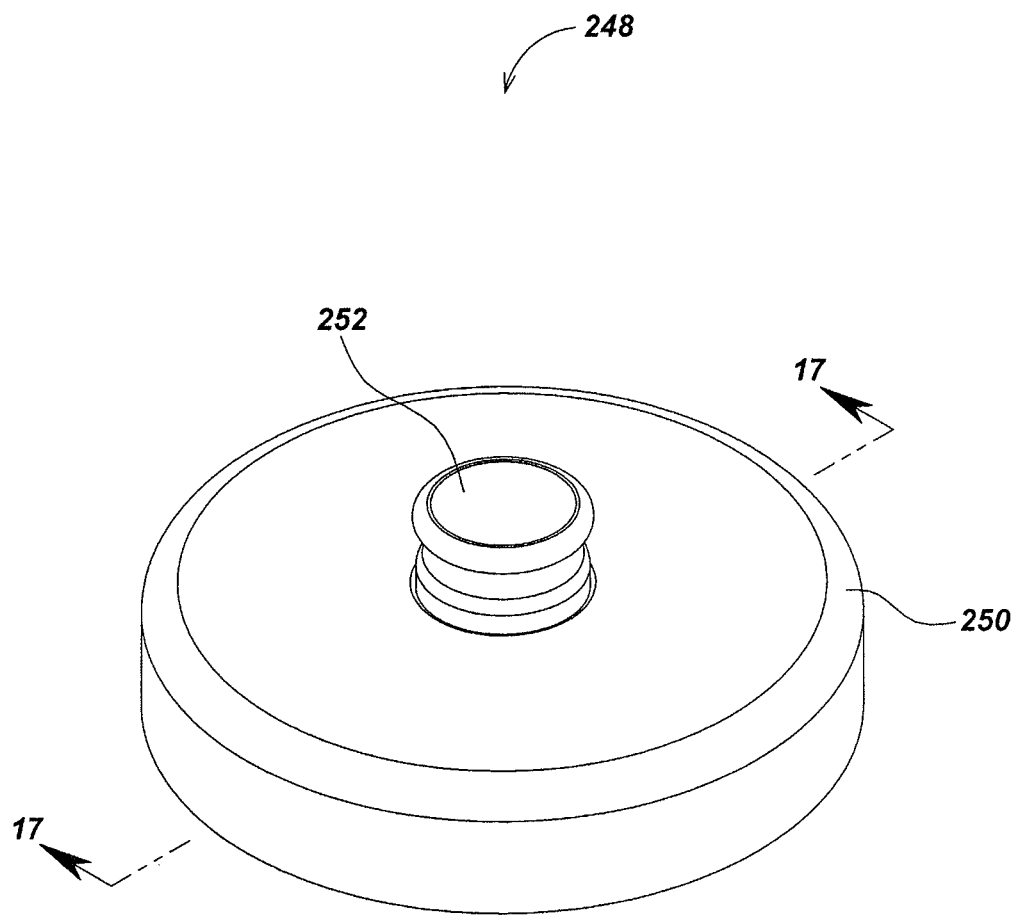
FIG. 16 is an isometric view of another embodiment of a manual user interface device configured with two side by side permanent magnets and a dual die magnetic sensor.
Figure 17:
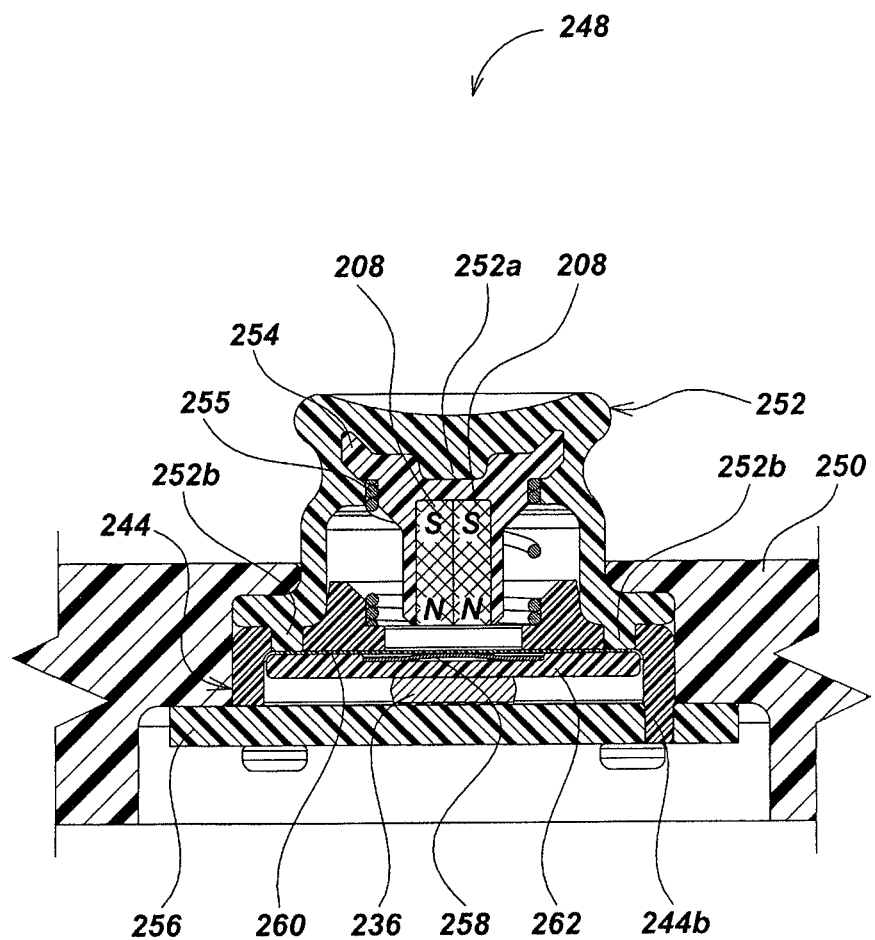
FIG. 17 is a vertical sectional view of the embodiment of FIG. 16 seen along line 17-17.
Figure 18:
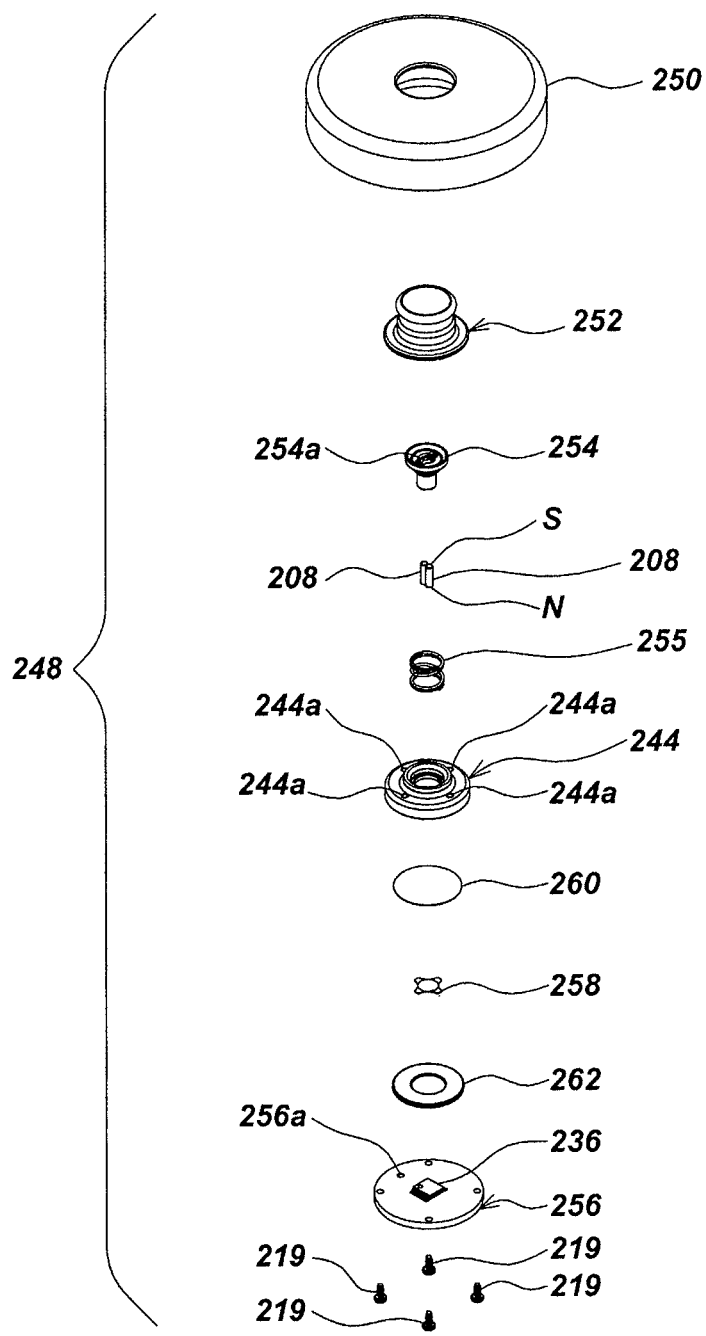
FIG. 18 is an exploded view of the embodiment of FIG. 16 seen from above.
Figure 19:
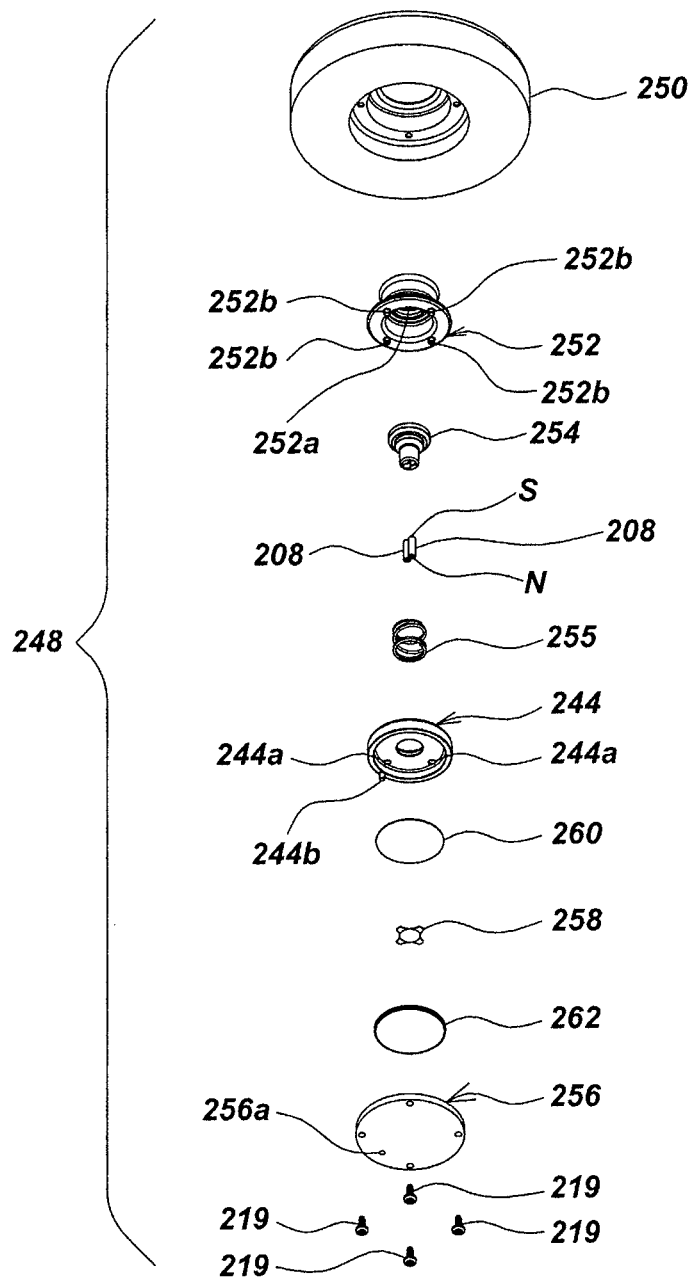
FIG. 19 is a view similar to FIG. 18 seen from below.

The large keyed printed circuit board 256 may have a larger diameter than the keyed printed circuit board 246 (as illustrated in FIGS. 13-15). The large keyed printed circuit board 256 may also contains a large keyed printed circuit board keying feature 256a whereby the securing ring male keying feature 244b is fitted, thereby mounting the thermoplastic securing ring 244 to the large keyed printed circuit board 256.

The embodiment 248 may configure the permanent magnets 208 in a side by side orientation instead of a single one of the small permanent magnets 234 as shown in the embodiment 232 (as illustrated in FIGS. 13-15). In an exemplary embodiment, the actuator column 254 may have a substantially more vertical lip versus the actuator support 238 of FIG. 14. If the actuator column cover 252 is overmolded to the actuator column 254, the actuator column 254 will be shaped differently than the actuator support 238 of the embodiment 232 (as illustrated in FIGS. 13-15). The actuator column 254 may contain an actuator column keying feature 254a. The actuator column cover 252 may contain an actuator column cover top keying feature 252a and an actuator column cover bottom keying feature 252b.

Referring still to FIGS. 16-19, in the illustrated embodiment, the permanent magnets 208 may be centered about the bottom surface of the manual actuator element and above the dual die magnetic sensor 236. The permanent magnets 208 of the embodiment 248 may be oriented with like polarities positioned on each end, and may be fixed together with the actuator column 254 and oriented where the like polarities of the permanent magnets 208 would normally repel one another. This configuration of the permanent magnets 208 creates a non-rotationally symmetric field, allowing the processing unit, using the motion signals from the dual die magnetic sensor 236, to distinguish rotation of the actuator column cover 252 around a vertical central axis.

The embodiment 248 therefore may enable six degrees of freedom as three measurements of the magnetic field's magnitude and direction about each of the two internal sensors of the dual die magnetic sensor 236 are derived. A three sensor device such as described in co-pending U.S. patent application Ser. No. 12/756,068, which is incorporated by reference herein in its entirety, may also be used to better distinguish the displacement of the actuator column 254. Similarly, a triad of small three axis magnetic sensors (not illustrated) or other similar or equivalent configurations, may also be used.

Referring still to FIGS. 16-19, the permanent magnets 208 may be mounted into the bottom of the actuator column 254 from below. The top of the actuator column 254 may be encased by the actuator column cover 252. The actuator column cover 252 may be prevented from slipping relative to the actuator column 254 during rotation due to an actuator column cover top keying feature 252a, which is male and fits within the actuator column keying feature 254a. The actuator column cover bottom keying feature 252b may be used to aid in securing the actuator column cover 252 into the securing ring female keying features 244a of the thermoplastic securing ring 244.

The actuator column 254 may be mounted to the top of the inner spring 255 such as is shown. The thermoplastic securing ring 244 may be mounted to the bottom of the inner spring 255 by, for example, heating the ends of the inner spring 255 such as through magnetic induction as described previously herein. The bottom of the thermoplastic securing ring 244 may be mounted to the large keyed printed circuit board 256 and may be secured by securing ring male keying feature 244b on the bottom of the thermoplastic securing ring 244, mating to the large keyed printed circuit board keying feature 256a. The large keyed printed circuit board 256 may be mounted to the bottom of the device shell 250 by the small screws 219.

Referring still to FIGS. 16-19, a mechanical dome switch 258, a dome switch cover 260, and a dome switch housing 262 may be positioned between the thermoplastic securing ring 244 and the dual die magnetic sensor 236. When the actuator column 254 is depressed by the user, the permanent magnets 208 may physically make contact with the dome switch cover 260, which in turn may be pushed into the mechanical dome switch 258, thereby providing the user with tactile feedback in the form of a click or other similar or equivalent action. The tactile feedback may be provided, for example, in response to a user applying pressure, such as by a push action or input.

In an exemplary embodiment, the dome switch cover 260 may be made of a malleable Teflon® or ultra high molecular weight polyethylene material and, when in combination with the dome switch housing 262, may hold the mechanical dome switch 258 stationary and centered between the permanent magnets 208 and the dual die magnetic sensor 236. As the permanent magnets 208 approach and indirectly contact the mechanical dome switch 258, the dual die magnetic sensor 236 may measure a distinct increase in the magnitude of the magnetic field over time when the mechanical dome switch 258 actuates. This increase may be processed by the processing element and interpreted as a form of pushbutton control which, in turn, may be used to generate and send a particular corresponding command or control signal to the electronic computing system. For example, sensed magnetic fields associated with a push-type movement by a user may be calibrated and programmed into the processing element so as to generate the pushbutton command or control responsive to the sensed increasing magnetic field, such as when the magnets approach the dome switch.

Furthermore, one or more electrical contact points may also be used in conjunction with the mechanical dome switch 258 to provide additional pushbutton-type controls. Though the mechanical dome switch 258 is illustrated in conjunction with the permanent magnets 208 in the side by side configuration, the same result can be achieved from utilizing the mechanical dome switch 258 with any of configurations of the permanent magnets 208. The actuator column cover 252 can be displaced by the operator when the mechanical dome switch 258 is depressed, thereby optionally providing a separate and distinct set of user commands.

Referring to FIGS. 20A, 20B, 20C, and 21, an embodiment 264 of a manual user interface device may include an ergonomic wedge-shaped base 266. For example, as a user grasps the manual actuator element 202, the wedge-shaped base 266 may be configured so that the user's wrist may rest upon a front portion thereof, thereby creating a greater force to hold the embodiment 264 stationary in relation to the operating surface. Rubber friction pads (not illustrated) on the bottom of the wedge-shaped base 266 may also be used to aid in holding the embodiment 264 stationary on a work surface. In other embodiments, attachment mechanisms, such as screws, clamps, adhesives, etc. may be used to attach a base element to other structures or surfaces.

An embodiment of a processing element assembly 268 is illustrated in the embodiment 264 (in FIG. 21), encased in the wedge-shaped base 266. The processing element assembly 268 is illustrated as a processing element printed circuit board 270 which may contain, among other components, a microprocessor, microcontroller, or other programmable logic device, an ASIC, memory, analog and/or digital electronic components, as well as apparatus to connect the printed circuit board 270 (or other processing element substrate or mounting mechanism) to the magnetic sensors (e.g., on the printed circuit board 218 (as illustrated in FIG. 2) including the magnetic sensors 209). In addition, apparatus for connecting the processing element to the electronic computing system, such as via a serial or parallel wired interface, such as USB or other wired interfaces, or a wireless interface, such as Zigbee, Bluetooth, etc. In some embodiments, hardware and/or software elements may be including on the processing element circuit, such as via a USB chip or other device. Likewise, wireless hardware and/or software elements may be included on the processing element circuit and/or on addition components, such as a wireless USB dongle, and the like.

Figure 20A:
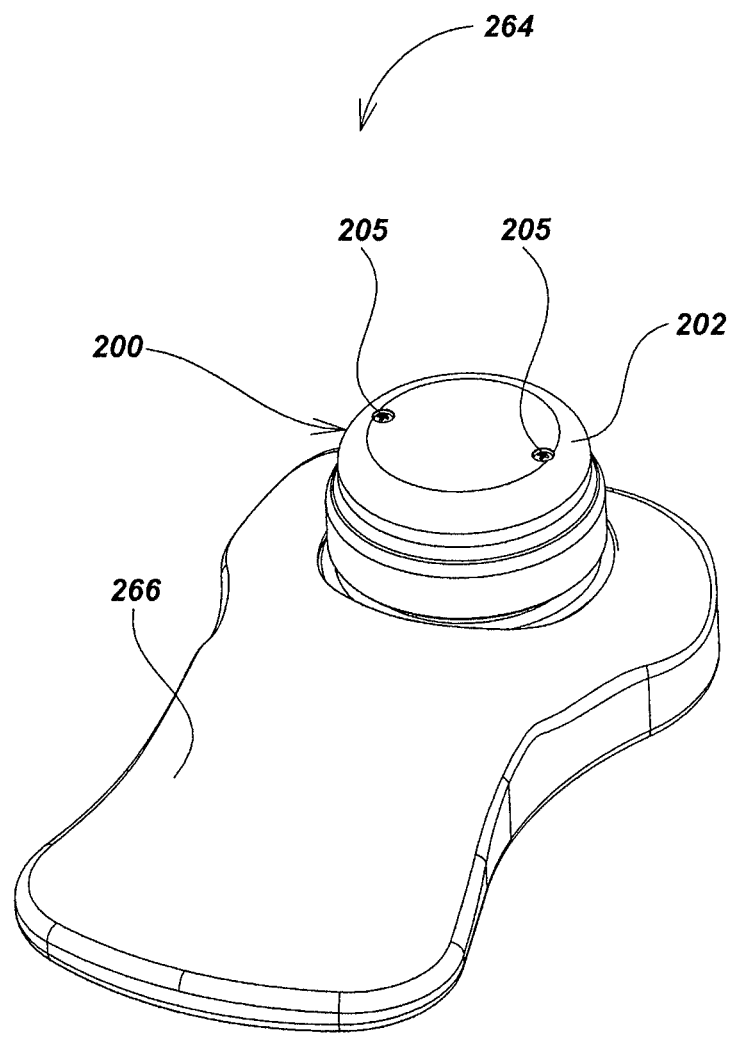
FIG. 20A is an isometric view of a manual user interface device embodiment combined with a wedge-shaped base element.
Figure 20B:
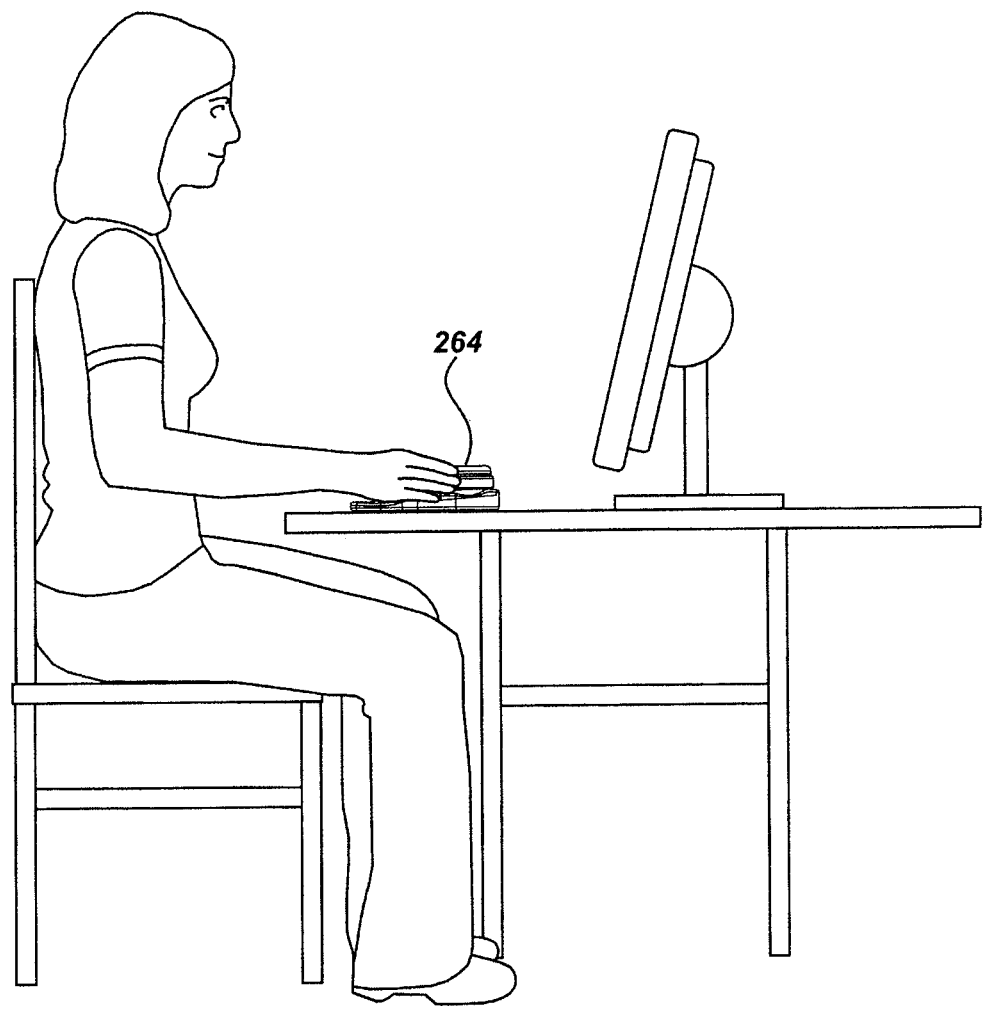
FIG. 20B is an illustration of a example user interaction with the embodiment of FIG. 20A.
Figure 20C:
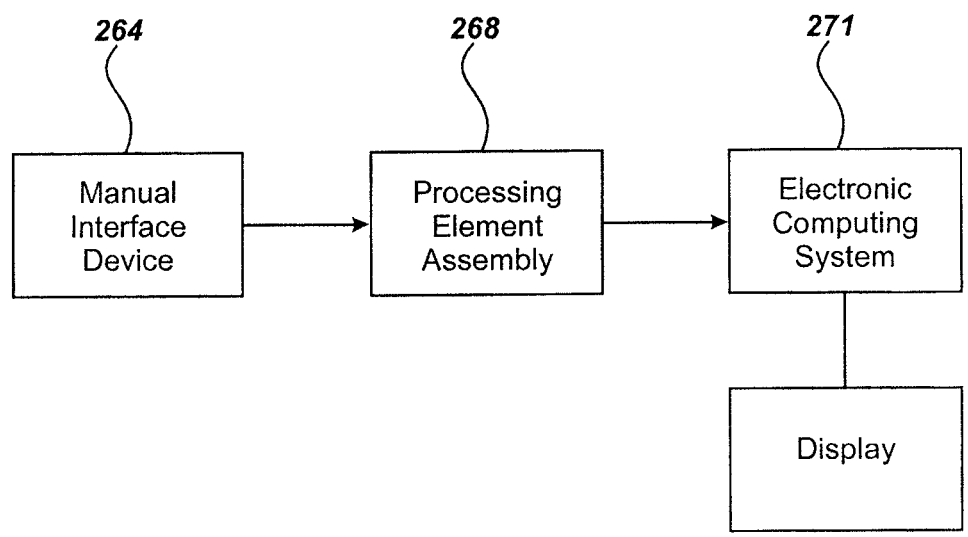
FIG. 20C is a block diagram illustrating example flow of data for the embodiment of FIG. 20A.
Figure 21:
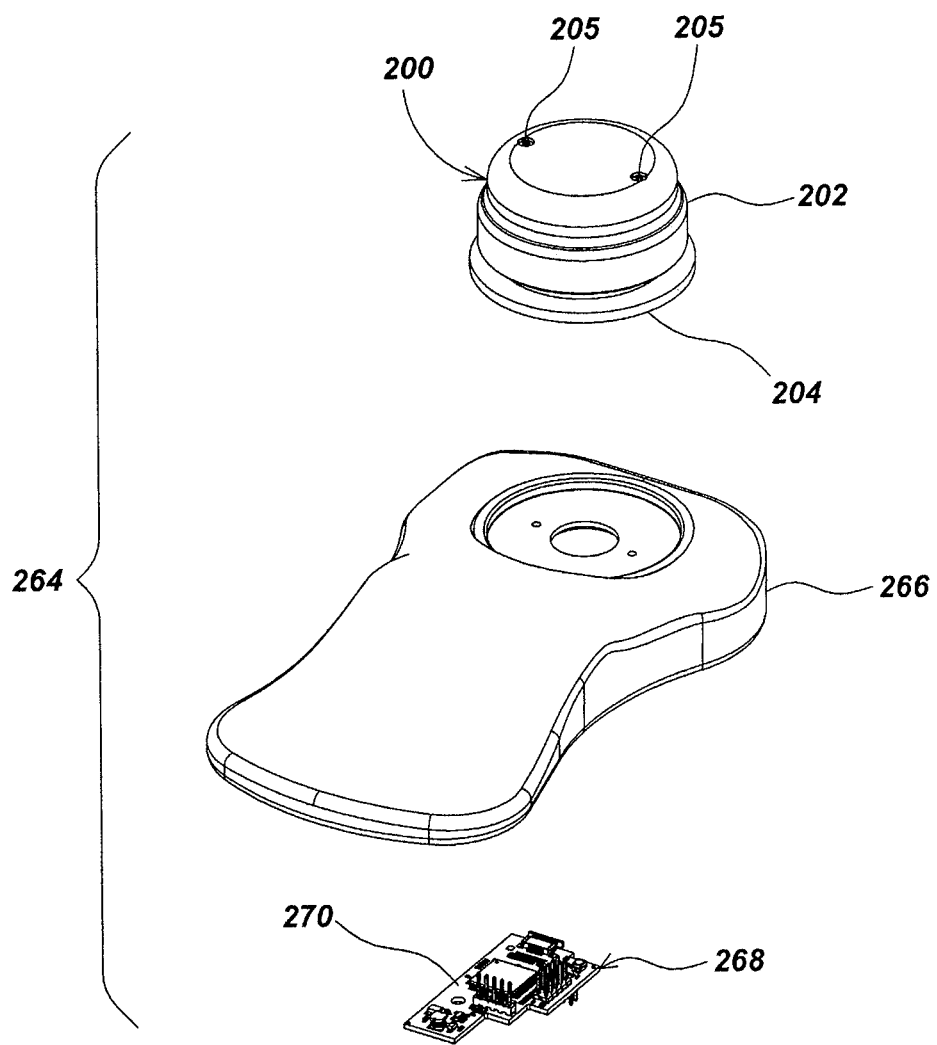
FIG. 21 is an exploded view of the embodiment of FIG. 20A seen from above.

As illustrated in FIG. 20C, data from the manual user interface device 264 may be sent to the processing element assembly 268. Once processed, command, control, display, and/or other data may be sent as an output signal from the processing element assembly 268 to an electronic computing system 271. The electronic computing system 271 may include a display or other output device, which may be used to provide output associated with the provided output signal and associated data or information.

Figure 22:
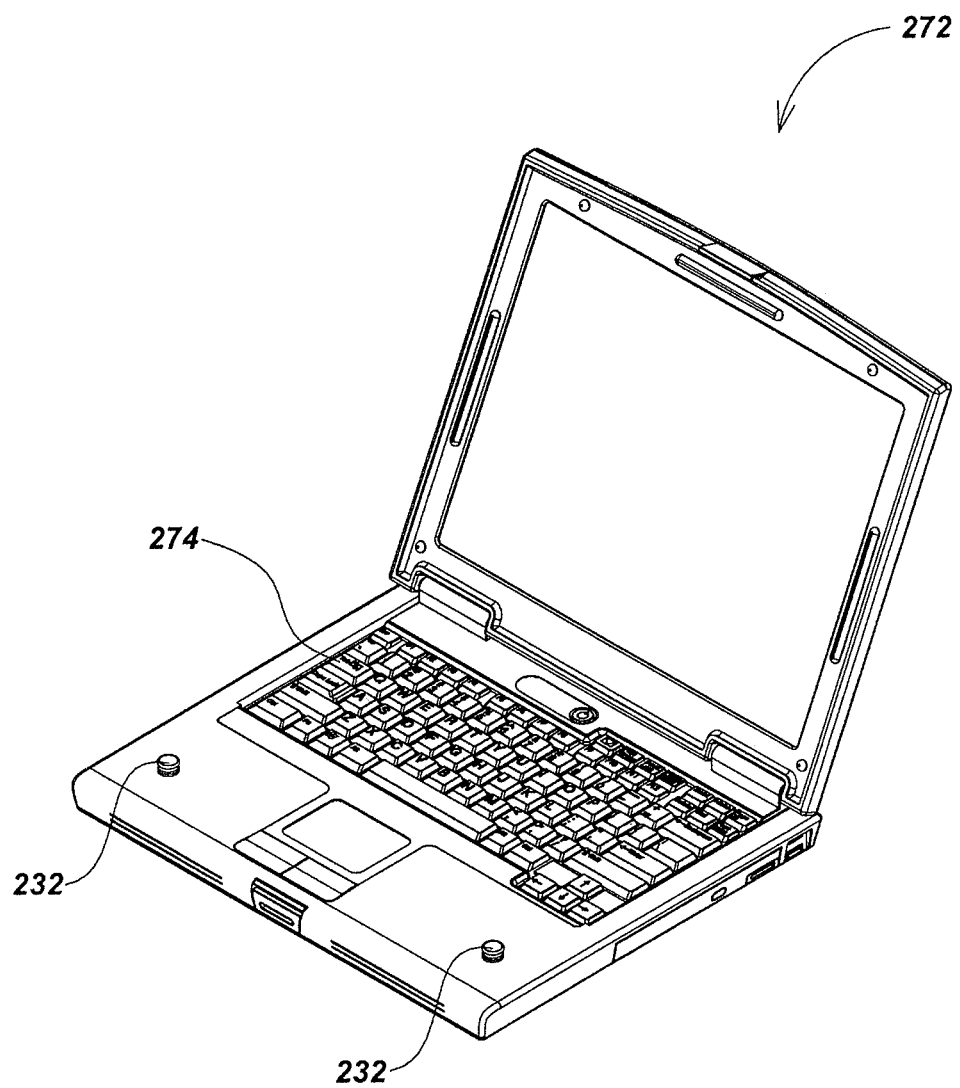
FIG. 22 is an isometric view of an embodiment of a manual user interface device incorporated into a laptop computer.

Referring to FIG. 22, in some implementations, two manual user interface devices, such as those described herein in, for example, embodiment 232 as illustrated in FIGS. 12-15, may be mounted in a notebook or laptop computer 272, or other device, such as a tablet, netbook, smart phone, PDA, and the like. Alternately, two or more user interface devices may be disposed on or in equipment, such as tools, test equipment, or other laboratory, construction, or industrial devices. By using two user devices, the two may work in tandem to provide six degrees of freedom control to the user. Laptop computer 272 as shown in FIG. 22 is but one example of an electronic computing system that may be used in combination with any embodiment. Other electronic computing systems may include a controller of a robotic arm, CAD based imaging system, remote-controlled car, etc.

In this application, the pair of manual user interface devices may be used in combination with a series of buttons 274, such as buttons in the form of a QWERTY or other keyboard. Each of the buttons 274 may also be configured as a six axis control device similar to the embodiment 232. This particular application may provide advantages for musical instrument applications in which the buttons 274 may each be used, for example, to control pitch, tonality, volume, vibrato, etc., on a particular musical note, and to which each of the buttons 274 may be sensitive to the speed or amount of pressure applied by the user. For example, multi-finger force and direction sensitive gesture may be interpreted on a keyboard comprised of a series of the buttons 274, which may be similar to the embodiment 272 (as illustrated in FIG. 22).

Figure 23:
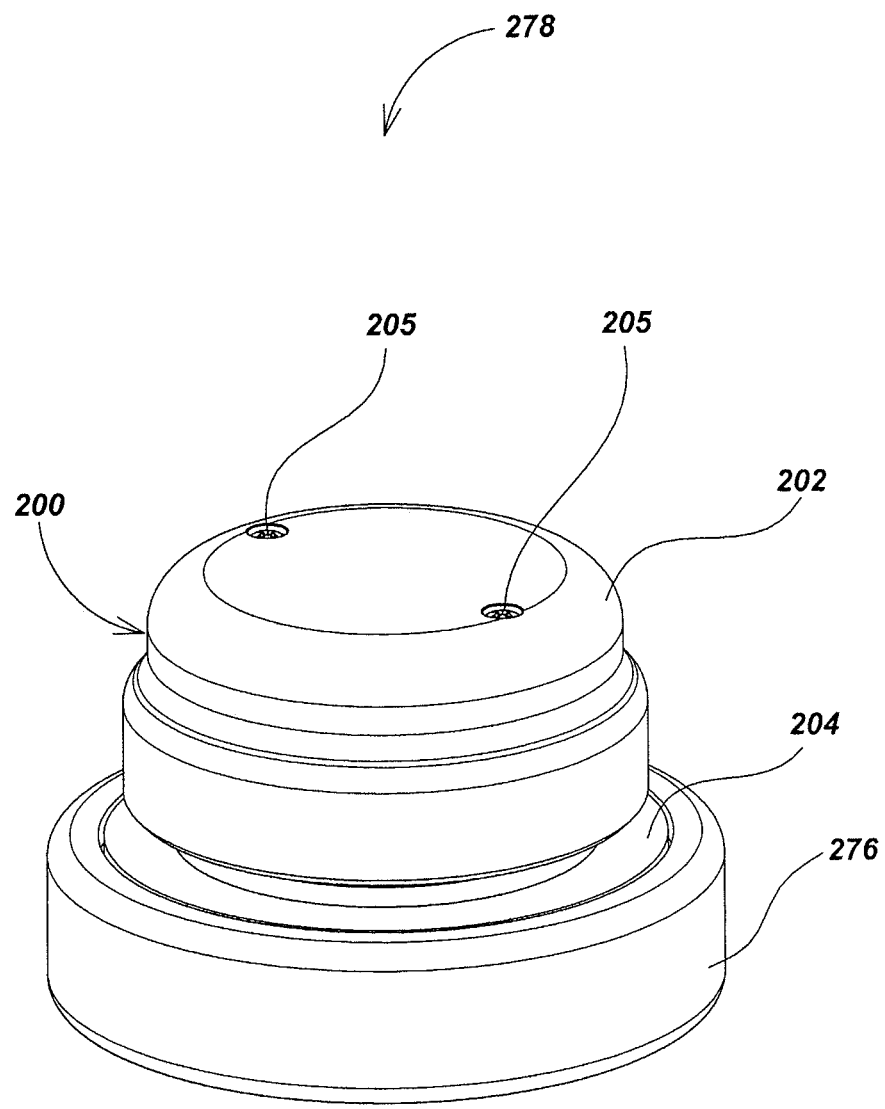
FIG. 23 is an isometric view of an embodiment of manual user interface device mounted on a heavy base element.

Referring to FIG. 23 an embodiment 278 of a manual user interface device of the general type such as is described in conjunction with FIGS. 1-5 may be equipped with a heavy base 276 constructed from any materials such as brass, copper, steel, stone, zinc, lead, or tungsten. The heavy base 276 may be secured to the bottom plate 204 and may have a generally thick construction and may contain heavy materials. The embodiment 278 relies upon the greater mass of the heavy base 276 and gravity to compensate for forces imparted by the user's manipulation of the manual actuator element 202. Rubber friction pads (not illustrated) may also be used to aid in holding the embodiment 278 stationary.

Figure 24:
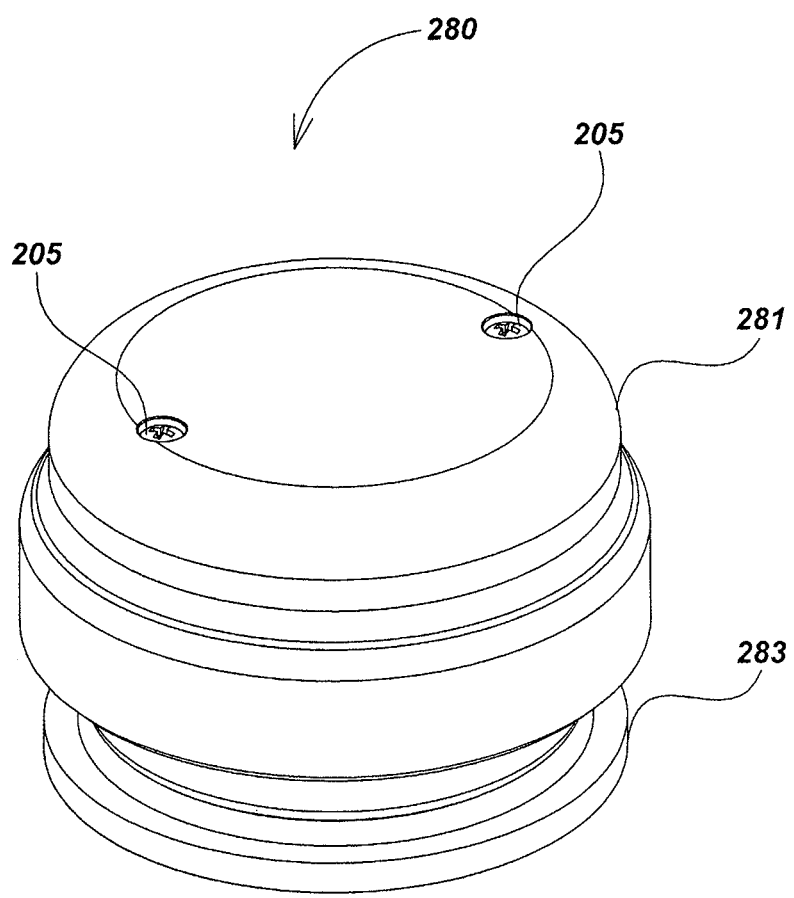
FIG. 24 is an isometric view of an embodiment of a manual user interface device including multiple springs spaced about the periphery of a bottom plate.
Figure 25:
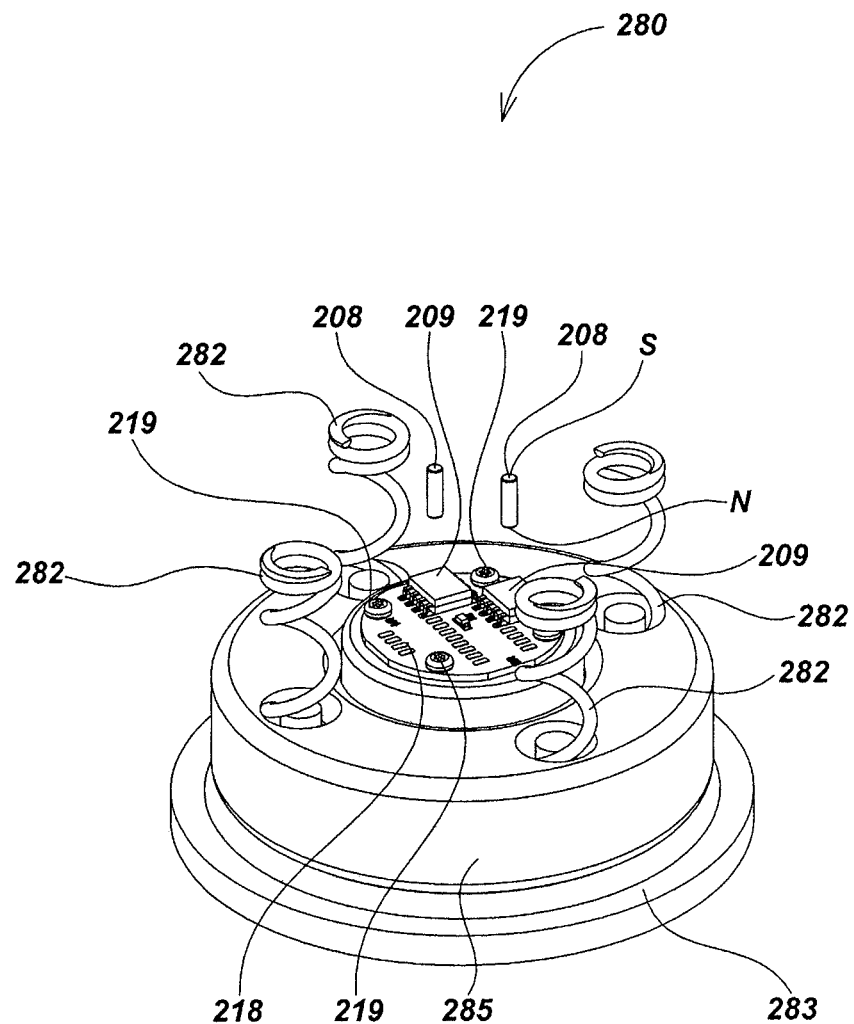
FIG. 25 is a fragmentary isometric view of the embodiment of FIG. 24.
Figure 26:
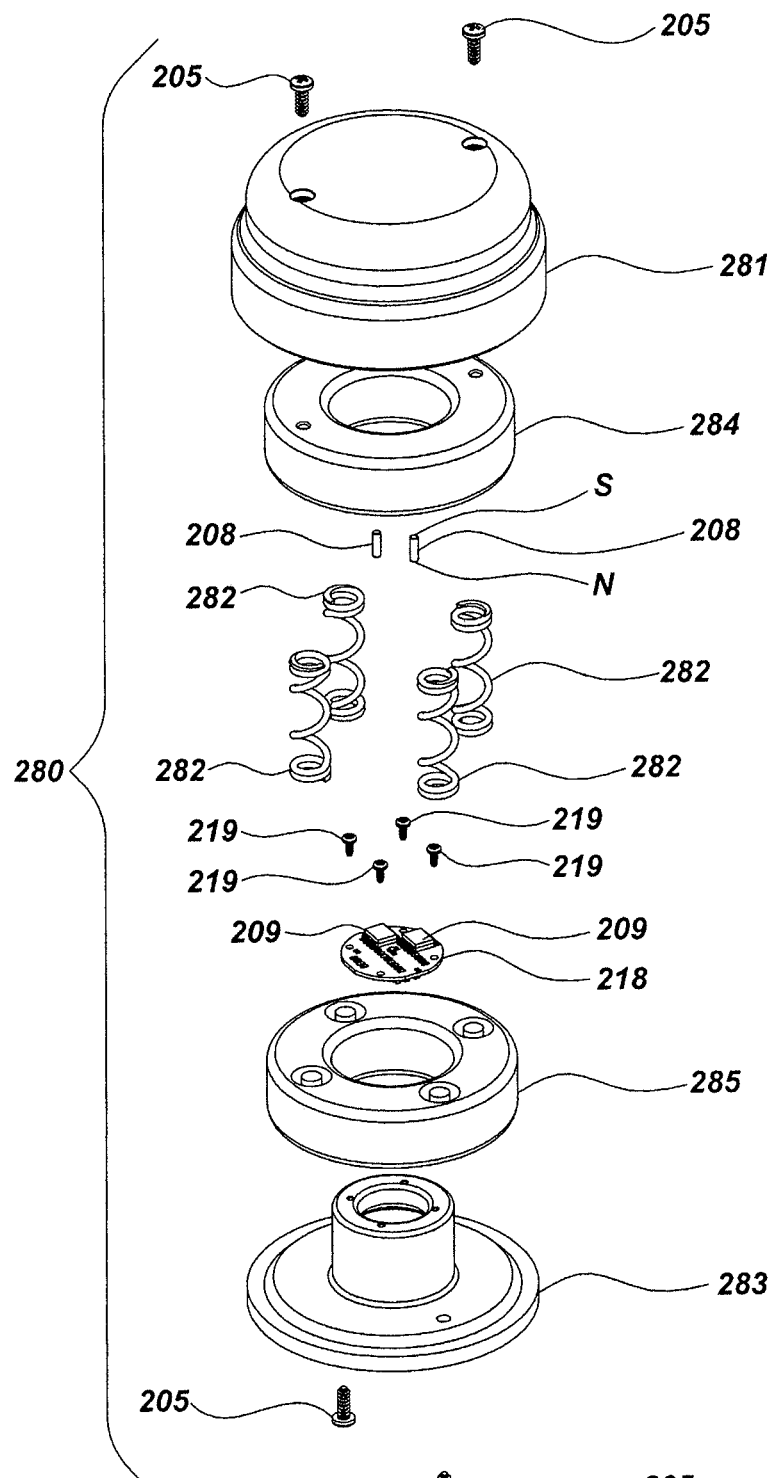
FIG. 26 is an exploded view of the embodiment of FIG. 24 seen from above.
Figure 27:
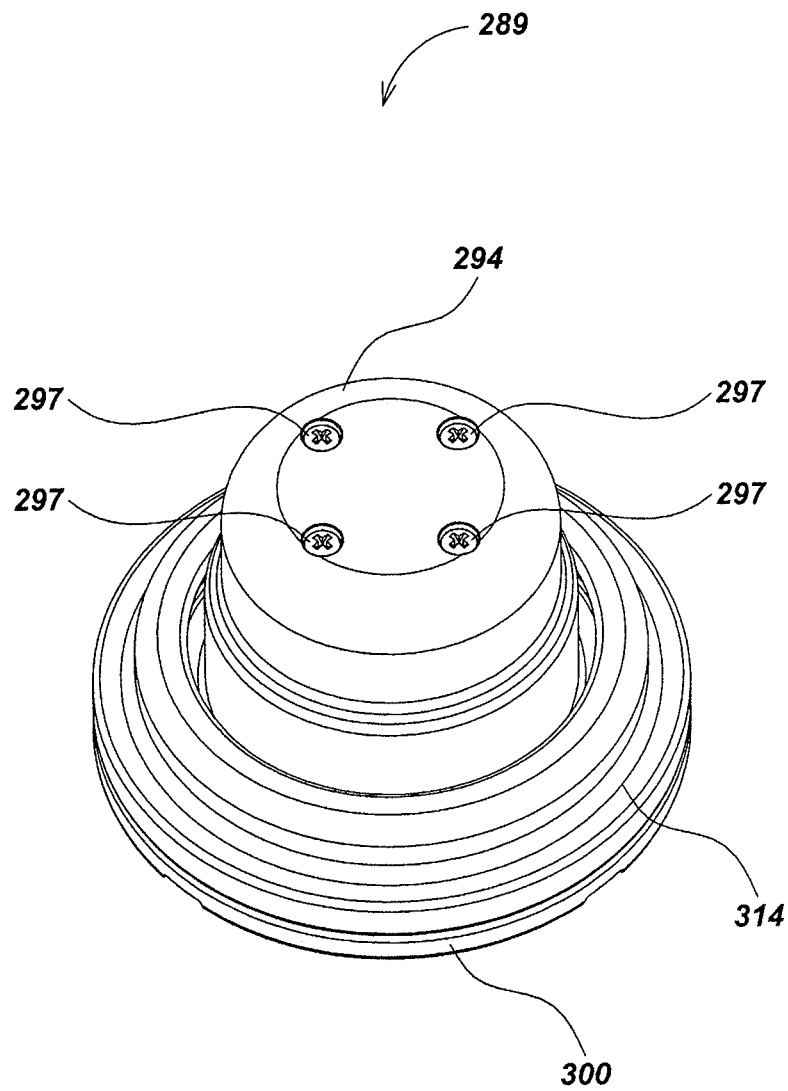
FIG. 27 is an isometric view of an embodiment of a manual user interface device including a flat wire spring, four permanent magnets, and four magnetic sensors.
Figure 28:
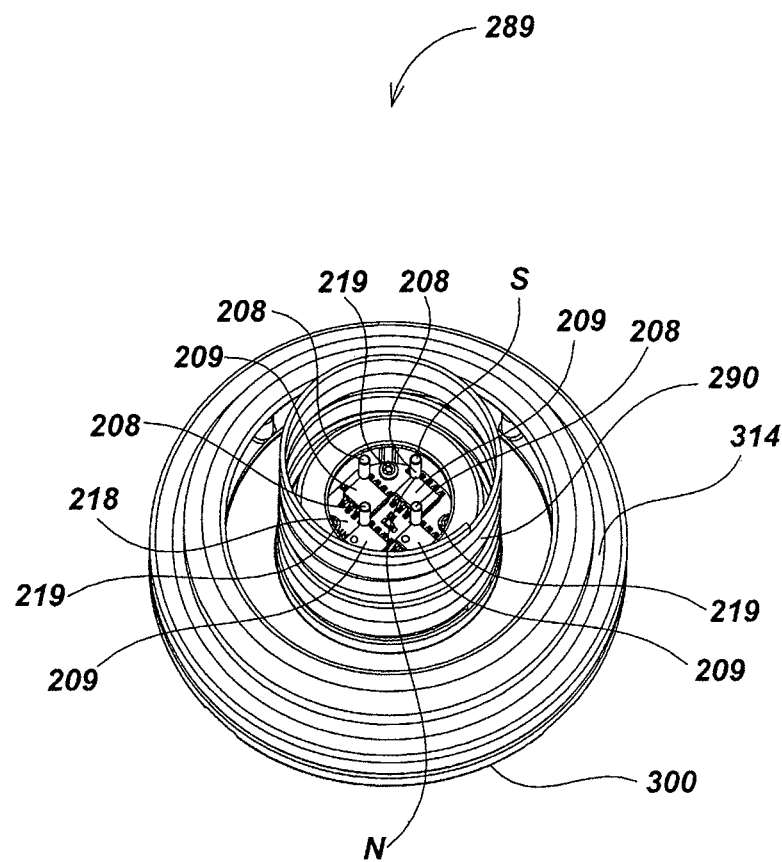
FIG. 28 is a fragmentary isometric view of the embodiment of FIG. 27.
Figure 29:
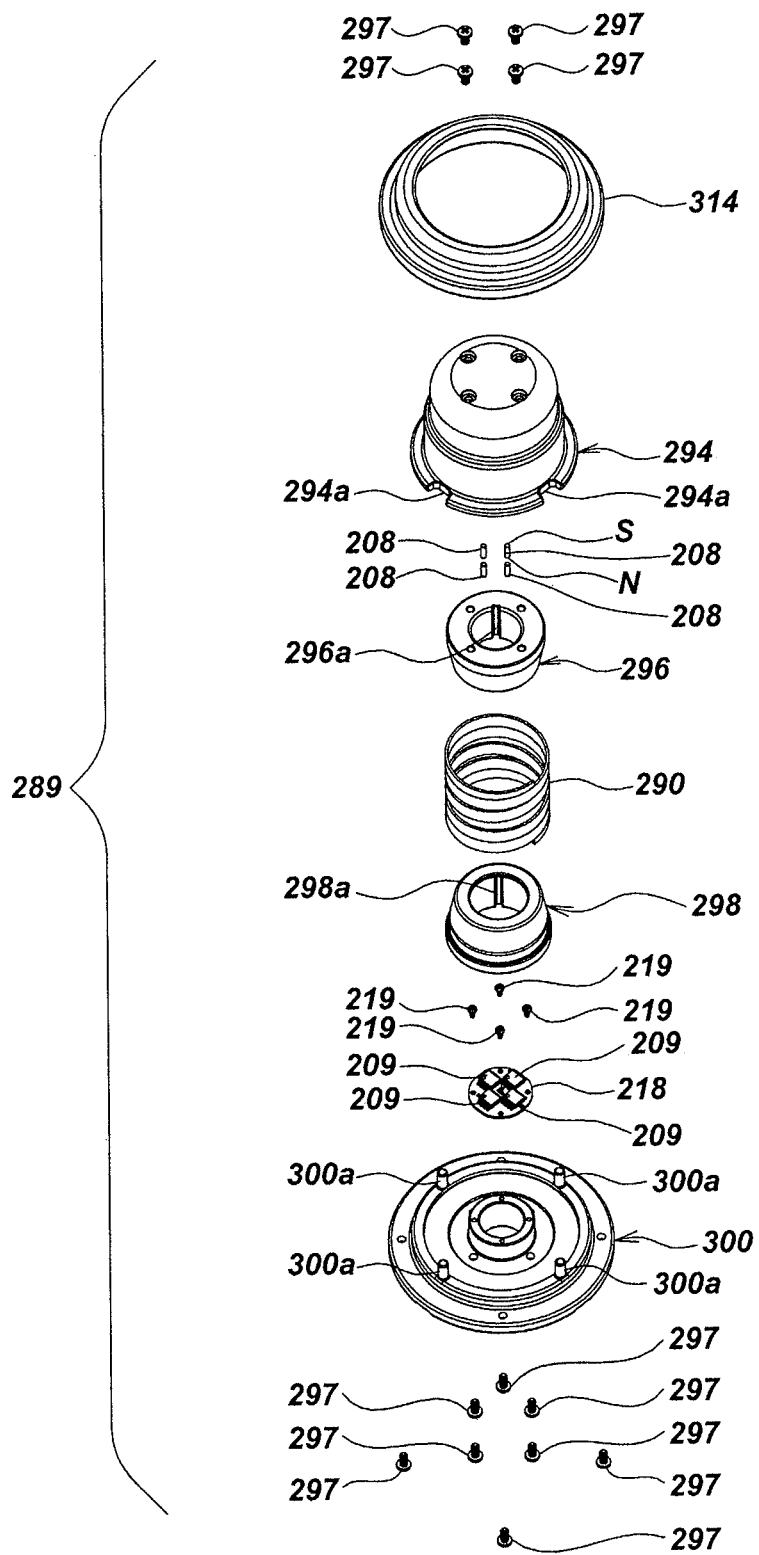
FIG. 29 is an exploded view of the embodiment of FIG. 27 seen from above.
Figure 30:
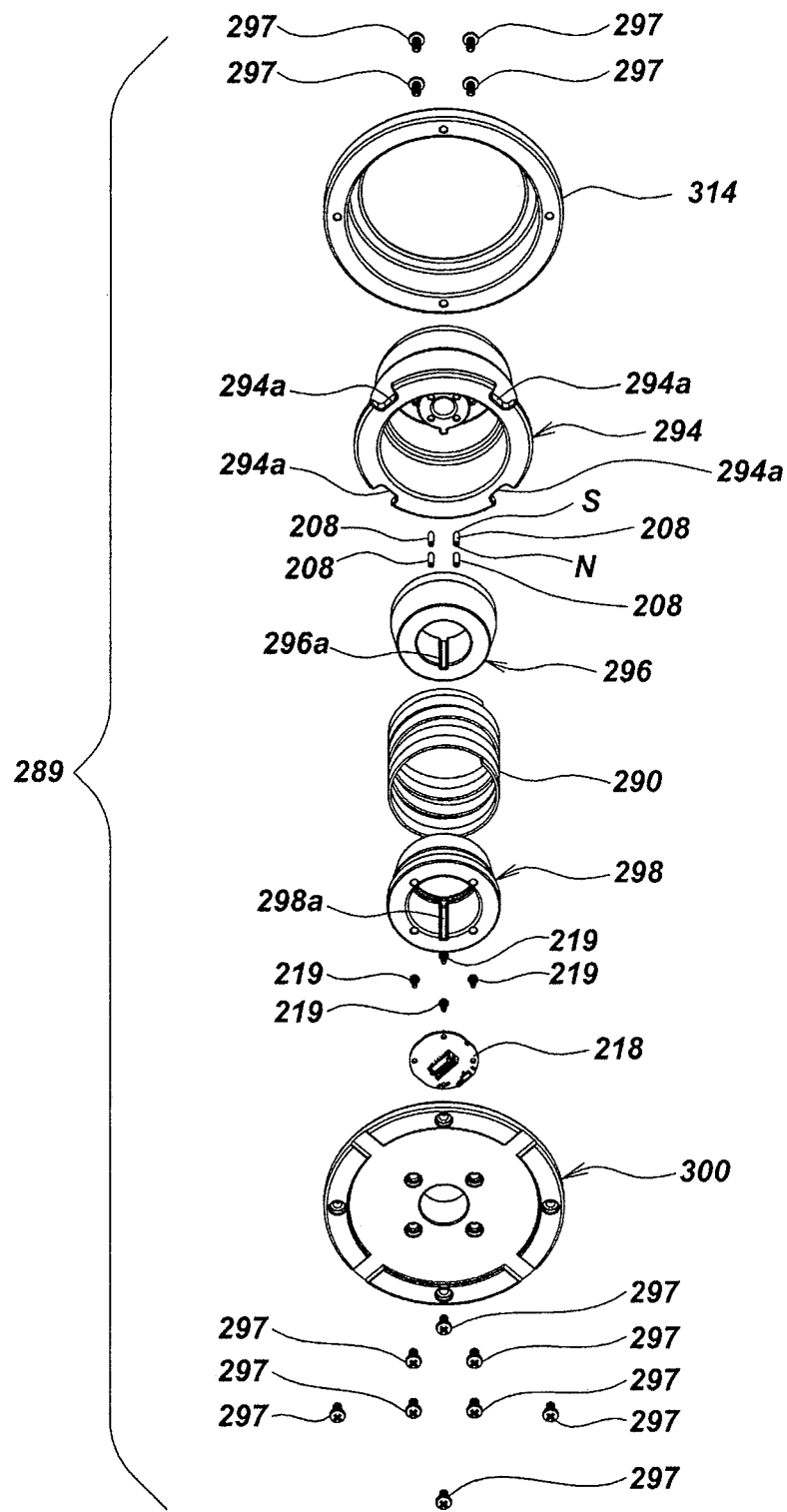
FIG. 30 is a view similar to FIG. 29 seen from below.
Figure 31:
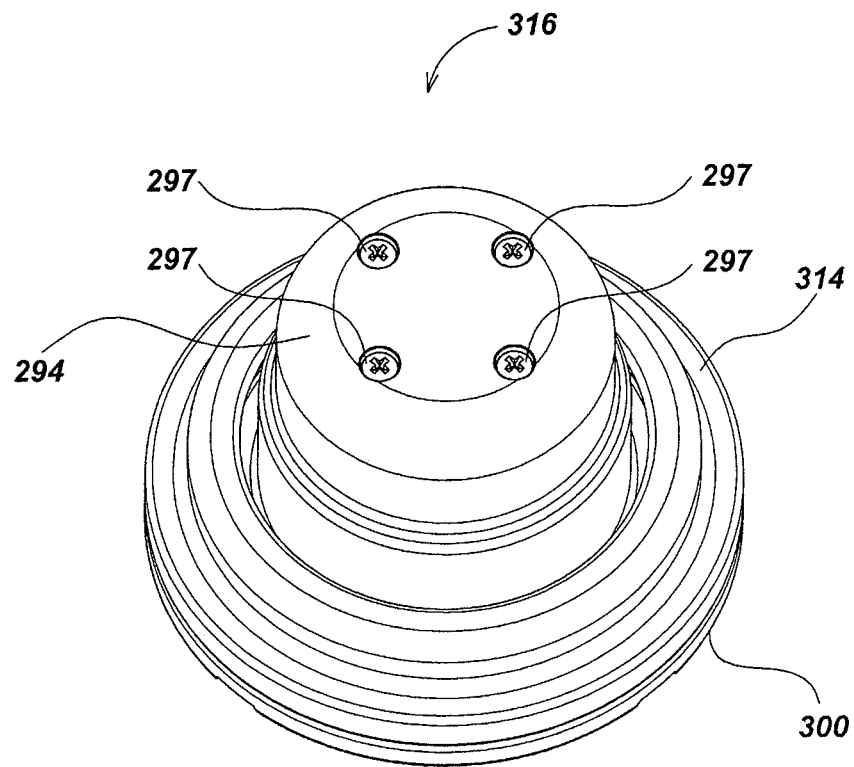
FIG. 31 is an isometric view of an embodiment of a manual user interface including a spring with a different aspect ratio, four permanent magnets, and four magnetic sensors.
Figure 32:
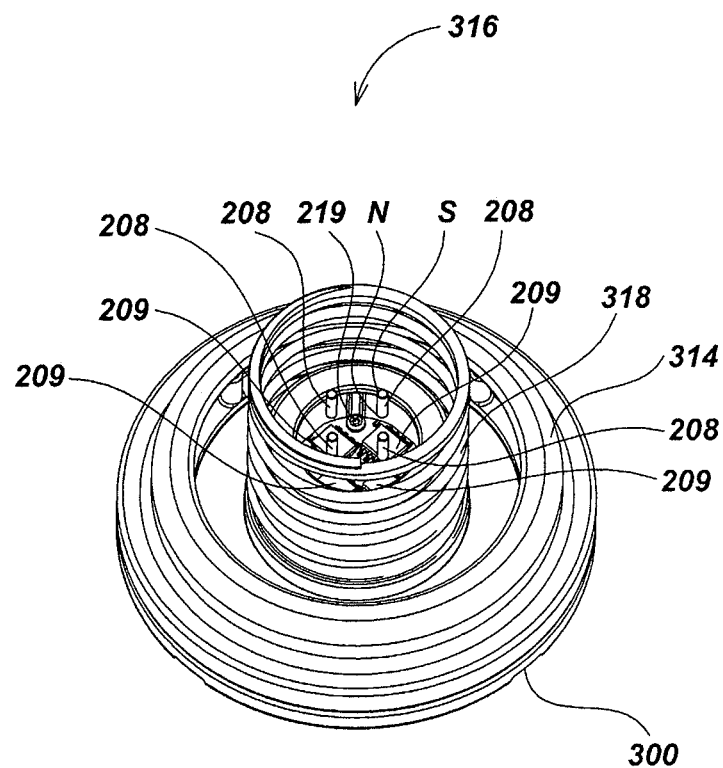
FIG. 32 is a fragmentary isometric view of the embodiment of FIG. 31.
Figure 33:
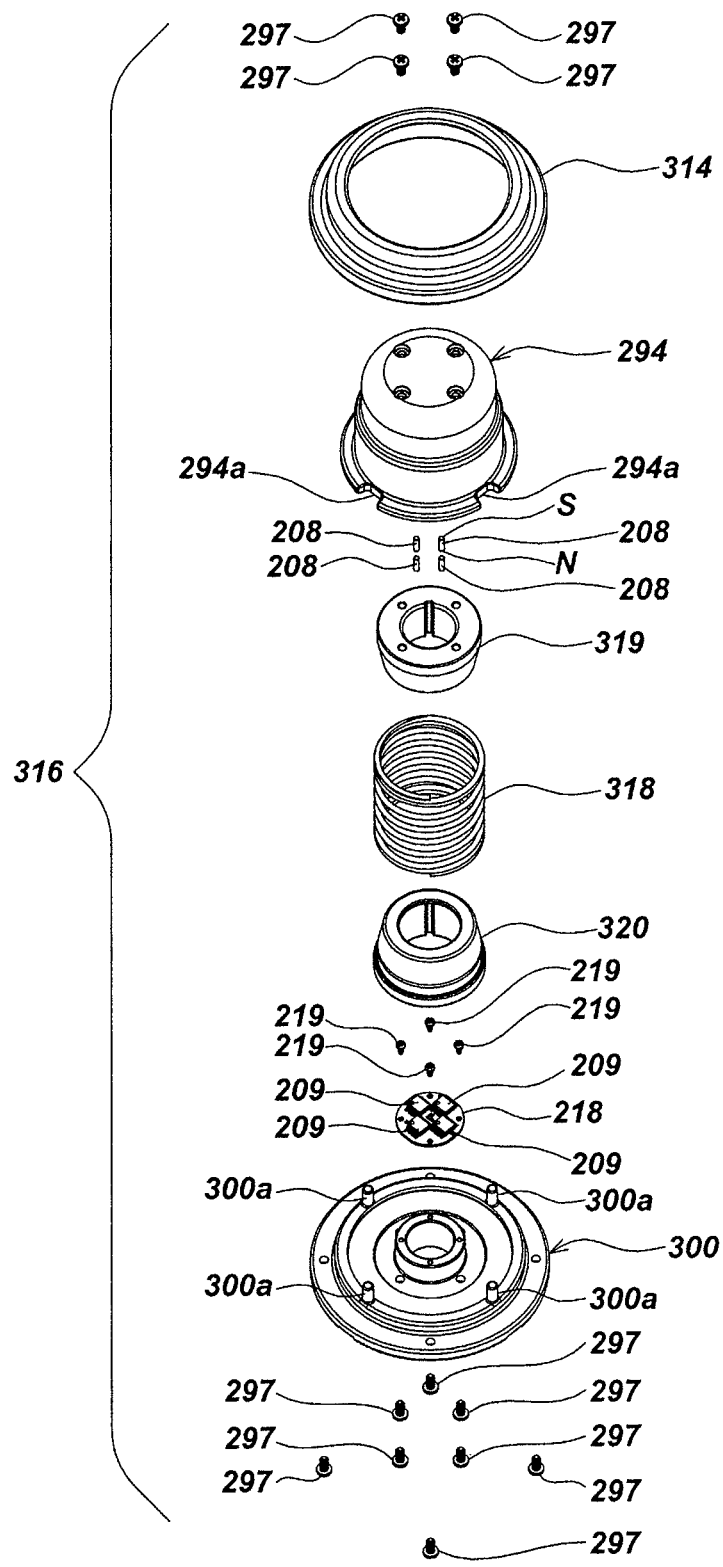
FIG. 33 is an exploded view of the embodiment of FIG. 31 seen from above.
Figure 34:
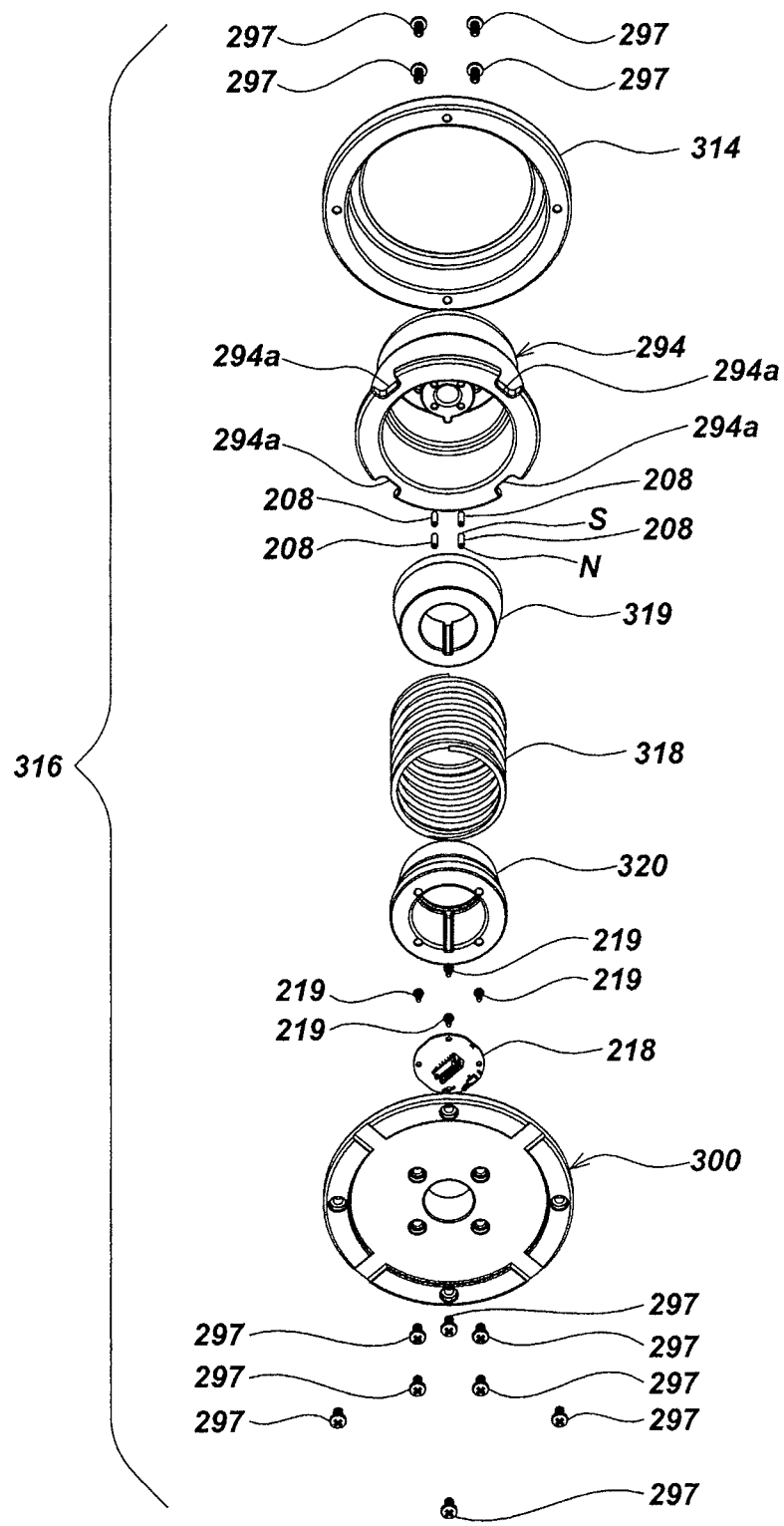
FIG. 34 is a view similar to FIG. 31 seen from below.

Referring to FIGS. 24-26, another embodiment 280 of a manual user interface device is illustrated. The embodiment 280 may utilize a pair of magnets, such as permanent magnets 208, a printed circuit board, such as printed circuit board 218, and one or more magnetic sensors, such as magnetic sensors 209, which may be the same as or similar to those described with respect to embodiment 200 of FIGS. 1-12.

The embodiment 280 may also utilize an actuator element 281, a spring mechanism including a set of circumferentially spaced coil springs 282, and a base element, such as a base plate 283. The circumferentially spaced coil springs 282 may be used to pivotably support the actuator element 281. The circumferentially spaced coil springs 282 may be each a different aspect ratio, coil pitch or wire cross section. Other spring geometries besides coil may also be used, such as leaf springs.

The permanent magnets 208 may be mounted directly into the actuator element 281. The multiple circumferentially spaced coil springs 282 may be mounted to a top mounting ring 284 and/or to a bottom mounting ring 285. The top mounting ring 284 and/or the bottom mounting ring 285 may be configured to accommodate several of the circumferentially spaced coil springs 282, and in some embodiments may not have pins or cavities.

The top mounting ring 284 may be mounted to the actuator element 281 and/or the bottom mounting ring 285 may be mounted to the base plate 283 by a connection mechanism such as a series of screws 205. The magnetic sensors 209 may be located between the circumferentially spaced coil springs 282, which may provide potential advantages. Small screws 219 may be used to mount the printed circuit board 218 to the base plate 283. In some implementations based on this embodiment, the arrangement of circumferentially spaced coil springs 282 may be used to provide a unique or distinctive tactile sensation to the user.

Referring to FIGS. 27-30, another embodiment 289 of a manual user interface device is illustrated. Embodiment 289 may include a spring mechanism comprising a spring, such as flat wire spring 290, as well as a set of a plurality of permanent magnets, such as four permanent magnets 208 as shown, along with a corresponding set of magnetic sensors, such as magnetic sensors 209 as shown.

In this embodiment, each of the four permanent magnets 208 may be evenly spaced and may be mounted about the top inside of an actuator element 294. The actuator element 294 may be substantially dome shaped and may be formed with a series of notches 294a around the lower lip. A top annular mounting piece 296 and a bottom annular mounting piece 298 may be mounted on the top and bottom ends of the flat wire spring 290 accordingly, which may be done by heating the ends of the flat wire spring 290 through magnetic induction, such as described previously herein.

The top annular mounting piece 296 may be mounted about the top of the inside of the actuator element 294, which may be done by, for example, a set of medium screws 297. The bottom annular mounting piece 298 may be mounted to a bottom disk 300 similarly by the medium screws 297. A bottom disk 300 may be molded with an elevated platform that fits inside the bottom annular mounting piece 298. A printed circuit board or other substrate 218, which may contain a plurality of magnetic sensors, such as four magnetic sensors 209, may be mounted using small screws 219.

The four magnetic sensors 209 may be circumferentially spaced about the printed circuit board 218. The bottom disk 300 may also contain a set of posts, such as the four circumferentially spaced posts 300a shown. These may correspond to notches 294a on the bottom lip of the actuator element 294. The notches 294a may be configured as such to limit certain movements to prevent over-extension of the flat wire spring 290. A ring casing 314 may be used to concentrically enclose the bottom lip of the actuator element 294, and may be mounted by the medium screws 297 to the bottom disk 300. The embodiment 289 may be beneficial in applications where a softer response in lateral movements about the horizontal axes is desired in the actuator element, and a stiffer response is desired in the rotations thereof. Referring still to FIGS. 27-30, a top annular mounting piece aligning feature 296a and a bottom annular mounting piece aligning feature 298a are illustrated. As noted before, it may be advantageous during manufacturing to use a method by which magnetic induction may heat the flat wire spring 290, thereby allowing it to melt into the thermoplastic materials of the top annular mounting piece 296 and the bottom annular mounting piece 298 so that these components are aligned as precisely as possible. By adding the top annular mounting piece aligning feature 296a and the bottom annular mounting piece aligning feature 298a, a more precise alignment of the top annular mounting piece 296 and the bottom annular mounting piece 298 about the flat wire spring 290 may be achieved by keying these components to an alignment fixture (not illustrated) during the magnetic induction process (such as described with respect to FIG. 11).

FIGS. 31-34 illustrate another embodiment 316 of a manual user interface device which is similar to that of the embodiment 289 shown in FIGS. 27-30 except that the spring mechanism may comprise a spring of a different aspect ratio 318 in place of the flat wire spring 290, a top ring-shaped mounting component 319 instead of the top annular mounting piece 296, and a bottom ring-shaped mounting component 320 instead of the bottom annular mounting piece 298. The spring of different aspect ratio 318 may have an approximately similar diameter to the flat wire spring 290 of FIGS. 28-30 but may otherwise be of greater length and may contain more coils. As used herein, the term "different aspect ratio" refers to any different coil pitch, number of coils, wire size and shape, and/or material of the spring. By controlling the coil pitch, number of coils, and/or wire size and shape of the spring, the characteristics of the actuator element's response to a user's input can be further tailored and controlled.

Figure 35:
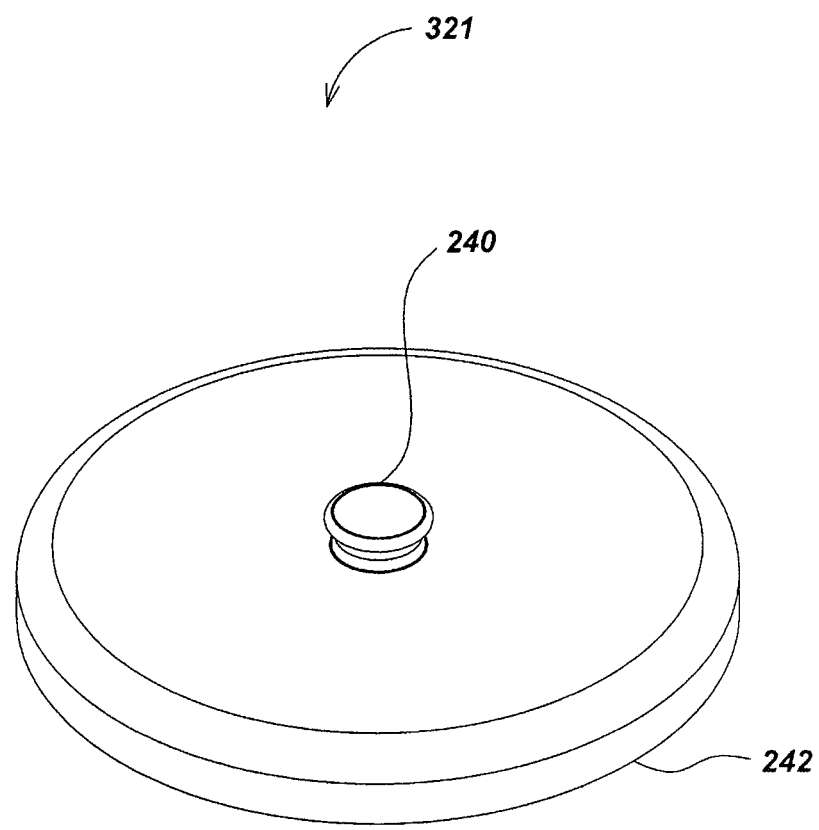
FIG. 35 is an isometric view of an embodiment of a manual user interface device including a conical magnet.
Figure 36:
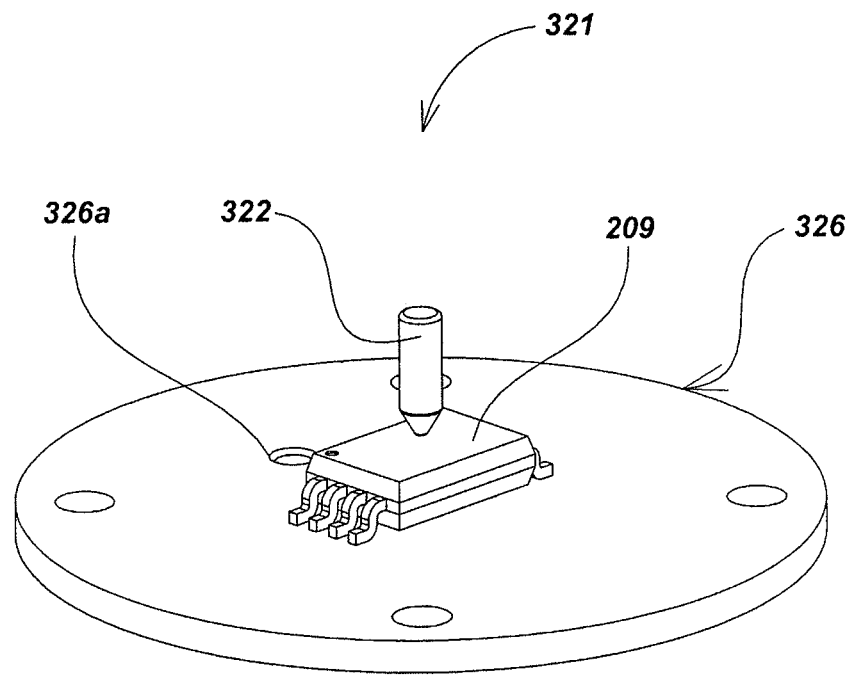
FIG. 36 is a fragmentary isometric view of the embodiment of FIG. 35.
Figure 37:
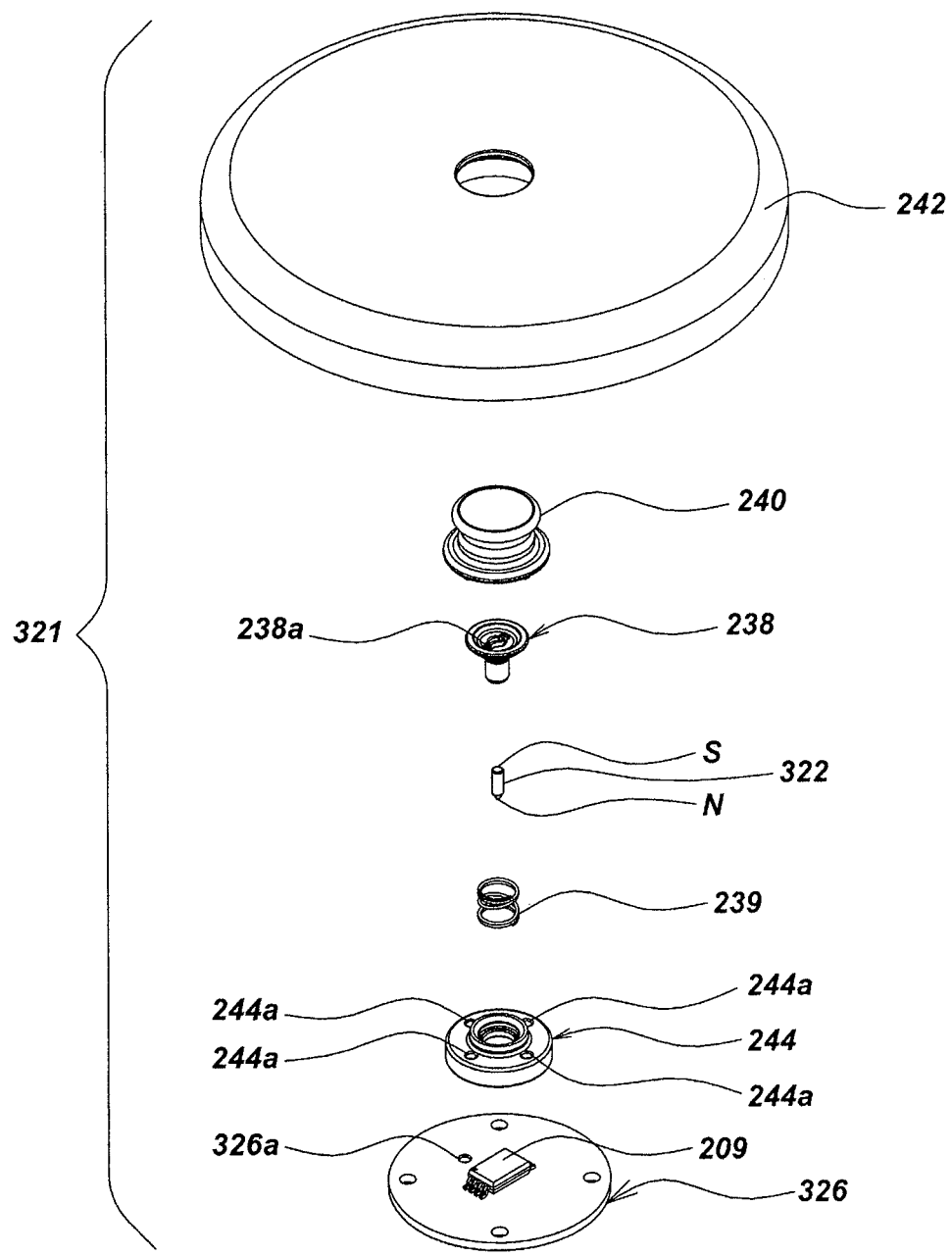
FIG. 37 is an exploded view of the embodiment of FIG. 35 seen from above.

Referring to FIGS. 35-37, another embodiment 321 of a manual user interface device utilizing a conical tip permanent magnet 322 is shown. The manual user interface device of the embodiment 321 is similar to the configuration illustrated in the embodiment 232 (as illustrated in FIGS. 12-15) with the exception of the conical tip permanent magnet 322, one of the magnetic sensors 209, and a keyed substrate, such as a keyed printed circuit board for single die sensors 326. For example, the keyed printed circuit board for single die sensors 326 may contain a single die sensor circuit board keying feature 326a. The symmetry of the conical tip permanent magnet 322 about the Z axis may be used to makes sensing its rotation about the Z axis largely indiscernible by one or any number of magnetic sensors. Various shapes and sizes of magnetic pole pieces (not illustrated) may be placed on the underside of the keyed printed circuit board for single die sensors 326 to shape the magnetic field from the conical tip permanent magnet 322 to alter the response of the magnetic sensor 209 to displacements of the conical tip permanent magnet 322. Similarly, magnet pole pieces may be used to shape the magnetic fields in other embodiments of the invention.

Figure 38:
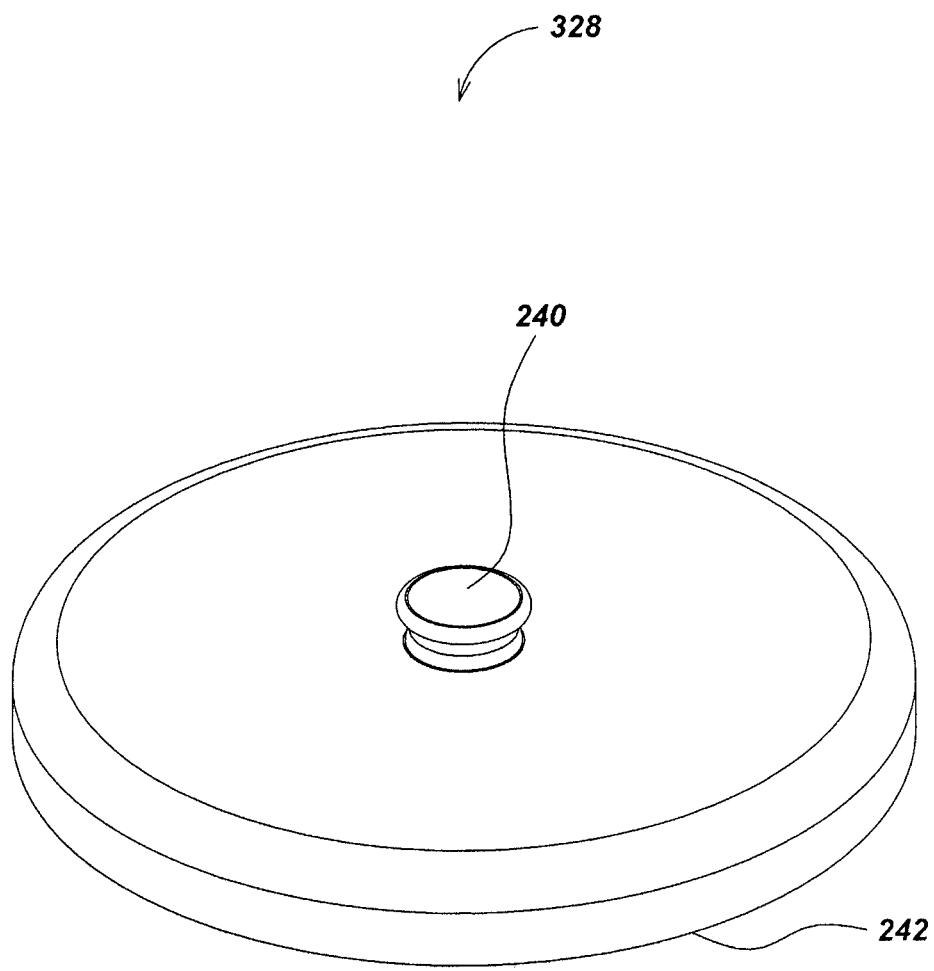
FIG. 38 is an isometric view of an embodiment of a manual user interface device including a chisel tip magnet.
Figure 39:
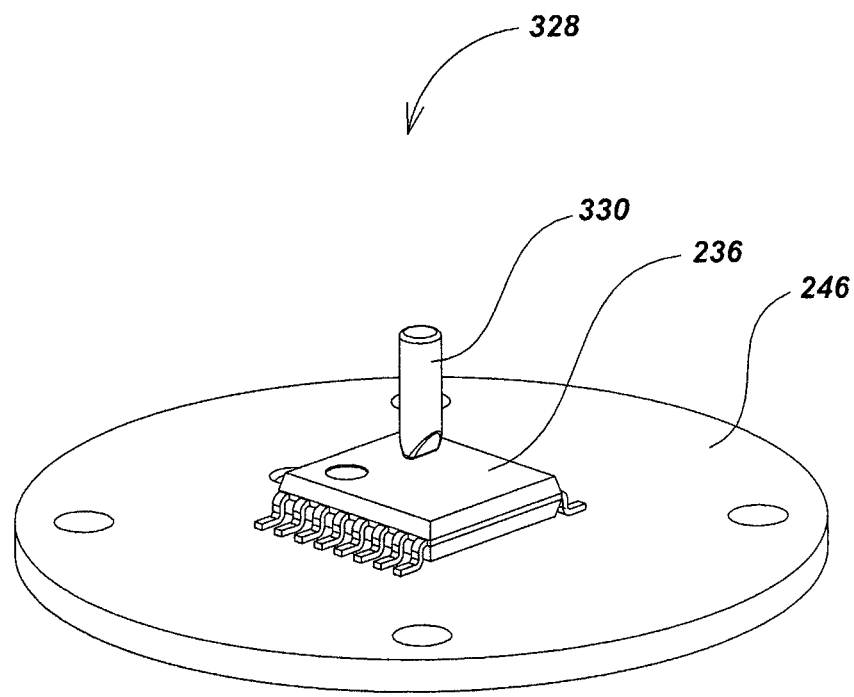
FIG. 39 is a fragmentary isometric view of the embodiment of FIG. 38.
Figure 40:
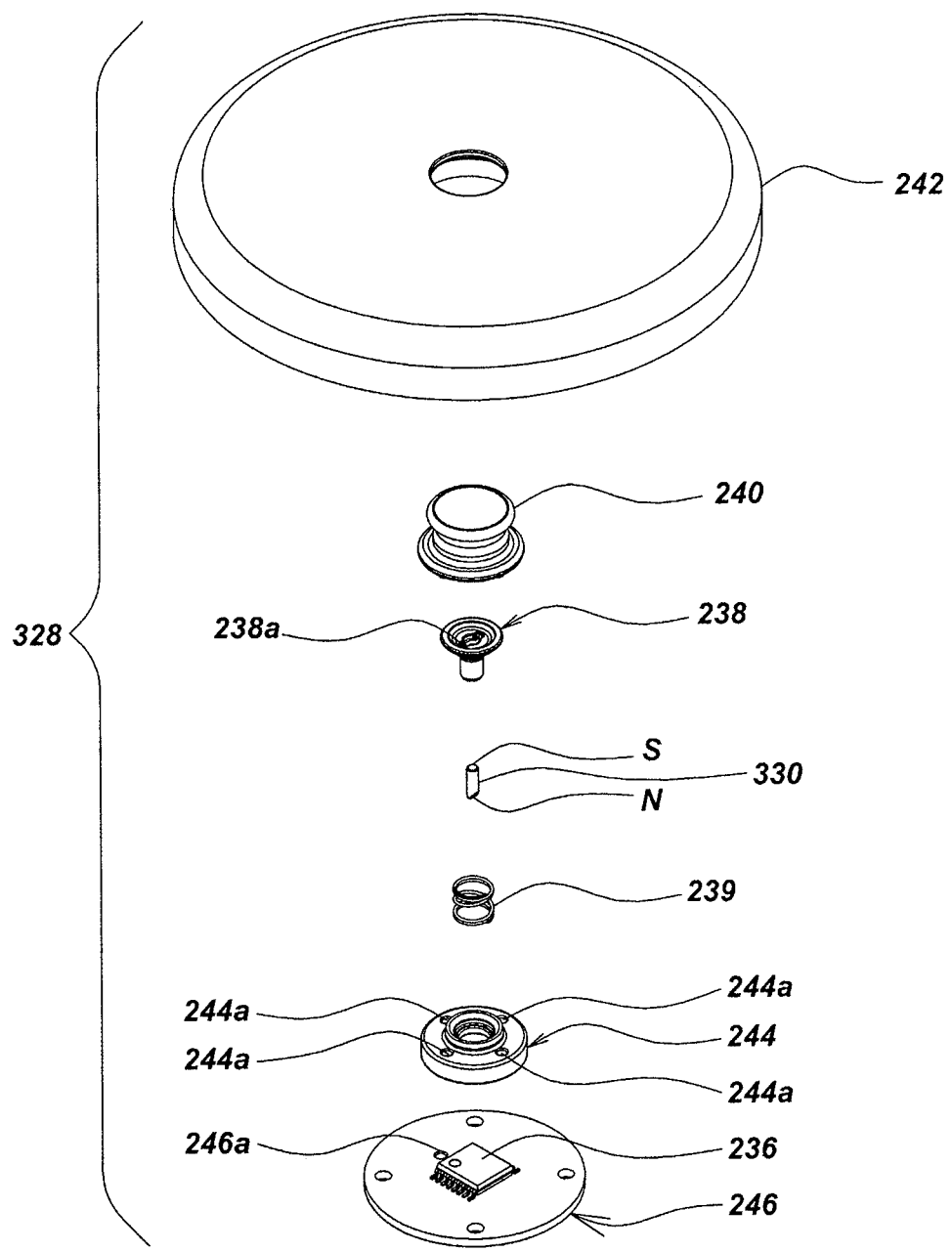
FIG. 40 is an exploded view of the embodiment of FIG. 38 seen from above.
Figure 41:
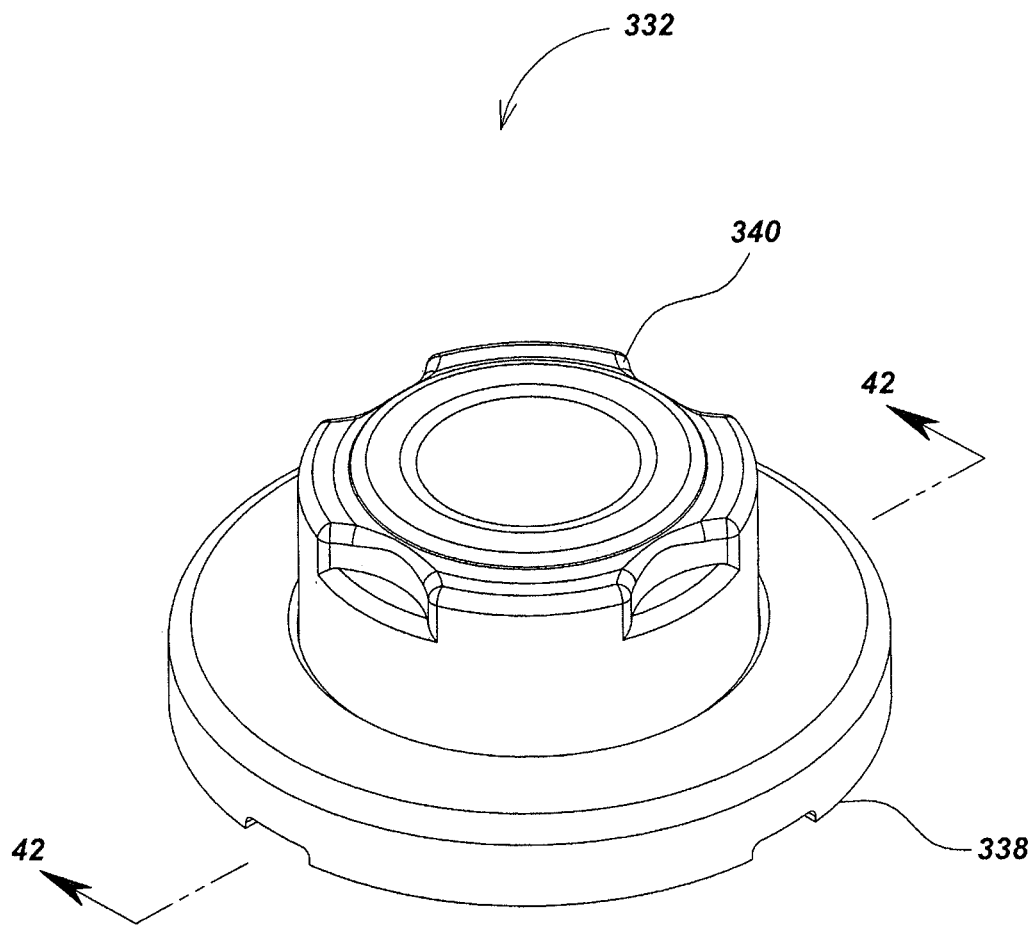
FIG. 41 is an isometric view of as embodiment of a manual user interface device including a clover leaf shaped printed circuit board.

Referring to FIGS. 38-40, another embodiment 328 of a manual user interface device utilizing a chiseled tip permanent magnet 330 is shown. The embodiment 328 is similar to the embodiment 232 as shown in FIGS. 12-15, with the exception of the chisel tip permanent magnet 330. The chisel tip permanent magnet 330 of the embodiment 328 may have a lower end in the form of a chisel tip. Unlike the conical shaped tip of the conical tip permanent magnet 322 (as illustrated in FIGS. 36-37), the chisel tip of the chisel tip permanent magnet 330 may be rotationally asymmetrical about the Z axis. Because of the asymmetry about the Z axis, rotation about each axis, particularly the Z axis, may be sensed by the dual die magnetic sensor 236 attached to the keyed printed circuit board 246. This embodiment illustrates how different shaped magnets may produce different results than a single one of the permanent magnets 208 (as illustrated in the embodiments of FIGS. 13-15) or than that of the conical shaped tip of the conical tip permanent magnet 322 (as illustrated in the embodiments of FIGS. 36-37).

Figure 43:
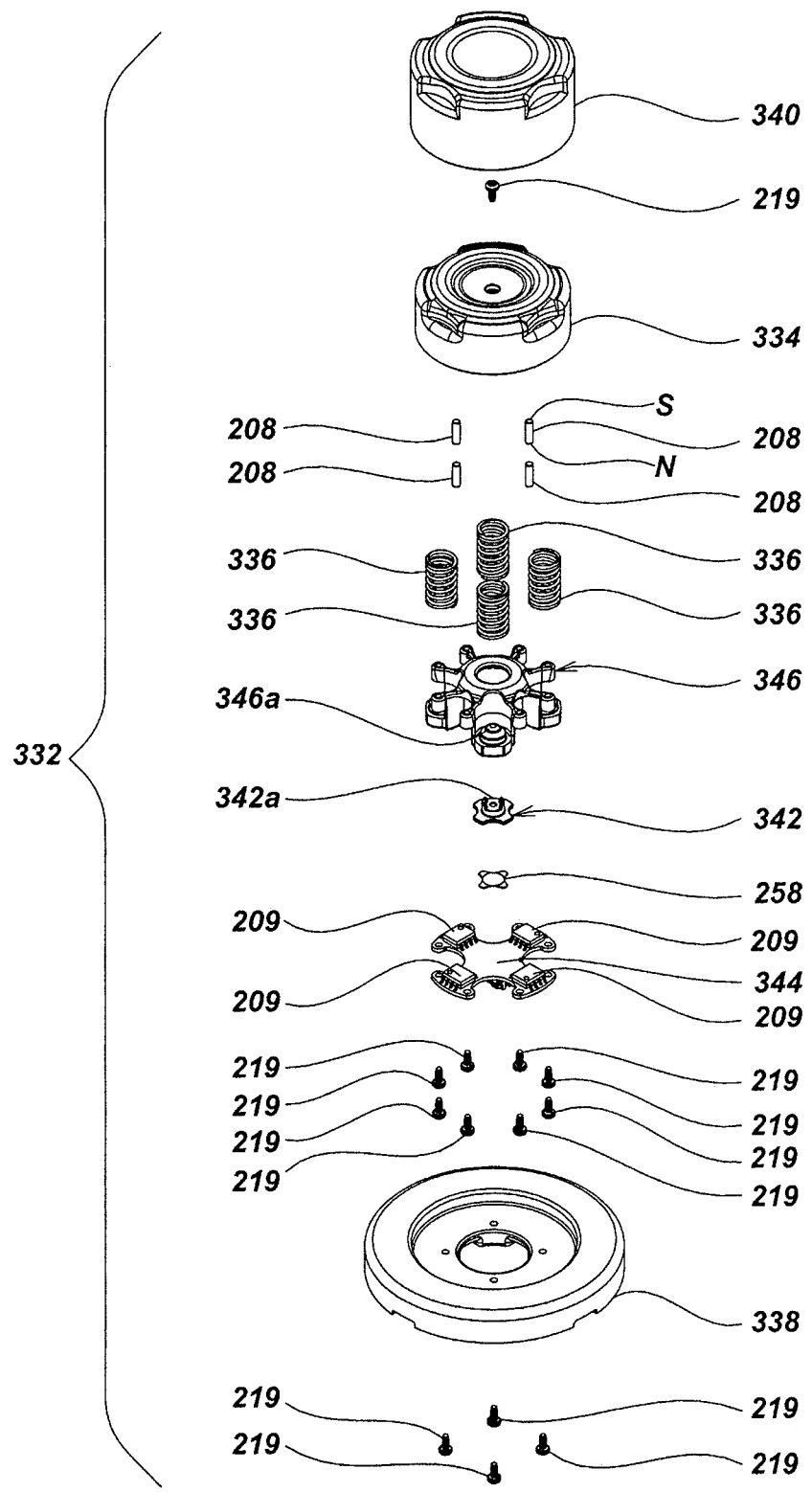
FIG. 43 is a reduced exploded view of the embodiment of FIG. 41 seen from above.
Figure 44:
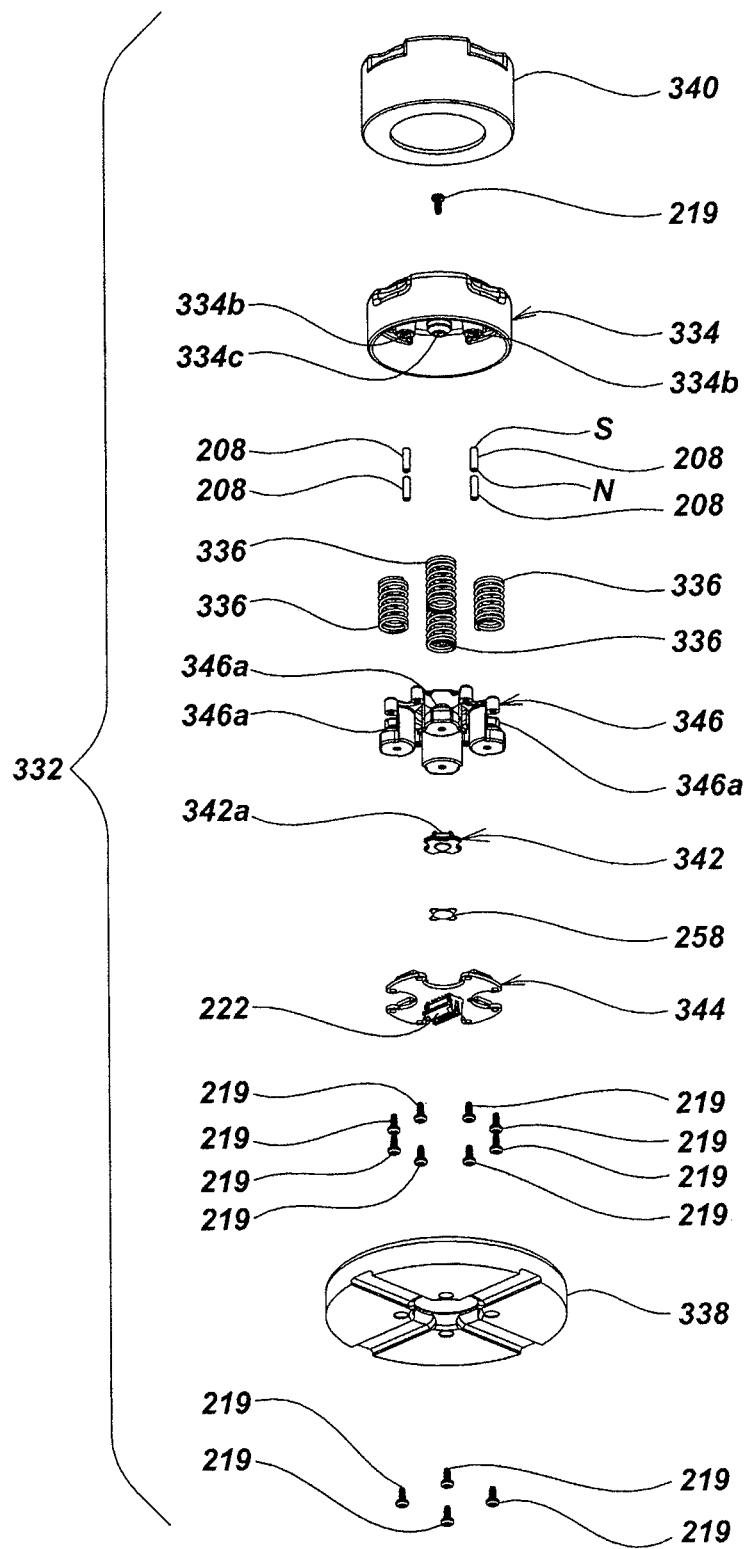
FIG. 44 is an exploded view similar to FIG. 43 seen from below.
Figure 45:
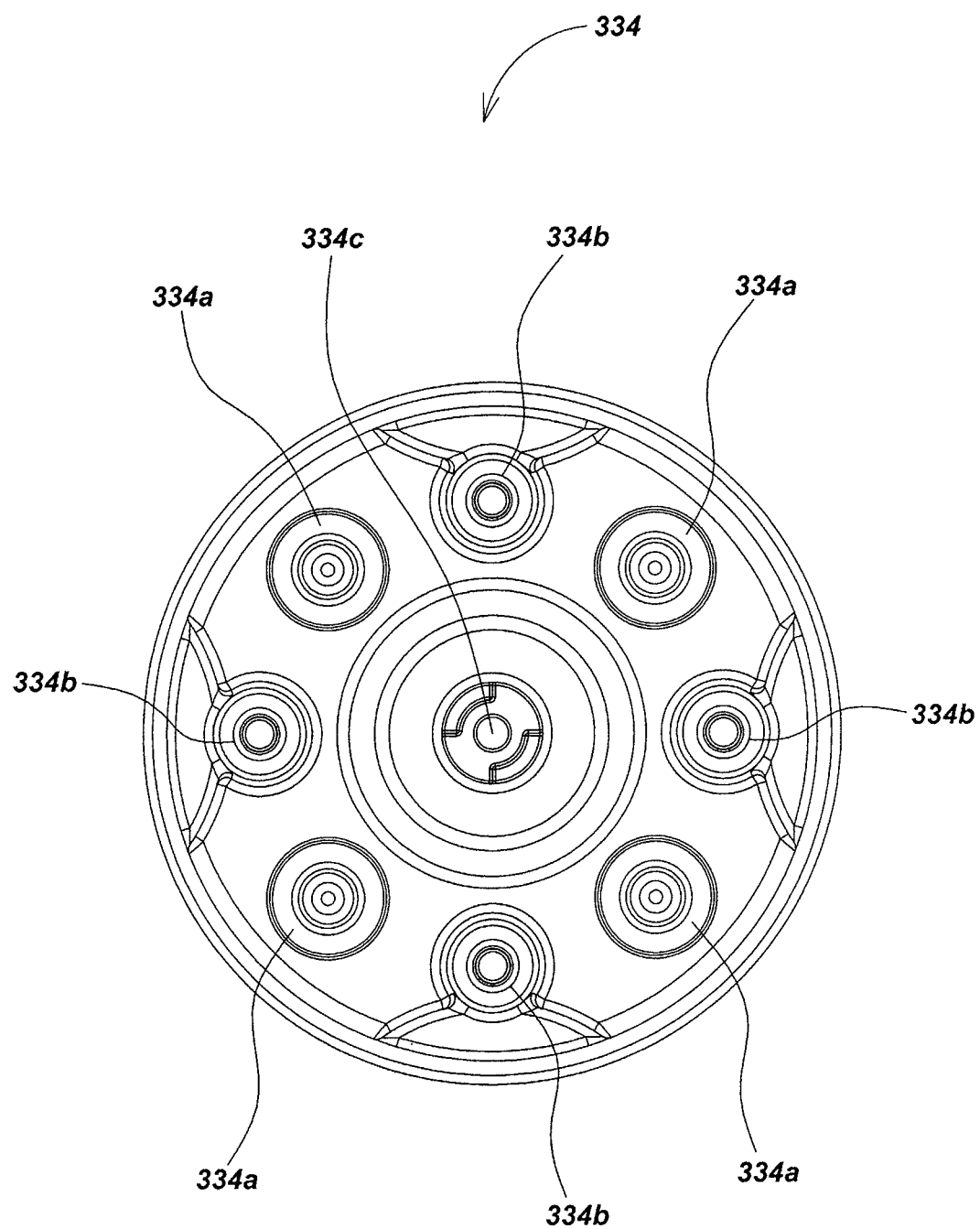
FIG. 45 is an enlarged sectional bottom view of an embodiment of a scalloped-edge actuator.

Referring to FIGS. 41-45, another embodiment 332 of a manual user interface device is illustrated. Embodiment 332 may include an actuator element, which may be a scalloped-edge actuator element 334, which may be substantially dome shaped as shown, as well as a base element such as bottom base element 338. The scalloped-edge actuator element 334 may be encased by an over-molded elastomeric covering 340. Internally and along the bottom surface of the scalloped-edge actuator element 334 a series of four top spring captures 334a (as best illustrated in FIG. 45) and/or a series of four magnet mounts 334b (as best illustrated in FIG. 45) may be formed. The magnet mounts 334b may be formed to secure the permanent magnets 208 (e.g., in this example four magnets 208) to the scalloped-edge actuator element 334. Each of the permanent magnets 208 may be oriented with the South poles facing towards the bottom of the scalloped-edge actuator element 334 and the North poles facing towards four of the magnetic sensors 209.

The top spring captures 334a may be formed to aid in holding a spring mechanism including a plurality of springs, such as a set of four small springs 336, in place during displacements of the scalloped-edge actuator element 334. The center of the top of the scalloped-edge actuator element 334 may be generally concave, curving downward in the direction of the bottom base 338. About the center of the bottom of the scalloped-edge actuator element 334, a center keying feature 334c (as best illustrated in FIG. 45) may be formed. The scalloped-edge actuator element 334 may be mounted to a center limiting component 342 using, for example, small screws 219. The top of the center limiting component 342 may be formed with a limiting component keying feature 342a configured to fit to the center keying feature 334c to aid in securing the center limiting component 342 to the scalloped-edge actuator element 334.

The center limiting component 342 may be shaped so that it forms a cylindrical post on its top end, below where the limiting component keying feature 342a is formed. The bottom section of the center limiting component 342 may be configured to flatten to a much larger diameter than that of its cylindrical post top. Evenly spaced in four places about the circumference of the flattened section of larger diameter, a series of curved projections may be formed in the center limiting component 342.

A downward facing dome may also be shaped about the bottom center of the flattened section of the center limiting component 342 in order to make contact with the mechanical dome switch 258 during certain downward displacements of the scalloped-edge actuator element 334. The mechanical dome switch 258 may be mounted to the top center of a clover leaf shaped printed circuit board 344. One of each of the magnetic sensors 209 may be mounted on each of the four leaves of the clover leaf shaped printed circuit board 344. The clover leaf shaped printed circuit board 344 may be mounted to the underside of a bottom spring mounting piece 346 such as by small screws 219.

An electrical connector 222 may be mounted on the bottom of the clover leaf shaped printed circuit board 344. The area between each of the leaves of the clover leaf shaped printed circuit board 344 may be mounted to the bottom spring mounting piece 346, forming partial cylindrical recesses where the small springs 336, along the bottom, may be mounted. A set of bottom spring captures 346a may be formed about the bottom of each of the partial cylindrical recesses to aid in holding the small springs 336 in place in relation to the bottom spring mounting piece 346.

The partial cylindrical recesses may be of a greater diameter than that of the small springs 336 so to allow range of motion of the small springs 336 and the scalloped-edge actuator element 334. A hole may be formed in the center of the bottom spring mount piece 346. The hole may be larger in diameter than the cylindrical post top section of the center limiting component 342 but smaller in diameter than its flattened section.

When the embodiment 332 is assembled, the cylindrical post section of the center limiting component 342 may be fitted through the hole of the bottom spring mounting piece 346 so that the flattened section of the center limiting component 342, having larger diameter than the hole of the bottom spring mounting piece 346, is positioned along the bottom of the bottom spring mounting piece 346. The scalloped-edge actuator element 334 is thereby secured to the bottom spring mounting piece 346, thereby limiting travel and over extension of the small springs 336. The positioning of the center limiting component 342 through the bottom spring mounting piece 346 creates a mechanism by which the range of motion the scalloped-edge actuator element 334 is restricted, thereby preventing over stressing of the small springs 336. The bottom spring capture may be mounted to the top of the bottom base 338 by means of the small screws 219.

Figure 42:
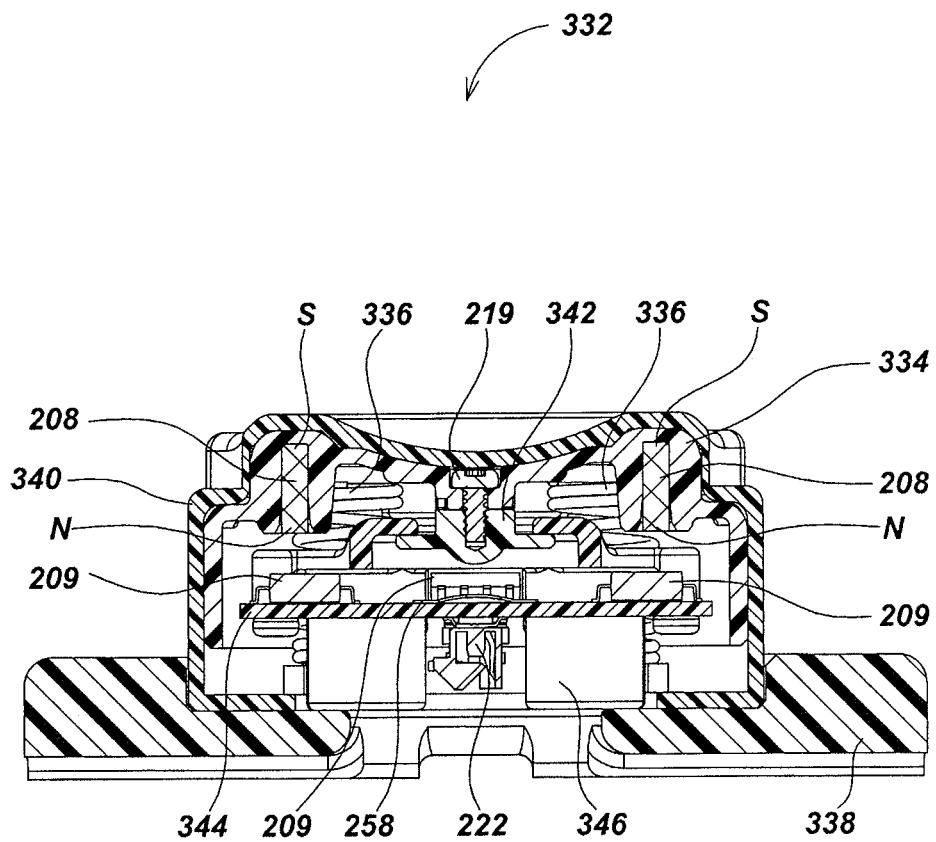
FIG. 42 is an enlarged vertical sectional view of the user interface device embodiment of FIG. 41 taken along line 42-42.

Referring to FIG. 45, details of an embodiment of the bottom of the scalloped-edge actuator element 334 is, in part, further illustrated. The top spring captures 334a may be evenly spaced about the internal circumference of the scalloped-edge actuator element 334. Between each of the top spring captures 334a may be one of each of the magnet mounts 334b. By positioning the permanent magnets 208 (as illustrated in FIGS. 42-44) as far along the internal circumference as possible, the distance between one of the permanent magnets 208 (as illustrated in FIGS. 42-44) and the others of the permanent magnets 208 (as illustrated in FIGS. 42-44) may be maximized within the scalloped-edge actuator element 334. Because the distance between each of the permanent magnets 208 (as illustrated in FIGS. 42-44) is maximized within the scalloped-edge actuator element 334, each magnetic field generated by each of the permanent magnets 208 (as illustrated in FIGS. 42-44) may be minimally influenced by the magnetic field of the other ones of the permanent magnets 208 (as illustrated in FIGS. 42-44), thereby substantially reducing interference between the magnetic fields. In an exemplary embodiment, the small springs 336 may be positioned as far towards the internal circumference of the scalloped-edge actuator element 334 as reasonably possible.

Figure 46:
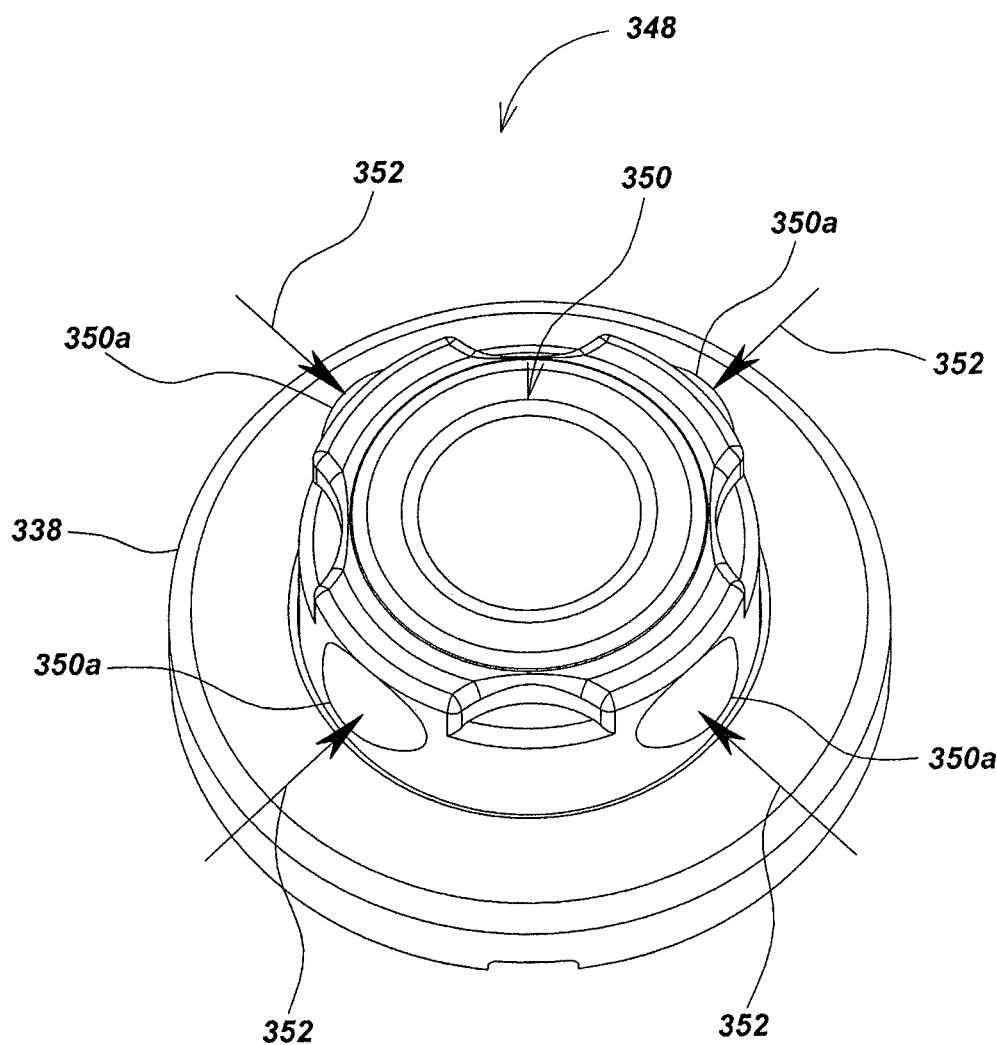
FIG. 46 is an isometric view of another embodiment of a manual user interface device similar to the embodiment of FIGS. 41-44 including a series of switch bumps.
Figure 47:
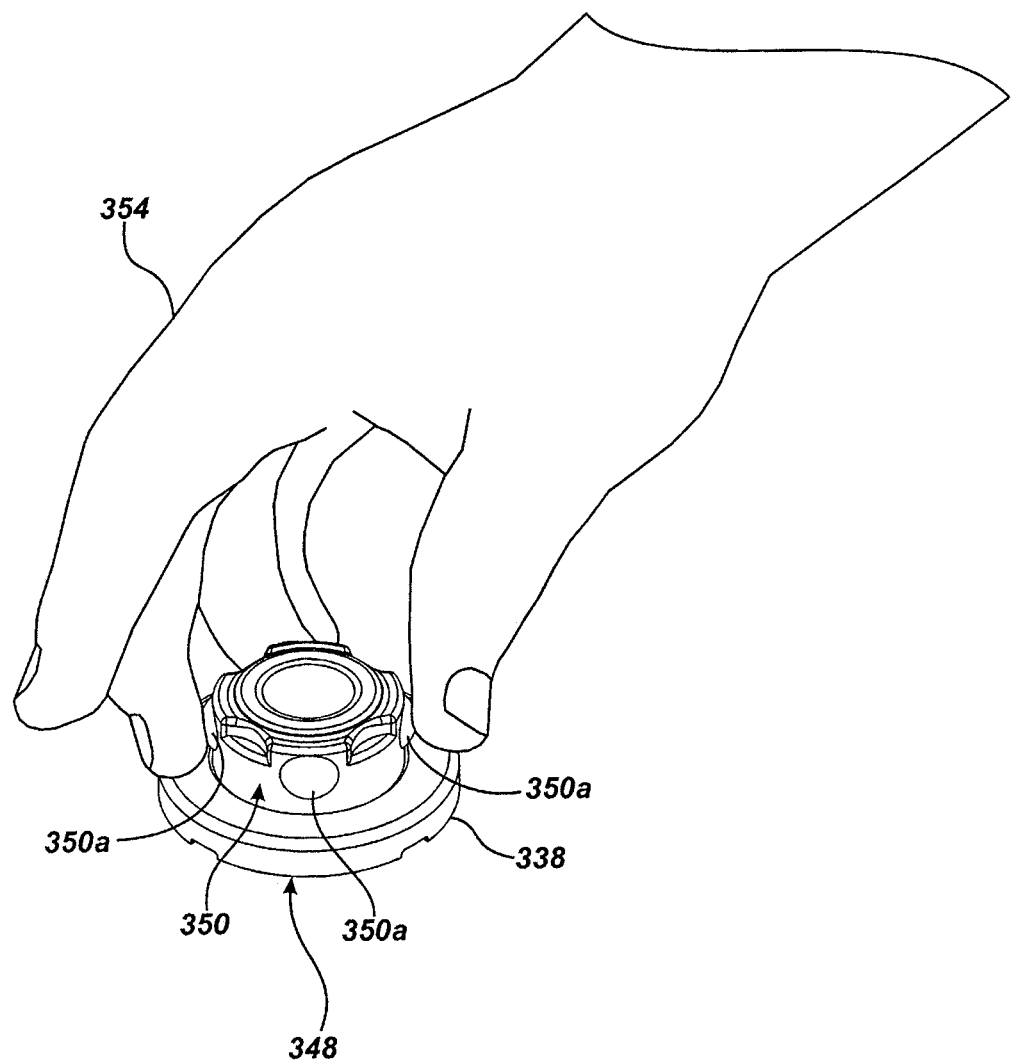
FIG. 47 is an illustration of a user's hand actuating a switch bump.

Referring to FIGS. 46 and 47, another embodiment 348 similar to the embodiment 332 of FIGS. 41-44, with the exception of elastomeric covering bearing switch bumps 350, is shown. The elastomeric covering bearing switch bumps 350 may be formed with a series of switch bumps 350a. In the embodiment 348, each of the switch bumps 350a may be formed in the general shape of a dome and positioned along the vertical surface of the elastomeric covering bearing switch bumps 350. A user may activate the switch bumps by performing a push action or push input, such as by pressing on the bumps.

The switch bumps 350a may be positioned evenly about the circumference defined by the vertical surface of the elastomeric covering bearing switch bumps 350. The switch bumps 350a may be formed about switching elements (not illustrated) that are mounted to the scalloped-edge actuator element 334 and underneath the elastomeric covering bearing switch bumps 350. For example, switching elements may include, but are not limited to, mechanical switching elements, pressure sensitive variable resistance, capacitance or inductance elements, or other switching devices.

In addition, optical interruption or variable intensity elements, interrupted, or frustrated total internal reflection may be used as switching elements. Flexible wiring (not illustrated), flex circuit (not illustrated), or small springs, such as the small springs 336 as shown, are other ways of providing electrical connection from the particular switching element to the clover leaf shaped printed circuit board 344.

The switch bumps 350a, in conjunction with the switching elements, when activated, may be used to afford the user push button control. For example, a set of lines 352 as shown in FIG. 46 illustrate example directions that force may be applied to the switch bumps 350a to activate the push button control. For instance, by a user's hand 354 as illustrated in FIG. 47, grasping and squeezing the top of the manual user interface device about the location of the switch bumps 350a, one or more of the switch bumps 350a will be depressed, initiating signals that may be used by the processing element to generate output signals such as commands that may be provided to the electronic computing system. The command may, for example, be interpreted as picking up of a virtual object by the user, or as other user actions.

For example, a user may be presented with an image or display of a vertical object on a monitor or other display device of the electronic computing system. The electronic computing system may be, for example, a desktop computer running a computer aided design (CAD) application, or another application displaying two or three-dimensional objects ("virtual objects"). By interacting with the user device as described previously, a user may cause the user device to generate output signals that may then be interpreted by the application as picking up and/or moving the virtual object.

In other applications, a squeeze of the manual user interface device, activating one or more of the switch bumps 350a, may be used to generate output signals to indicate a particular action in a video gaming system, selecting text in a document interface, or interacting in similar fashion with a myriad of two dimensional and three dimensional applications. In some implementation, the switch bumps 350a may serve the function of right and left mouse clicks of a cursor control device. Various other positions and arrangements of the switch bumps 350a and switches are possible to accommodate for ergonomics or particular use of the manual user interface device. Though this type switching mechanism is represented in the embodiment 348 for purposes of illustration, other switching mechanisms may also be adapted for use in various other embodiments of user interface device of the present invention.

Example Deformable Actuator Embodiments

Figure 48:
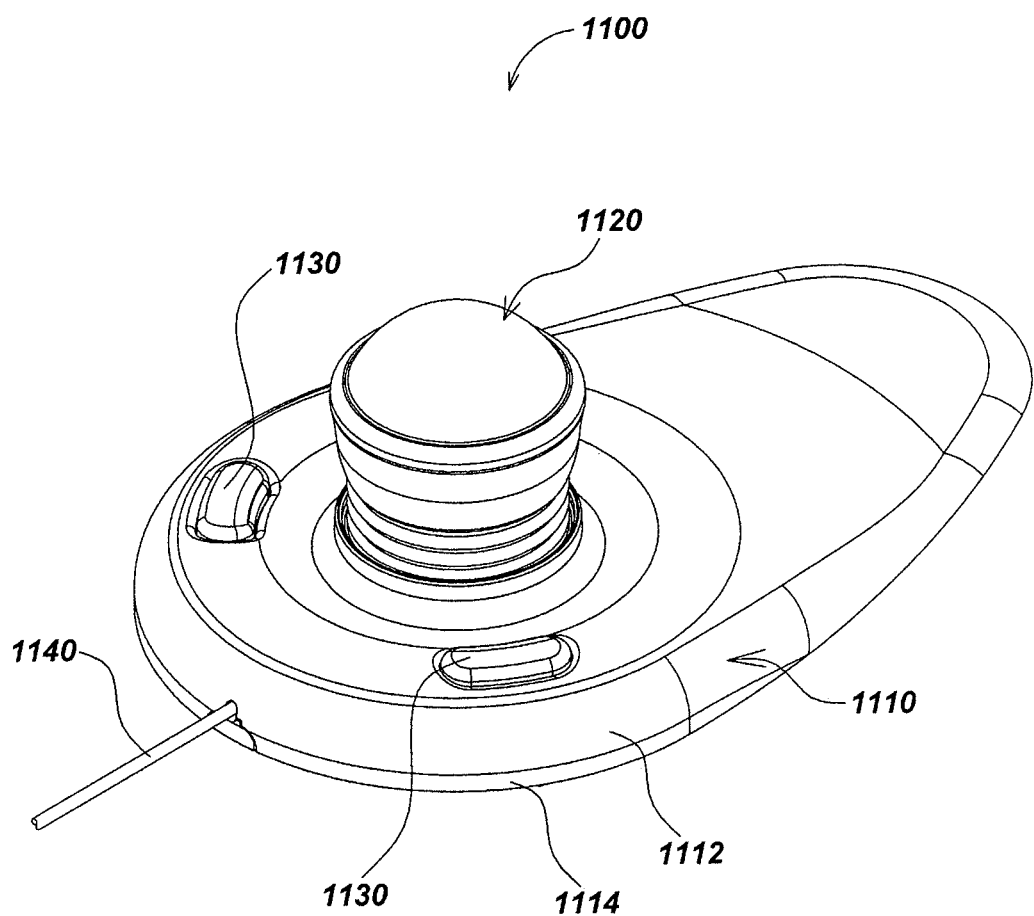
FIG. 48 is an isometric view of an embodiment of a deformable actuator user interface device.

Attention is now directed to FIG. 48, wherein various details of another embodiment of a user interface device 1100 are illustrated. The user interface device embodiment 1100 may include a base element, such as base element 1110, with an actuator assembly, such as actuator assembly 1120, coupled thereto. The user interface device 1100 may further include one or more switches, such as switches or buttons 1130. The actuator assembly 1120 may be configured to allow a user to grip or otherwise contact the user interface device 1100, and apply movement and/of deformation actions to movable and/or deformable elements of the user interface device 1100. The user interface device may be further configured to provide the user with tactile feedback from the user interface device 1100 (e.g., with a vibration element not shown), as well as provide other functions, such as switching inputs, via switches or buttons 1130, as well as other functions as described previously or subsequently herein.

The base element 1110 may be comprised of multiple elements, such as a base top half 1112 and a base bottom half 1114 as shown. A series of one or more buttons or switches, such as buttons 1130, may be incorporated on or into the base element. The series of buttons 1130 may be connected to circuitry (not illustrated), such as circuitry in a processing element, to provide push-button control functions to the user. For example, the buttons may be connected to a processor or other programmable device of the processing element, which may generate an output signal in response to user activation of the button or switch.

A connecting wire 1140 (or other wired or wireless connection elements, such as wired or wireless transmitter and receiver elements, not shown) may be further included to connect the user interface device 1100 with an electronic computing system, such as to send output signals or commands related to motion of the actuator assembly, buttons or switches, or other actions such as described previously herein.

Figure 49:
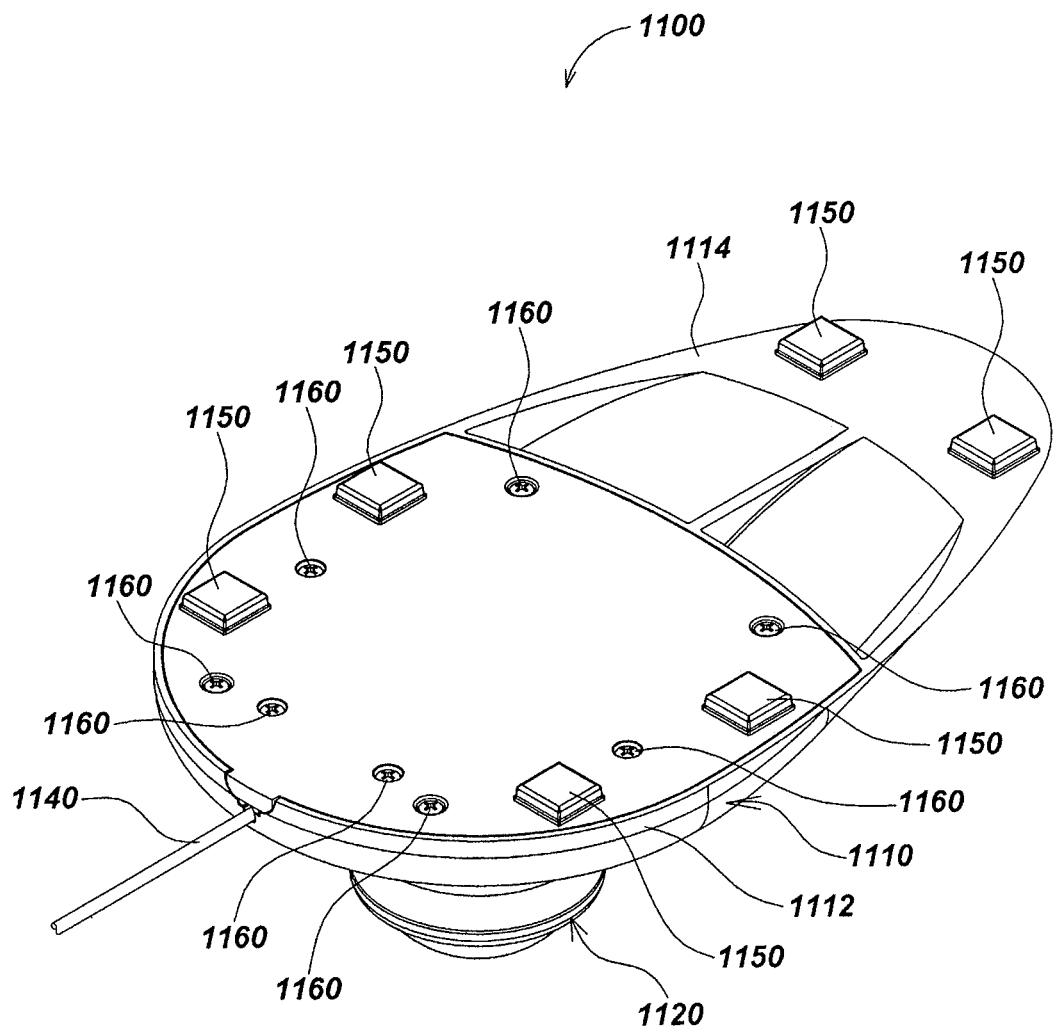
FIG. 49 is an isometric view of the embodiment of FIG. 48 seen from the bottom.

FIG. 49 illustrates an underside configuration of the user interface device embodiment 1100. A series of feet, such as elastomeric feet 1150, may be included to aid in keeping the user interface device 1100 still in relation to an operating surface (such as a desk, table, or other work surface) when in use. A series of large screws 1160 or other attachment mechanisms may be used to secure the base top half 1112 and the base bottom half 1114 together, concealing internal circuitry (not illustrated) as well as other elements, such as spring suspended or supported elements such as magnets, sensors, accelerometers, gyroscopes, pressure, barometric, temperate, and/or other sensors, and/or other elements such as described previously herein.

An actuator assembly, such as exemplary actuator assembly embodiment 1120, may include both fixed and movable elements or sub-assemblies. For example, FIG. 50 further illustrates additional details of the actuator assembly 1120 embodiment. In operation, a movable element of the actuator assembly may be physically moved by a user, thereby causing displacements which may include lateral movements, up and down movements, tilts, rotations, displacements, translations, yaws, and/or permutations and combinations thereof (relative to a neutral or released state). A motion sensor apparatus may include one or more magnets and magnetic sensors configured to generate one or more motion signals corresponding to the motion of the movable element. For example, the magnets may be permanent magnets and the magnetic sensors may be multi-axis magnetic sensors, such as three-axis magnetic sensors. The motion signals may be provided to a processing element, where the motion signals may be further processed to generate output signals to be provided to an electronic computing system, such as described previously herein. For example, the output signals may include data corresponding to particular motions of the movable element and/or may be mapped commands or control data usable for specific input functions by the electronic computing system.

Alternately, or in addition, an actuator assembly may include a deformable element. In an exemplary embodiment, the movable element and the deformable element may be integral or may be partially integrated. In operation, the deformable element may be deformed (relative to a non-deformed state) by a user deformation action, such as a squeeze, push, or other gripping or deformation action. A deformation sensor apparatus may include one or more magnets and magnetic sensors configured to generate one or more deformation signals corresponding to the deformation of the deformation element. For example, the magnets may be permanent magnets and the magnetic sensors may be multi-axis magnetic sensors, such as three-axis magnetic sensors. The deformation signals may be provided to a processing element to be used to further generate output signals to be provided to an electronic computing system, such as to perform command, control, data, or other functions. For example, in one implementation, deformations may be sensed and output signals provided corresponding to related actions applied to a virtual object displayed on the electronic computing system, such as grabbing and/or picking up the virtual object in a CAD system, video game, process control system, or other interactive application.

In an exemplary embodiment, the movable and deformable elements may be at least partially integral. For example, in this integral configuration, the movable element may also be deformable so that when a user squeezes the movable element, parts of the actuator assembly will deform in response (relative to a non-deformed state). Conversely, when the user releases the movable element, the deformed parts of the actuator assembly will return to a non-deformed state. By combining deformation sensing with movement sensing (such as described previously herein), additional, synergistic user interaction functionality may be provided in embodiments of user interface devices.

Figure 51:
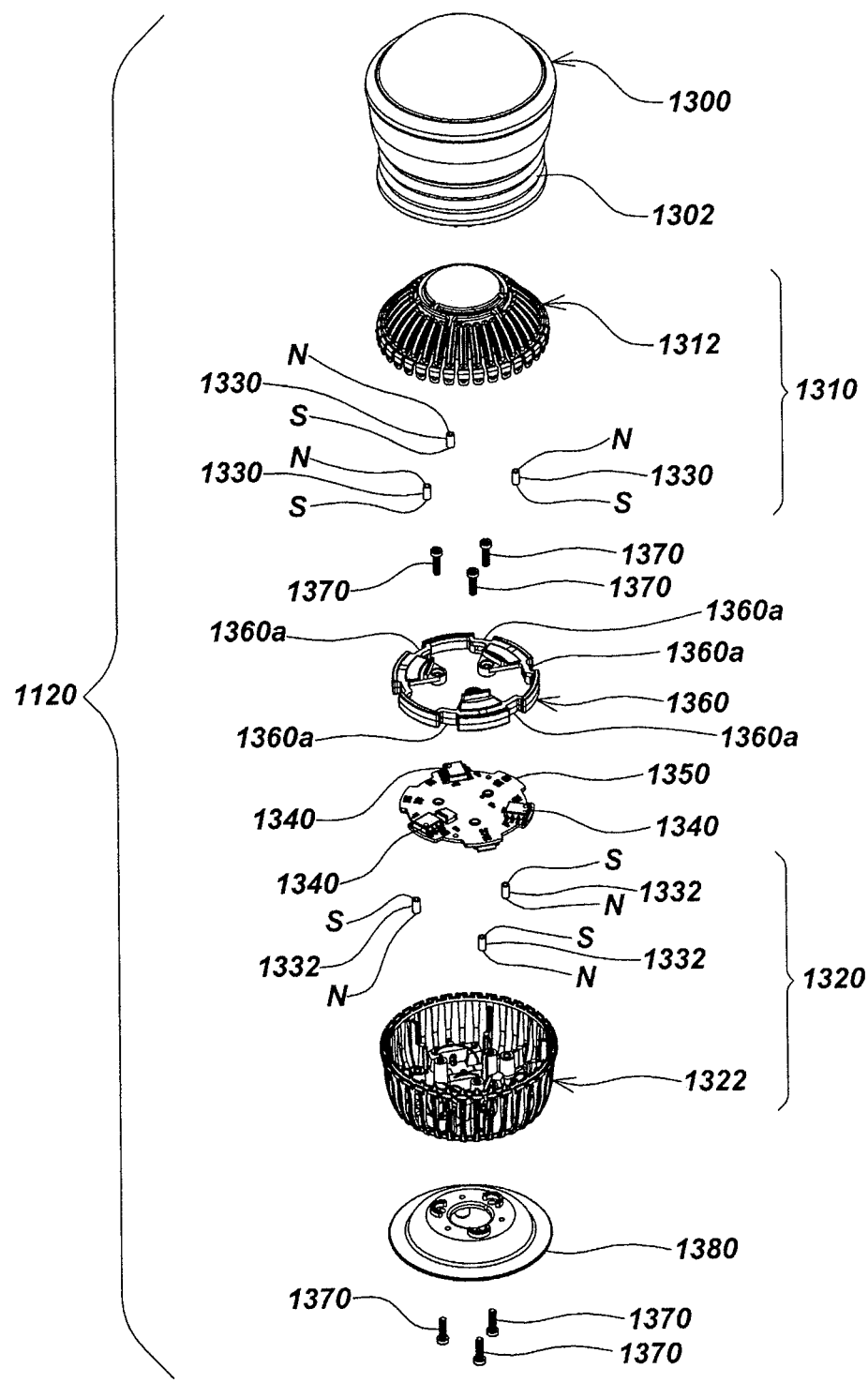
FIG. 51 is an exploded isometric view of an actuator element embodiment taken from the top thereof.
Figure 52:
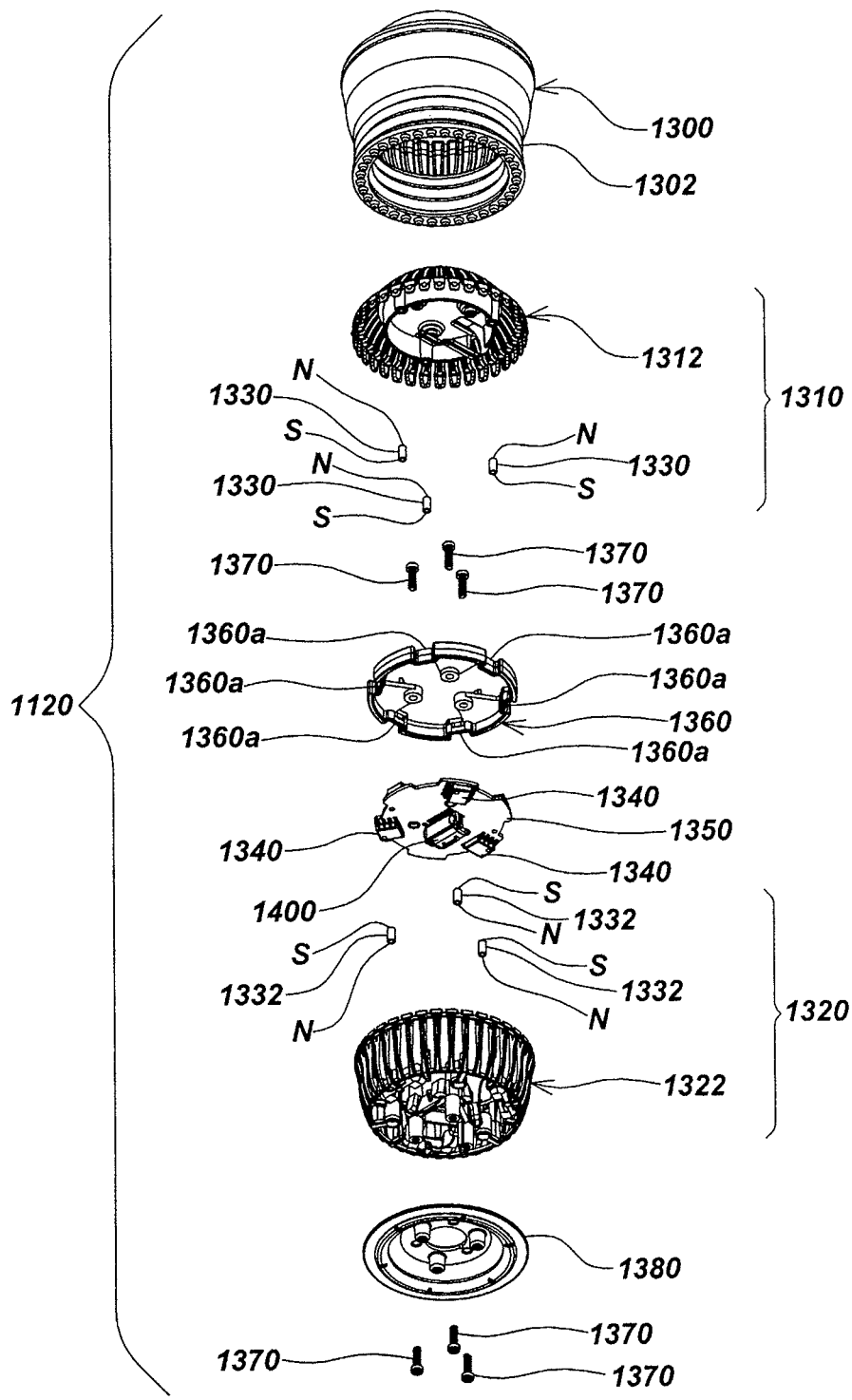
FIG. 52 is an exploded isometric view of an actuator element embodiment taken from the bottom thereof.
Figure 53:
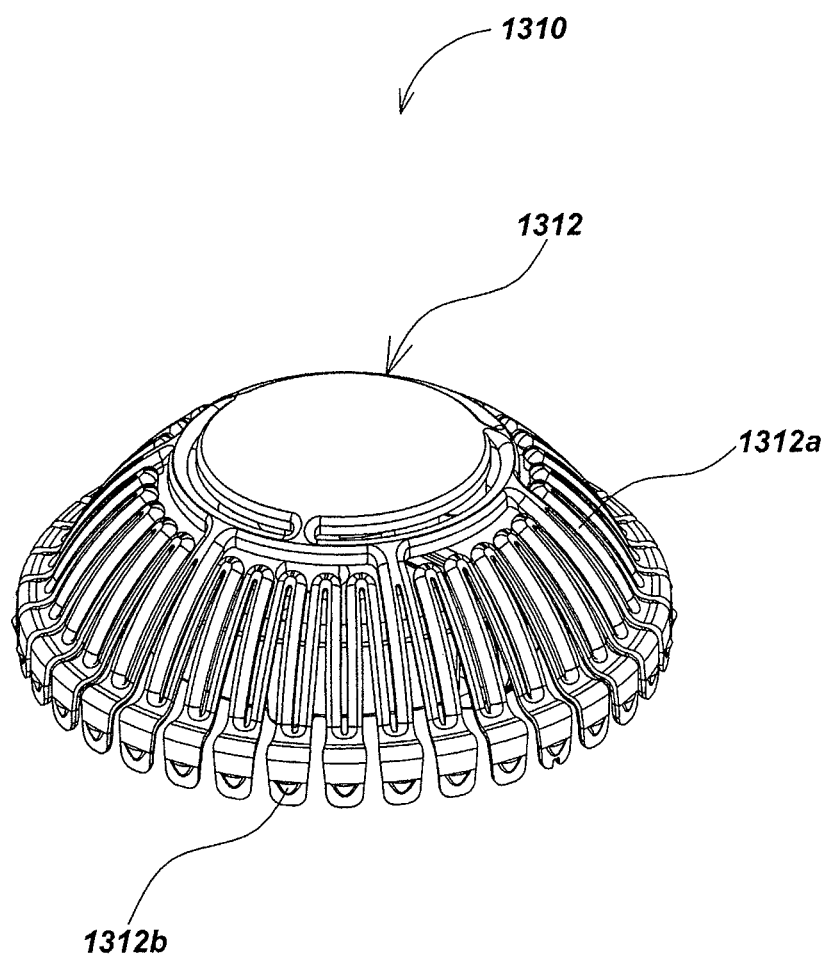
FIG. 53 is a detailed isometric view of an upper actuator assembly embodiment.
Figure 54:
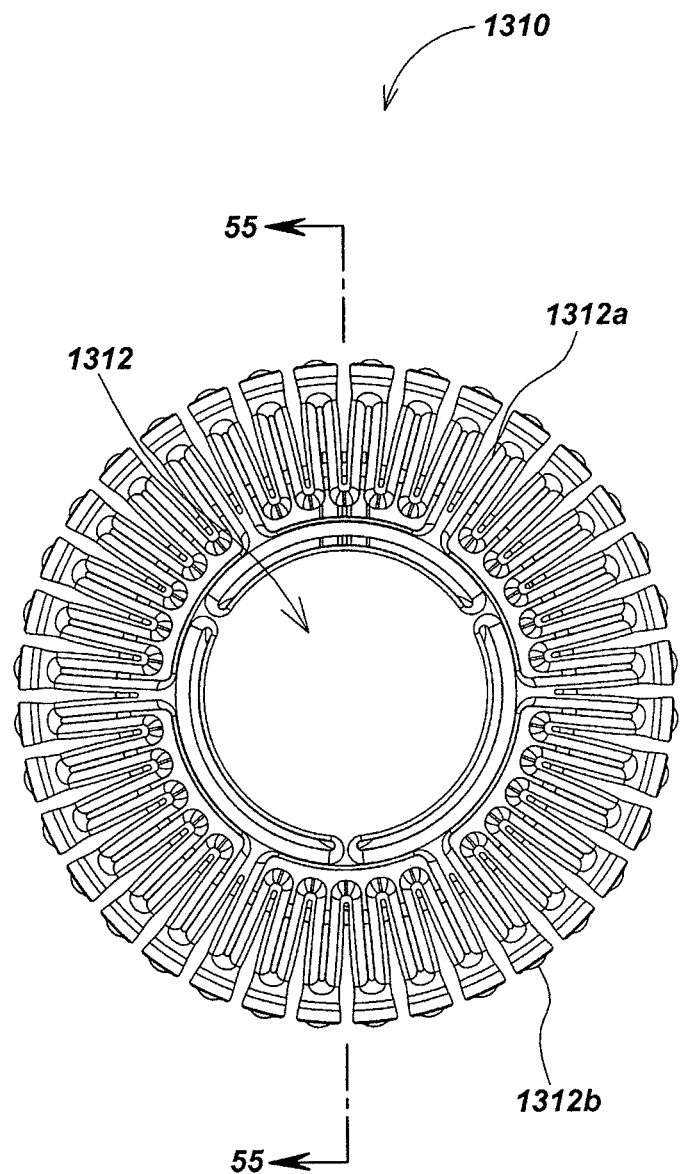
FIG. 54 is a top view of an upper actuator assembly embodiment.
Figure 55:
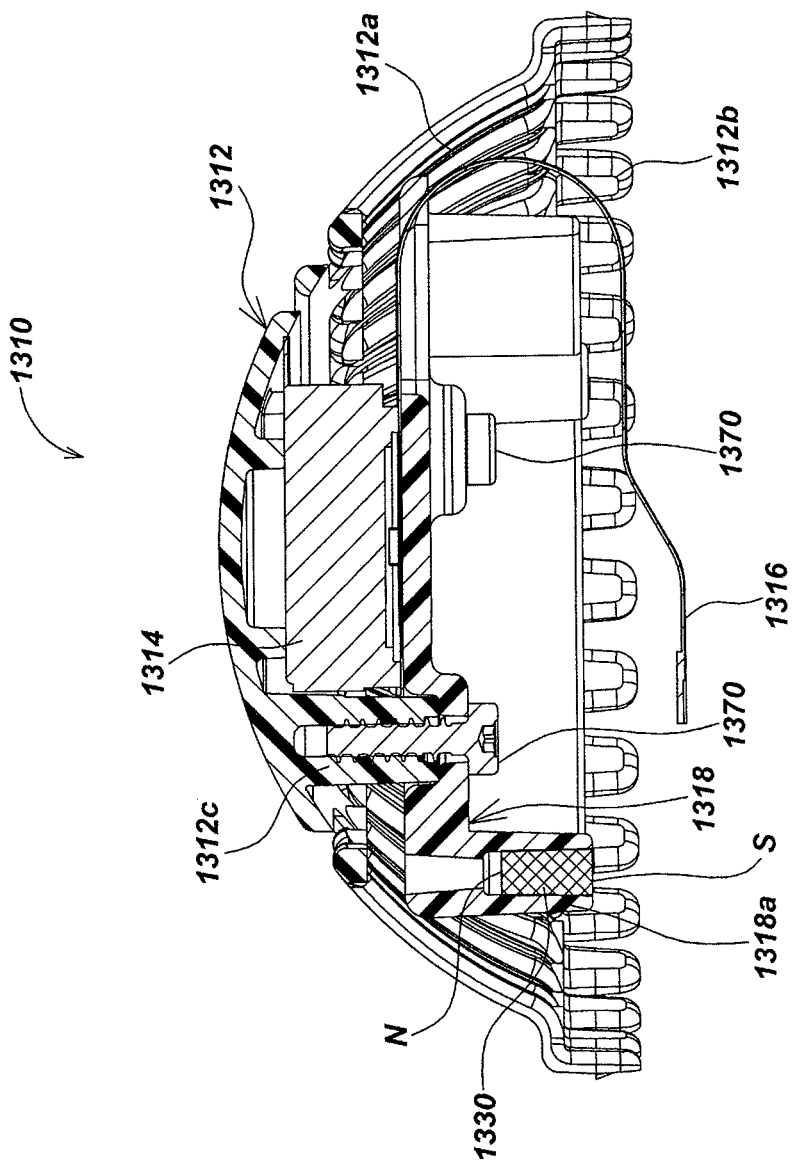
FIG. 55 is a sectional view of the top actuator assembly embodiment of FIG. 54 along line 55-55.
Figure 56:
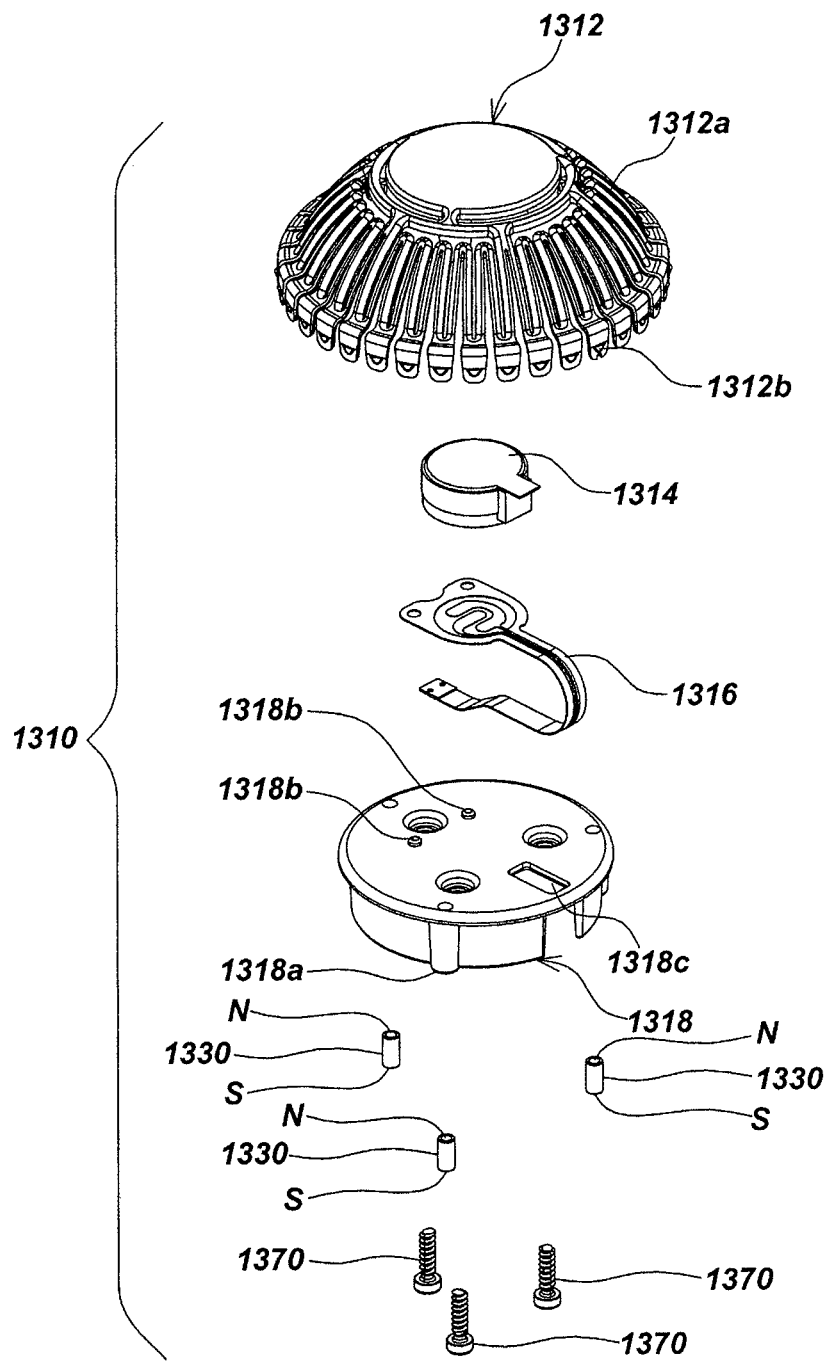
FIG. 56 is an exploded isometric view of the upper actuator assembly embodiment of FIG. 54 from the top thereof.
Figure 57:
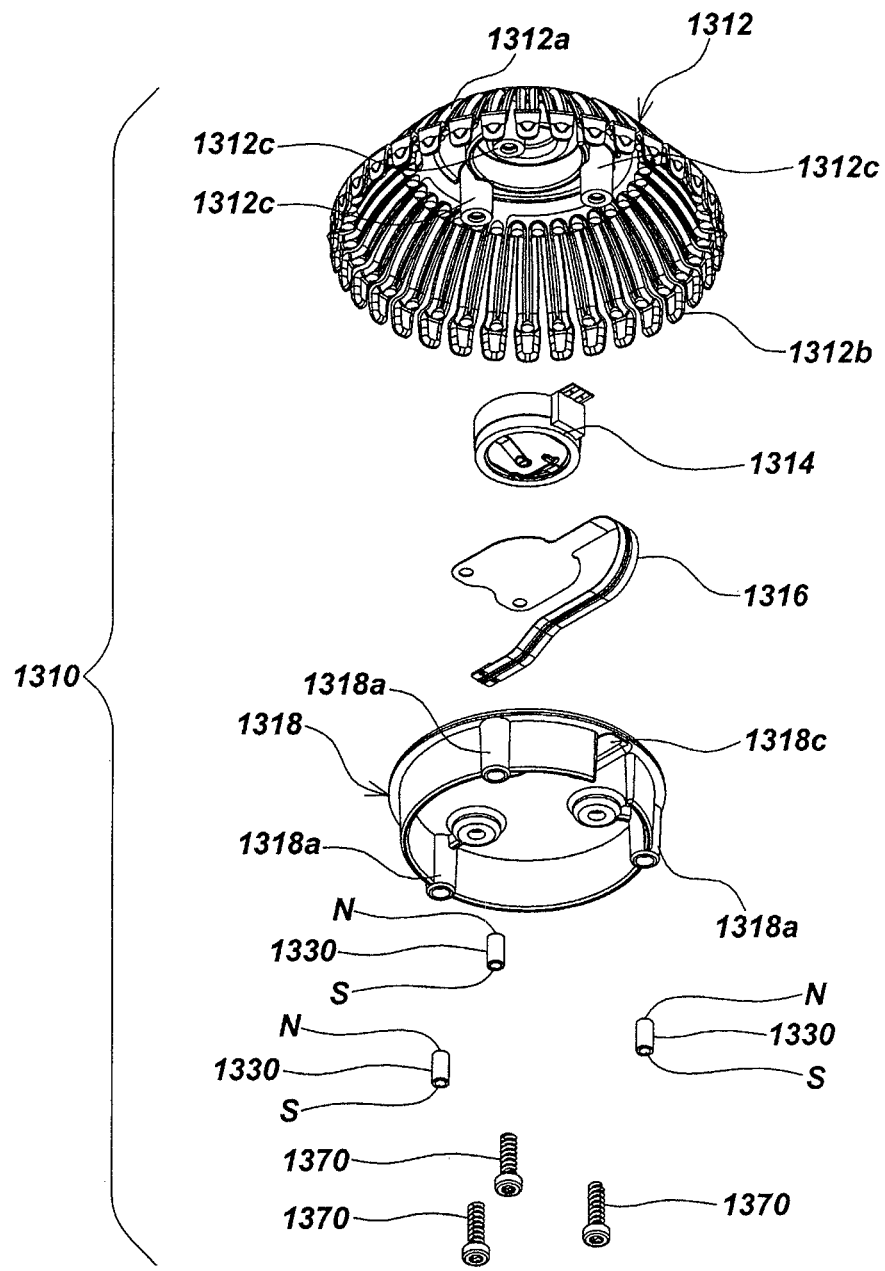
FIG. 57 is an exploded isometric view the upper actuator assembly embodiment of FIG. 53 from the bottom thereof.
Figure 58:
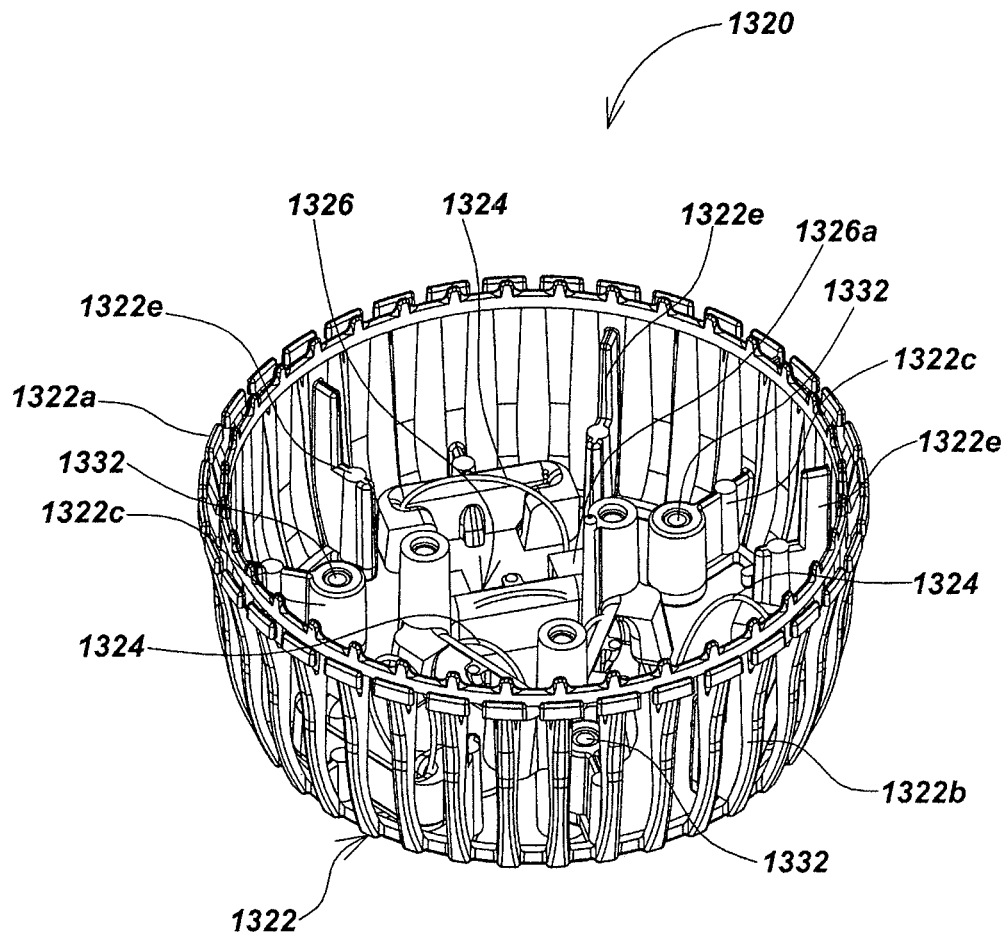
FIG. 58 is a detailed isometric view of a lower actuator assembly embodiment.
Figure 59:
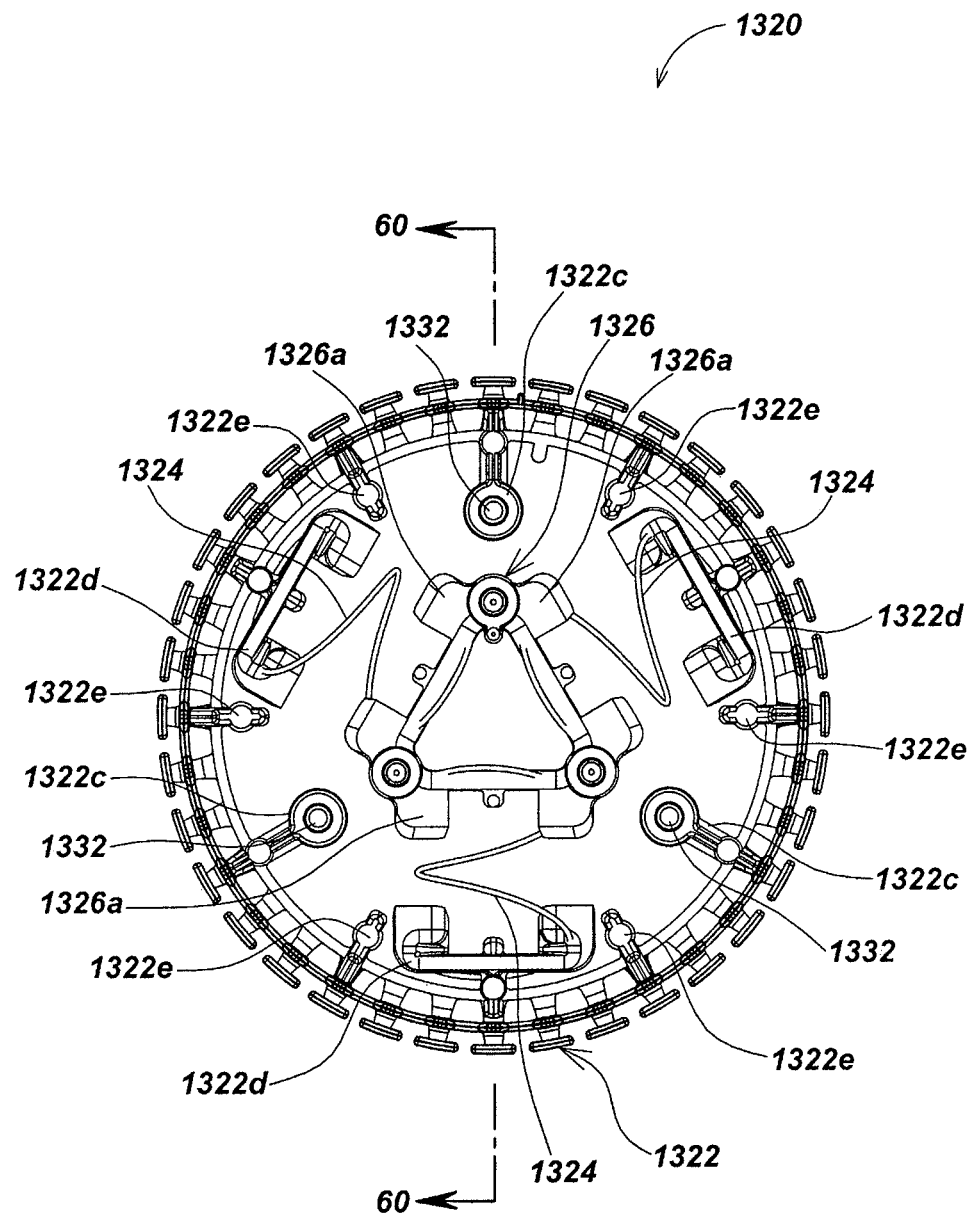
FIG. 59 is a top view of a lower actuator assembly embodiment.
Figure 60:
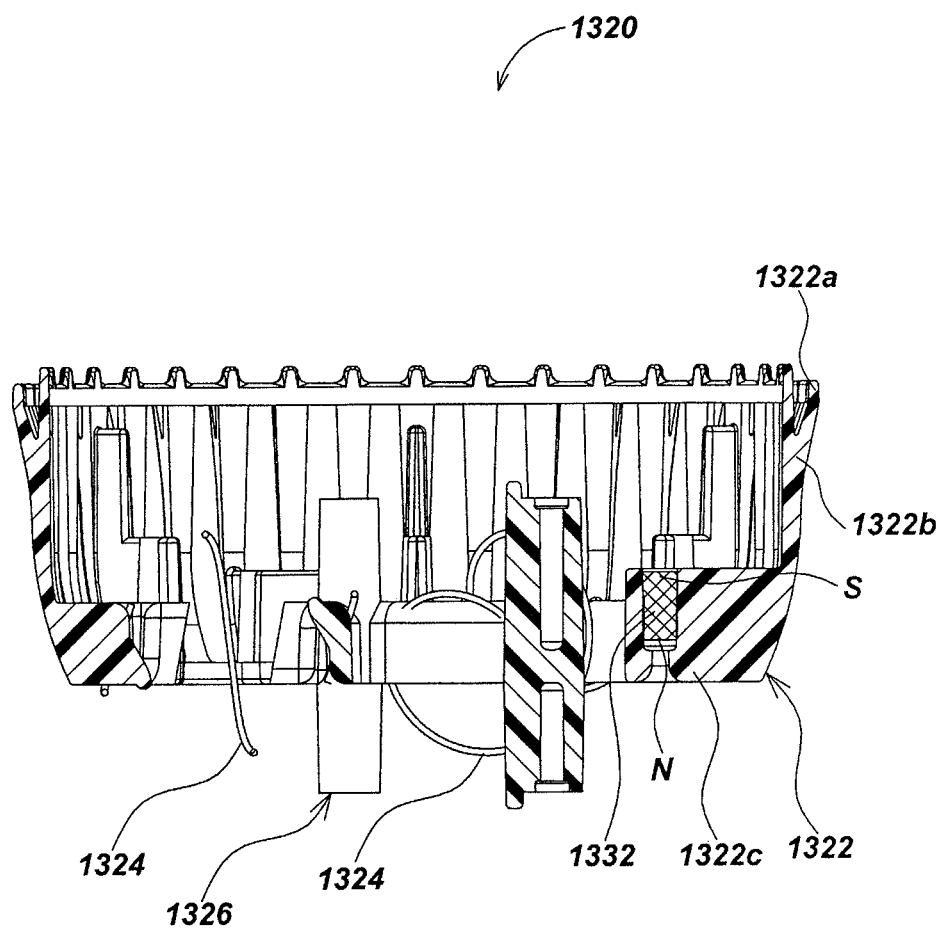
FIG. 60 is a sectional view of the lower actuator assembly from FIG. 59 along line 60-60.
Figure 61:
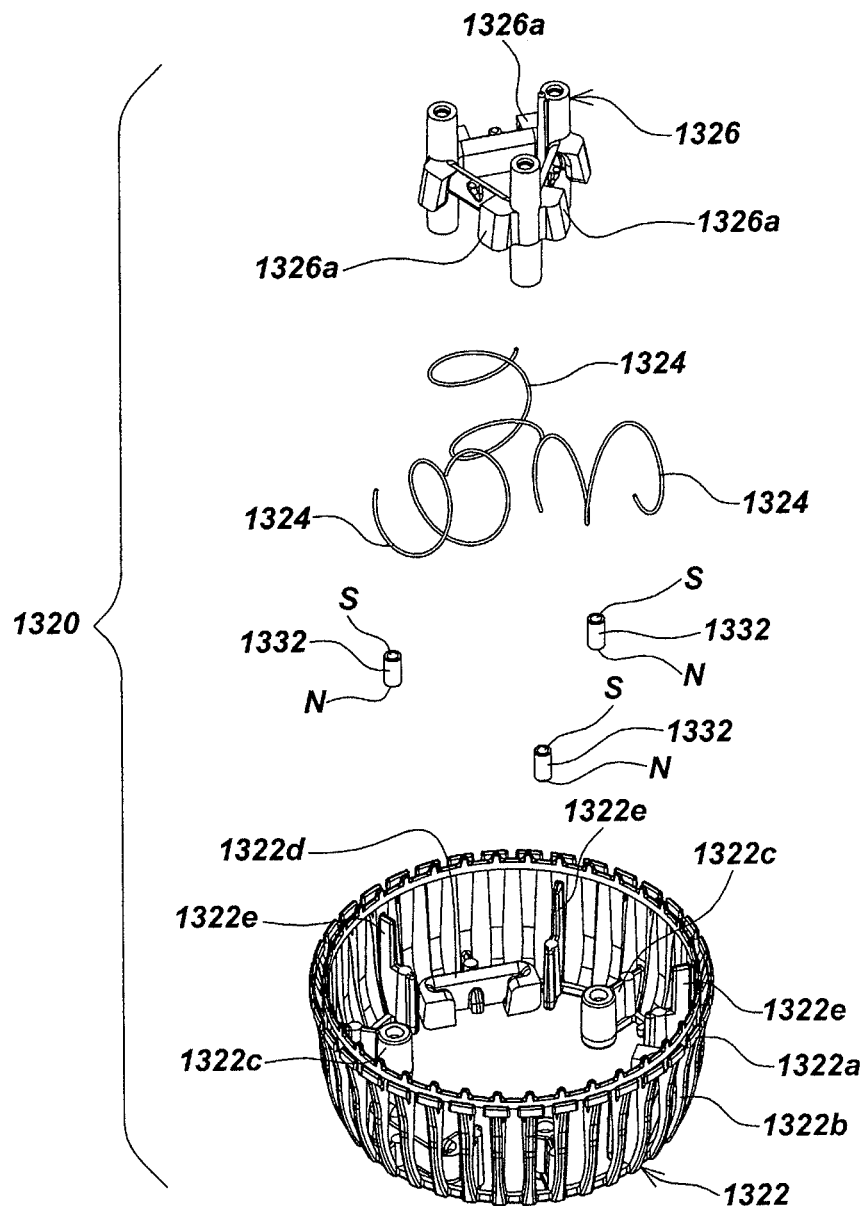
FIG. 61 is an exploded isometric view the lower actuator assembly embodiment of FIG. 57 from the top thereof.
Figure 62:
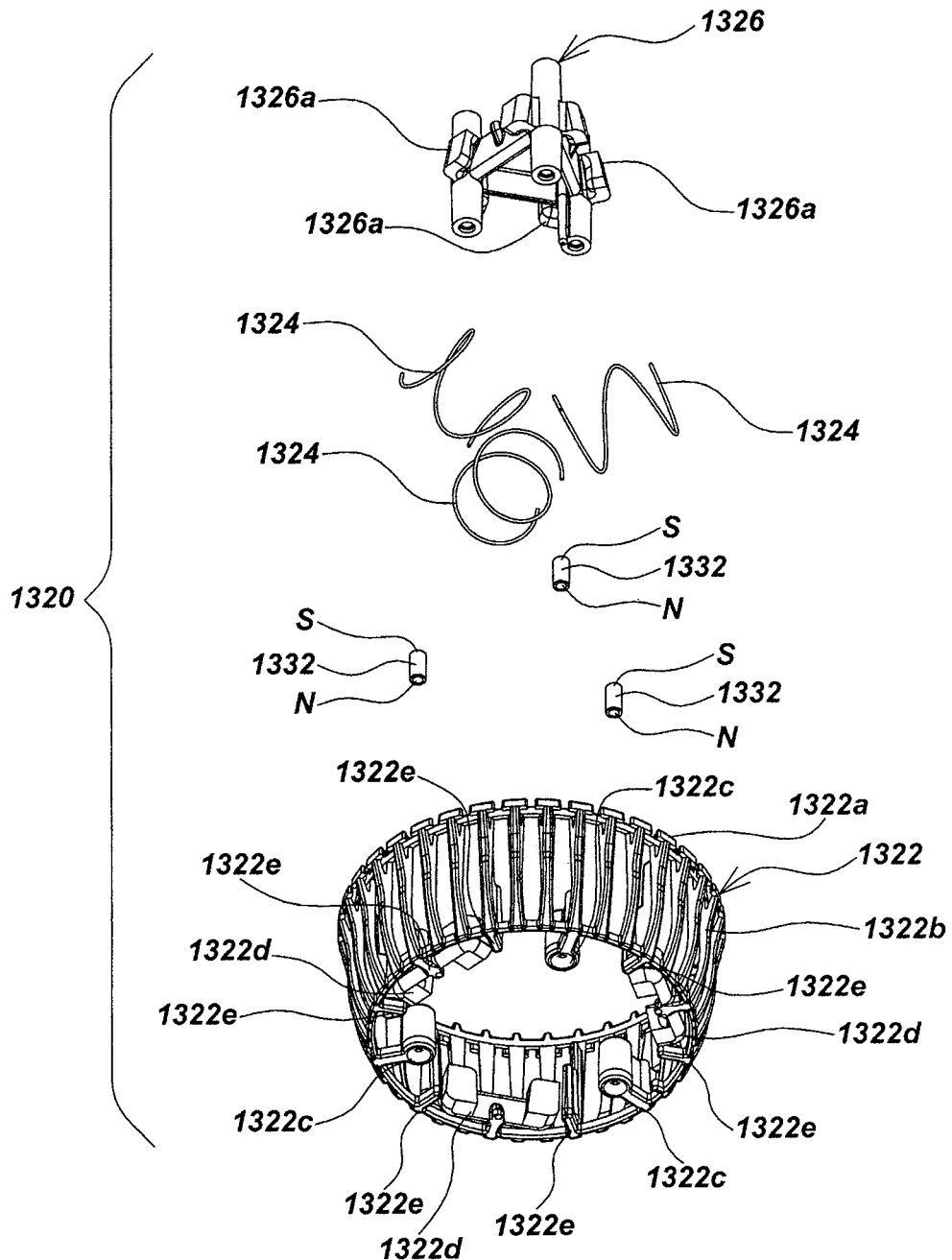
FIG. 62 is an exploded isometric view the lower actuator assembly embodiment of FIG. 58 from the bottom thereof.

FIGS. 51 and 52 further illustrate details of the actuator assembly 1120 embodiment of FIGS. 48 and 49, showing example configurations for providing both motion sensing and deformation sensing. For example, the actuator assembly 1120 may include a cover element, such as elastomeric cover 1300, configured to surround an upper actuator sub-assembly 1310 and a lower actuator sub-assembly 1320. A plurality of magnets, such as a series of three upper permanent magnets 1330 as shown (or other numbers of magnets and associated sensors), may be mounted within upper actuator sub-assembly 1310, and a series of lower permanent magnets 1332, such as the three magnets shown, may be mounted within lower actuator sub-assembly 1320. The magnets may be configured such that ones of the upper permanent magnets 1330 and lower permanent magnets 1332 may correspond to or be matched to a magnetic sensor element, such as magnetic sensor 1340, which may be a multi-axis magnetic sensor. The magnetic sensor element may be mounted on or secured to a sensor printed circuit board (PCB) or other substrate, such as PCB 1350. The upper and lower magnets may be configured to be in opposite polarity orientations, such as shown in FIGS. 51 and 52. The upper magnets may be a component of upper actuator sub-assembly 1310 and the lower magnets may be a component of lower actuator sub-assembly 1320.

Some components of the upper actuator sub-assembly 1310 and/or some components of the lower actuator sub-assembly 1320 may be configured to move about other fixed components in the lower actuator sub-assembly 1320 when manipulated by a user.

The actuator assembly 1120 may further include limiting elements, such as a limiting piece 1360, as well as a series of small screws 1370 or other mounting mechanisms to secure the sensor PCB 1350 and/or the limiting piece 1360 to a core join element 1326 (described subsequently herein).

The sections of the elastomer cover 1300 that covers the upper actuator sub-assembly 1310 and the lower actuator sub-assembly 1320, the upper actuator sub-assembly 1310, and the outer ring of the bottom actuator half 1322 (described subsequently herein) of lower actuator sub-assembly 1320 of the actuator assembly 1120 may be configured to move in relation to the sensor PCB 1350, the limiting piece 1360, and core join 1326.

A lower bellows section 1302 of the elastomer cover 1300 may be largely bellows-shaped, providing flexibility and/or functioning as a dampening element. By providing a dampening element, such as lower bellows section 1302, vibrations that may occur during abrupt release of the movable element of the actuator assembly by the user may be suppressed. Additional dampening elements may be also be fitted within the lower actuator sub-assembly 1320 to aid in further dampening vibrations. In an exemplary embodiment, the bottom of the lower bellows section 1302 may be fixed so as to not be moveable during displacements of movable elements of the actuator assembly.

The magnetic sensors 1340 may be, for example, magnetic multi-axis sensors such as an integrated circuit (IC) Melexis MLX90363 Triaxis 3D-Joystick Position sensor, or other similar or equivalent sensors or other devices. The magnetic sensors 1340 may be secured to the sensor substrate or PCB 1350 such that three of the magnetic sensors 1340 may be secured to the upwards facing side of the sensor PCB 1350, and three of the magnetic sensors 1340 may be secured to the downward facing side of the sensor PCB 1350. Ones of the magnetic sensors may be configured in a staggered pattern to maximize distance between the other ones of the magnetic sensors.

The limiting element, such as limiting piece 1360, may be configured as a substantially ring-shaped element configured so as to fit about the sensor PCB 1350. A series of limiting grooves 1360a may be formed around the circumference of the limiting piece 1360 such that when the movable element of actuator assembly 1120 is moved into a displaced state by a user, the limiting piece 1360 and the limiting grooves 1360a restrict the extent of the displacement and prevent over-stressing the components of the user interface device. In some embodiments, the limiting piece 1360 may be fitted with bumpers, an elastomeric over-mold, and/or other cushioning or dampening elements that may soften the impact of colliding or scraping components and may further be configured to improve the tactile sensation of the device during use.

The mounting plate 1380 may be secured below the lower actuator sub-assembly 1320 using small screws 1370 or other attachment mechanisms that may be used to further mount the actuator assembly 1120 within a base element, such as base element 1110.

A connector 1400, such as shown in FIG. 52, may be secured centrally to the downward facing side of the sensor PCB 1350 so that, when accompanied by the appropriate wiring, the sensor PCB 1350 may be connected to an electronic computing system. In alternative embodiments, a wireless element, such as a wireless transmitter, receiver, transceiver, or other wireless element may be used to communicate with the electronic computing system.

In some embodiments, the upper permanent magnets 1330 and the lower permanent magnets 1332 may be oriented such that the magnetic orientation of the upper permanent magnets 1330 are in opposition to the magnetic orientation of the lower permanent magnets 1332. In some embodiments, touch sensitive elements may also be optionally incorporated into the elastomeric cover 1300.

Figure 63:
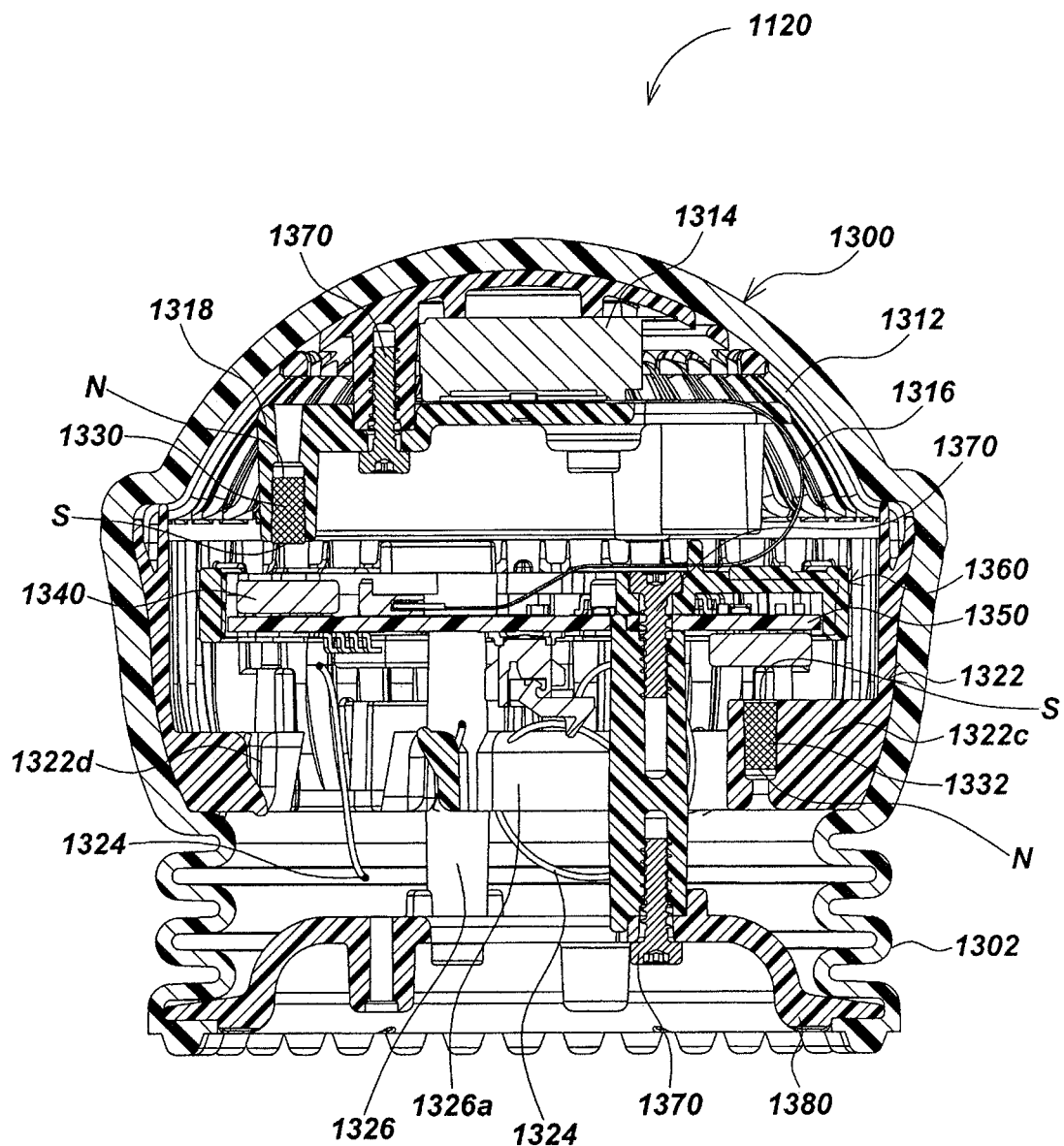
FIG. 63 is a sectional view of the embodiment of FIG. 50 along line 63-63.

FIGS. 53-57 further illustrate details of the upper actuator sub-assembly embodiment 1310. The upper actuator sub-assembly 1310 may include a top actuator half, such as top actuator half 1312, a vibration element, such as vibration motor 1314 (as shown in FIGS. 55-58), a flexible substrate, such as flexible PCB 1316, which may be used to connect the vibration motor 1314 to the sensor PCB 1350 (as illustrated in FIG. 63), a magnet mounting disk, such as mounting disk 1318, and small screws 1370 or other attachment mechanisms.

The top actuator half 1312 may be largely dome shaped to accommodate a user's hand. The top actuator half 1312 may also be formed with a top deformation slot section 1312a, which may define finger or other flexible elements so as to allow the top actuator half 1312 to be deformed by a user, and subsequently return to a non-deformed state when released. The deformation slot section 1312a may be formed by a series of ribs or other structures providing deformability extending along the sides of the top actuator half 1312. Top keying sections 1312b may be formed along the bottom circumference and below the top deformation slot section 1312a of the top actuator half 1312, which may be used to secure the upper actuator sub-assembly 1310 to the lower actuator sub-assembly 1320. Other connection mechanisms may also be used to connect upper and lower sub-assemblies.

A series of screw mounting posts 1312c may be formed within the top of the dome of the top actuator half 1312. The vibration motor 1314 may be positioned snugly between the screw mounting posts 1312c. The vibration motor 1314 may be, for example, the C1026B200F device commercially available from Jin Long Machinery or other similar or equivalent motors or other devices.

The vibration motor 1314 may be activated, for example, to indicate an icon present when scrolling across a screen on a computer or may activate to indicate a selection has been made in virtual space, such as in proximity to or in contact with a virtual object shown on a display screen of the electronic computing device. Activation of the vibration motor may be controlled by the processing element either in response to a user action or based on a signal or data provided from the electronic computing system. In some embodiments, a particular pre-defined pattern of vibration may be used to indicate switching between different possible modes, such as, for example, a mode indicating a two dimensional virtual space mode versus a three dimensional virtual space mode.

The flexible substrate or PCB 1316 may be functionally secured to the bottom of the vibration motor 1314 with the magnet mounting disk 1318, secured to the top actuator half 1312 by the small screws 1370, and may further hold the vibration motor 1314 and the flex PCB 1316, as well as the upper magnetis, in place.

The magnet mounting disk 1318 may be substantially disk shaped with a series of magnet mounting receptacles 1318a, corresponding to a particular configuration of magnets (e.g., three in an exemplary embodiment) formed along the circumference. One of each of the upper permanent magnets 1330 may be mounted within each of the magnet mounting receptacles 1318a. The magnet mounting disk 1318 may further be formed with a pair of mounting nubbins 1318b on the upward facing side of the magnet mounting disk 1318 that may be used to aid in securing the flex PCB 1316 and the vibration motor 1314 to the magnet mounting disk 1318.

A connector gap 1318c may be formed in the magnet mounting disk 1318, thereby allowing the flex PCB 1316 to pass through the magnet mounting disk 1318 and functionally connect to the sensor PCB 1350. In some embodiments the limiting piece 1360 may be fitted with bumpers, an elastomer over-mold, and/or other dampening or cushioning elements that may soften the impact of colliding or scraping components, and may also be configured to improve the tactile sensation of the device during use.

FIGS. 58-62 further illustrate details of the lower actuator sub-assembly 1320 embodiment. The lower actuator sub-assembly may include a bottom actuator half, such as bottom actuator half 1322, a series of springs 1324, and a core join 1326. A bottom keying section 1322a may be formed along the circumference at the top of the bottom actuator half 1322. In assembly, the bottom keying section 1322a may mate with the top keying section 1312b of the top actuator half 1312. When assembled, the top actuator half 1312 and the bottom actuator half 1322 may form a shape that is approximately spherical. Around the sides of the bottom actuator half 1322, a bottom deformation slot section 1322b may be formed to allow the bottom actuator half 1322 to be deformed by force applied by a user and return to its original non-deformed state when released.

The bottom deformation slot section 1322b may be formed by a series of ribs formed along the sides of the bottom actuator half 1322. A series of magnet-bearing arms 1322c may be formed to extend inward on the bottom actuator half 1322. The magnet-bearing arms 1322c may be evenly spaced about the circumference of the bottom actuator half 1322, and may be formed to mount one of the lower permanent magnets 1332 per each of the magnet-bearing arms 1322c.

Between each of the magnet-bearing arms 1322c and neighboring ones of the magnet-bearing arms 1322c, an actuator spring mounting section 1322d may be formed to hold one end of each of the springs 1324. The opposite end of each of the springs 1324 may be secured to a core join spring mounting section 1326a formed on each of the three vertical sides of the core join 1326. In assembly, the springs 1324 may be heated by methods such as magnetic induction to melt the adjoining thermoplastic material of the actuator spring mounting sections 1322d and the core join spring mounting sections 1326a around the ends of the springs 1324 to further secure the springs 1324 in place.

On either sides of each of the actuator spring mounting sections 1322d, a limiting arm 1322e may be formed that is approximately "L" shaped. The limiting arms 1322e may be designed to fit within the limiting grooves 1360a of the limiting piece 1360 such that displacements of the actuator assembly 1120 are limited to prevent over-stressing of the springs 1324. In some embodiments, the various components of the lower actuator sub-assembly 1320, including but not limited to the core join 1326, may be fitted with bumpers or a rubber over-mold that may soften the impact of scraping or colliding components and improve the tactile sensation of the device during use.

Figure 50:
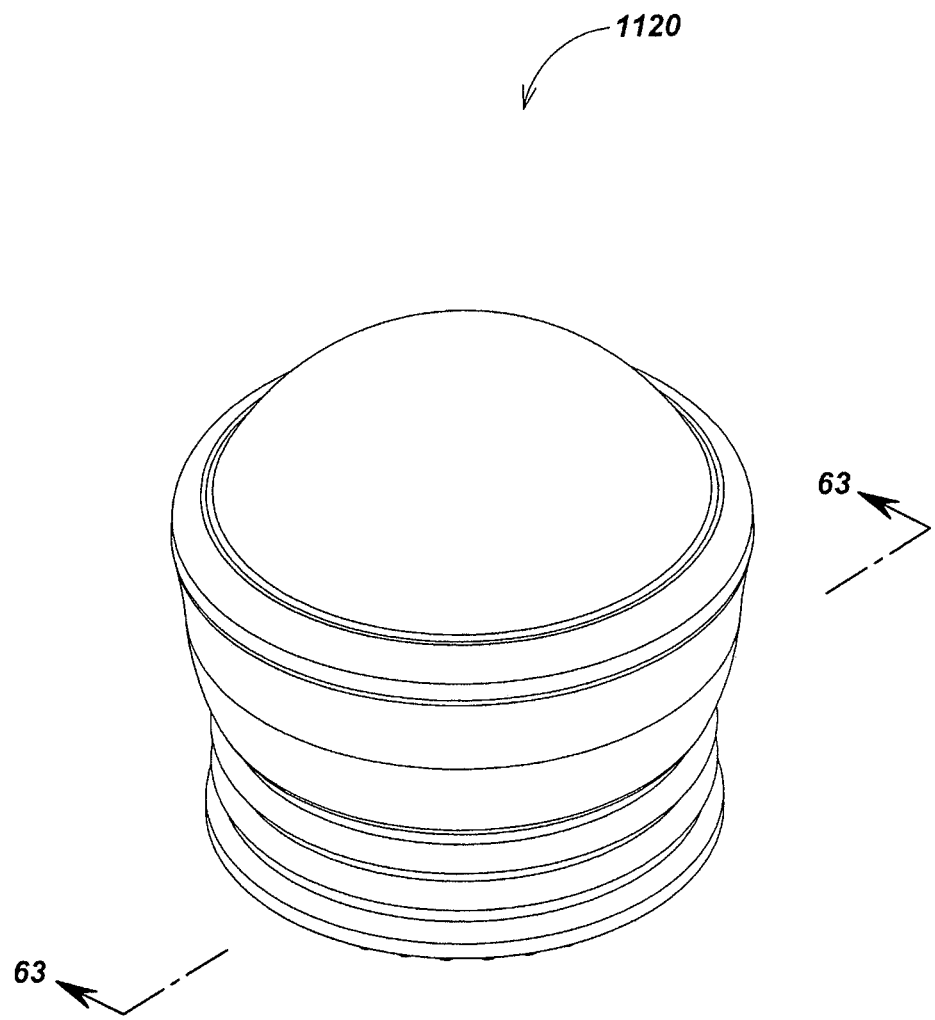
FIG. 50 is an isometric view of an actuator element embodiment.

FIG. 63 illustrates details of a cross-section of the actuator assembly 1120 embodiment along line 63-63 of FIG. 50. As shown, the sensor PCB 1350 and the limiting piece 1360 may be secured to the top of the core join 1326 by small screws 1370 or other attachment mechanisms. The core join 1326 may be configured to extend through a hole formed about the bottom of the bottom actuator half 1322 and be secured to the mounting plate 1380 by means of three of the small screws 1370. The hole formed about the bottom of the bottom actuator half 1322 may be dimensioned to allow the bottom actuator half 1322 to freely travel about the core join 1326 during displacements of movable elements of the actuator assembly 1120.

When the mounting plate 1380, which may be secured to the core join 1326, the sensor PCB 1350, and the limiting piece 1360, are made to remain stationary in relation to a working surface, the top actuator half 1312, with the magnet mounting disk 1318 and attached ones of the upper permanent magnets 1330, and the bottom actuator half 1322, with attached ones of the lower permanent magnets 1332 may be displaced from a released or neutral state by a user.

When in a displaced state, each of the upper permanent magnets 1330 and each of the lower permanent magnets 1332 are displaced from their corresponding one of the magnetic sensors 1340.

Figure 64:
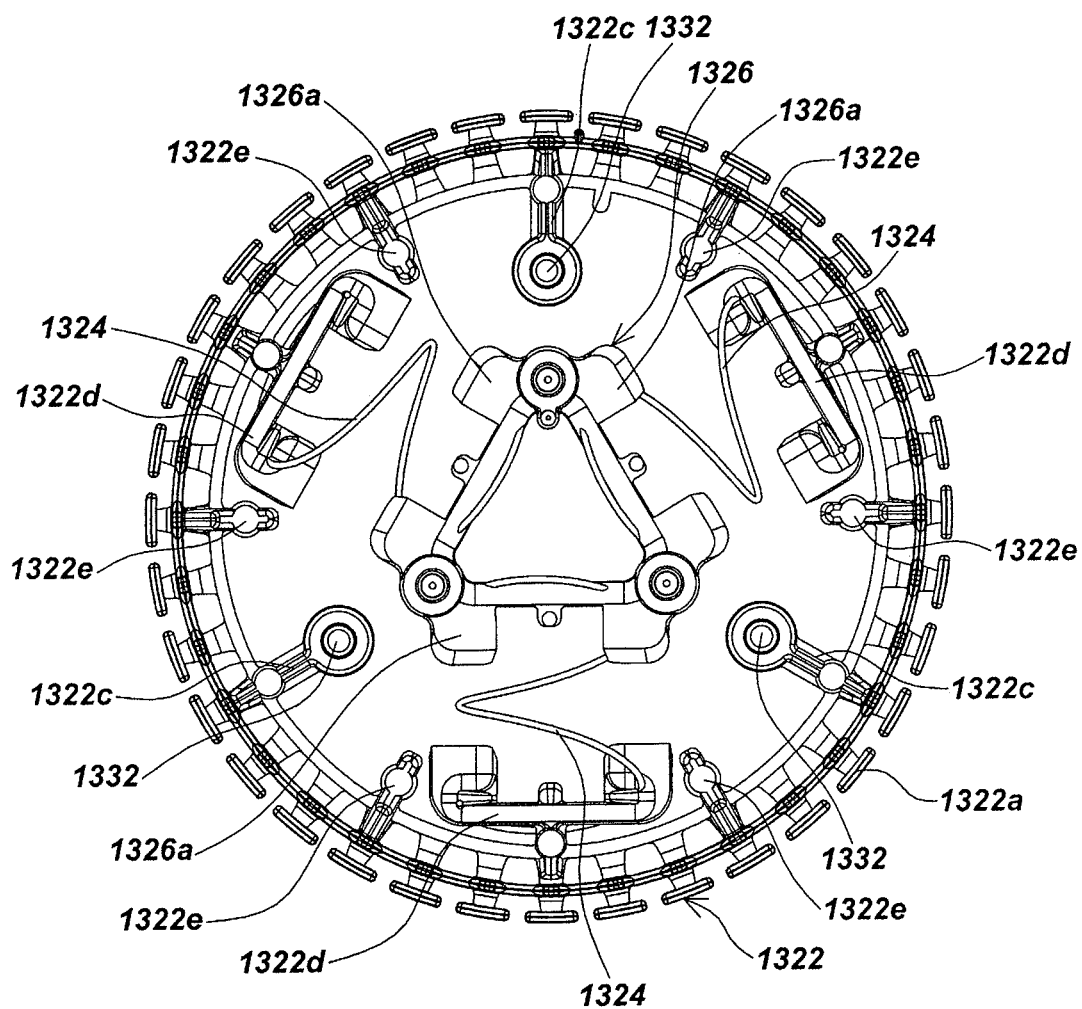
FIG. 64 is an enlarged top view of an embodiment of a lower actuator assembly and a series of permanent magnets in a released state.

FIG. 64 illustrates details of the bottom actuator half 1322, the springs 1324, the core join 1326, and the three of the lower permanent magnets 1332 mounted within the magnet bearing arms 1322*c* of the bottom actuator half 1322 in a possible non-deformed and released state position.

Figure 65:
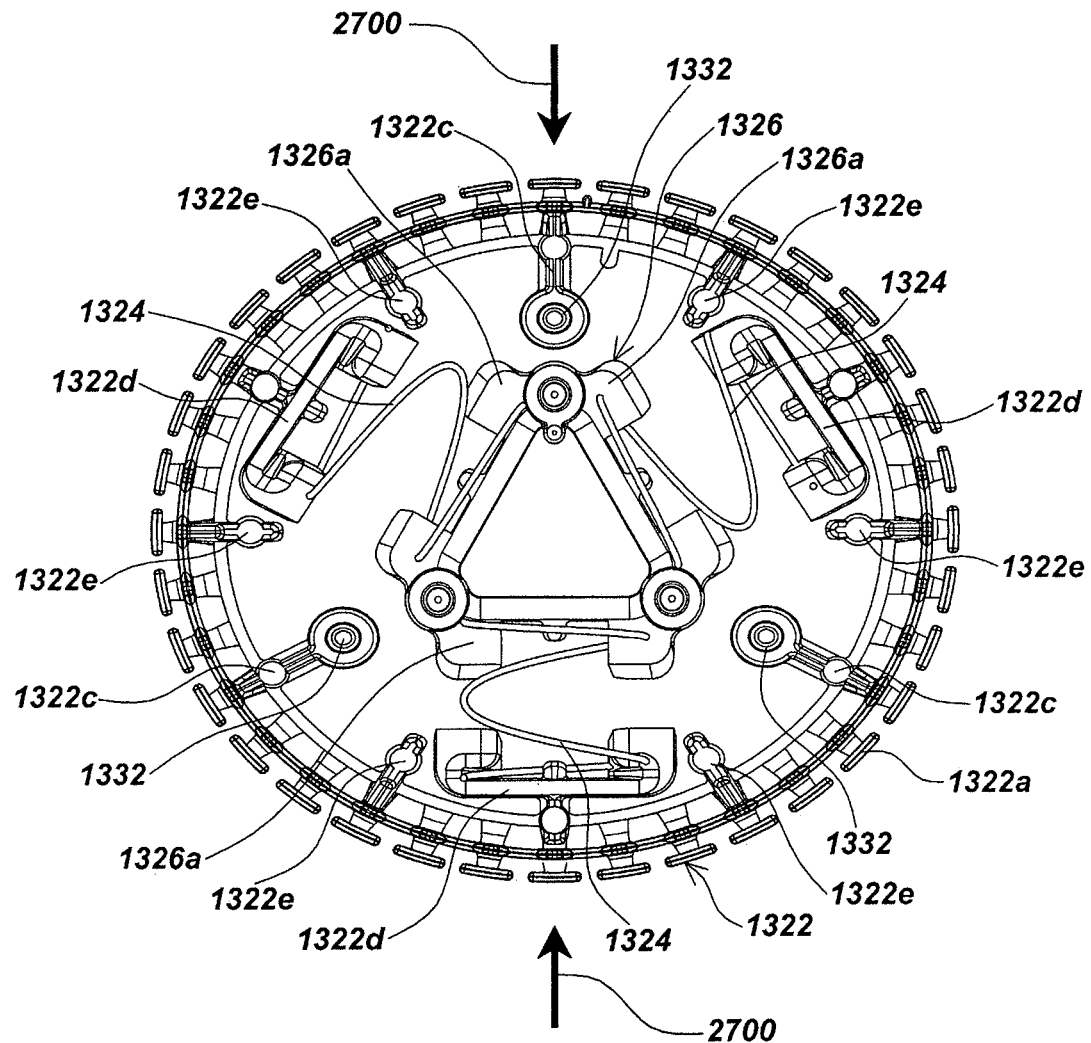
FIG. 65 is an enlarged top view of an embodiment of a lower actuator assembly and a series of permanent magnets when a squeeze-type force is applied.

When a deforming force, such as a squeeze-type force 2700 illustrated in FIG. 65, is applied to a deformable element of the actuator assembly 1120, the bottom actuator half 1322 may bend and flex, allowing the magnet bearing arms 1322*c* and the attached ones of the lower permanent magnets 1332 to move in varied directions and distances from one another. In some embodiments, the direction and distance of the movement of the lower permanent magnets 1332 may be analogous to the strength and direction of the deforming force.

The amount and direction of the deformation may be sensed by corresponding magnetic sensors 1340, and a deformation signal or signals generated accordingly which may be communicated to a processing element. If the magnet mounting disk 1318 of the upper actuator sub-assembly 1310 is preferably formed of largely rigid material and not designed to bend or flex, the upper permanent magnets 1330, which may be secured thereto, may be restricted in movement in varied directions and distances to one another while deforming forces are applied to the actuator assembly 1120 (e.g., upon use squeezing or otherwise deforming deformable elements of the actuator assembly).

In some embodiments and applications, the use of a deforming force such as the squeeze-type force 2700 may, for example, be used to signal the selection or grabbing of a virtual object, and/or may be customizable to other uses, such as other interactions with virtual objects as described previously herein. In other embodiments, the lower permanent magnets 1332 and corresponding magnetic sensors 1340 may be omitted, thereby providing a lower cost version of such a user interface device.

Figure 66:
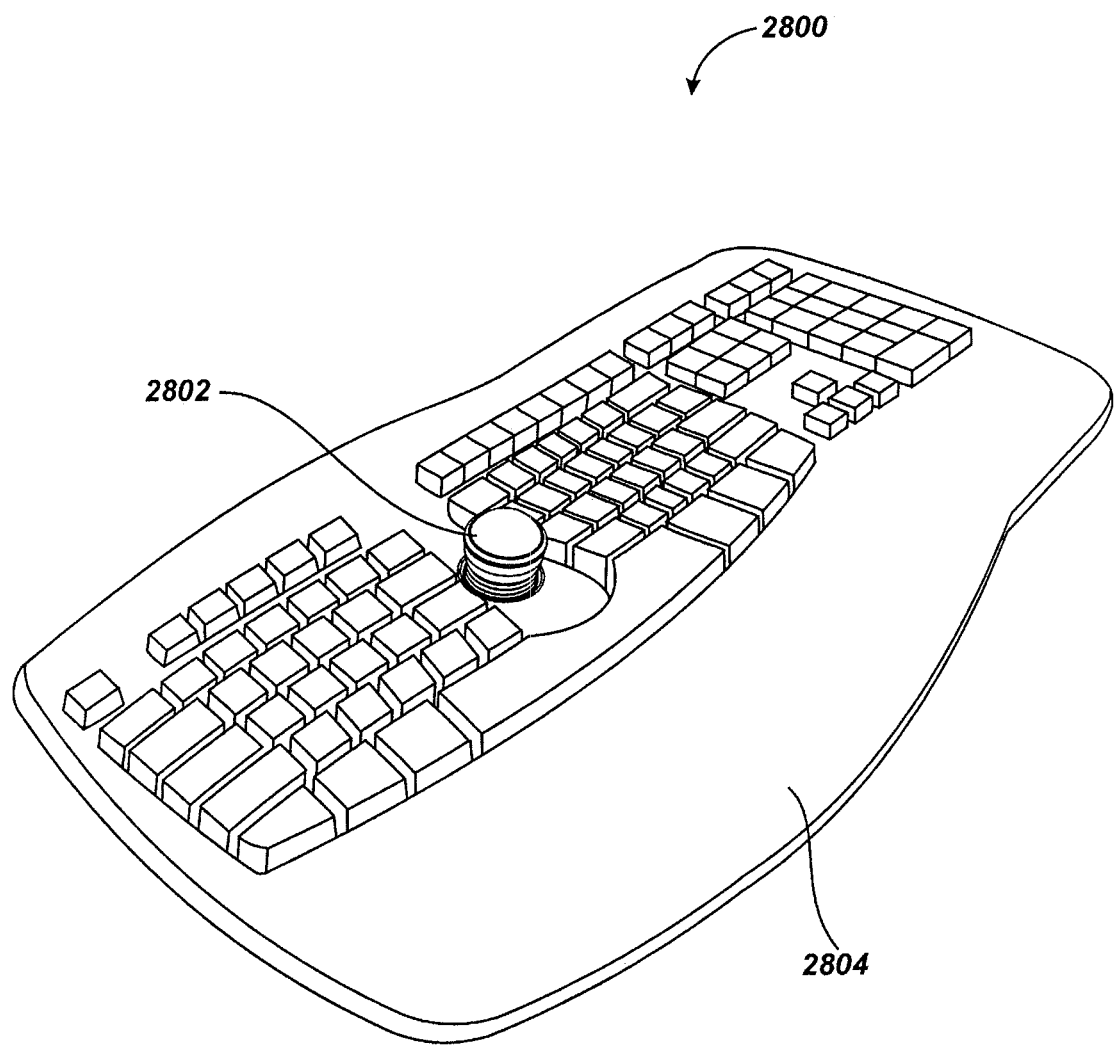
FIG. 66 is an embodiment of an ergonomic-style keyboard with an embodiment of a user interface device installed.

FIG. 66 illustrates one application of a keyboard embodiment 2800, including an incorporated user interface device, wherein an actuator assembly 2802 of the user interface device, which may correspond to actuator assembly 1120 of FIGS. 48 and 49, or other actuator configurations described herein, may be embedded in the keyboard housing 2804.

In some alternative embodiments, other sensor elements, such as a gyroscope (not illustrated) or an accelerometer (not illustrated) may be incorporated into the user interface device to provide additional signals to measure displacements of the deformable actuator. In some embodiments, an accelerometer may aid in determining an awakened state within the user interface device after a time of non-use. An accelerometer or gyroscope may also be incorporated to enable a user interface device such as the user interface device embodiment 1100 of FIG. 48 or user interface device embodiment 2800 of FIG. 66 to sense tapping on the actuator surface to indicate specific commands, which may be configured to function similar to push-button type controls. This may be done by, for example, sensing deformations associated with the tapping action, and/or by sensing actuation of switching elements, button elements, and/or other elements of the user interface device and processing the sensed actions in a processing element.

In another aspect, the present invention relates to methods of generating and processing data associated with a user interface device, such as the user interface device embodiment 1100 of FIGS. 48 and 49, or other user interface device embodiments described previously herein. In an exemplary embodiment, a method of processing signals from the magnetic sensors 1340 includes a stage of generating a field model for each of the magnetic sensor 1340, in which the signals from each magnetic sensor 1340 correspond to a predetermined set of position data.

The position data for each of the magnetic sensors 1340 may be compared to determine a displacement of the actuator assembly 1120 from its released state and/or a deformation of the actuator assembly 1120. For example, in the actuator assembly embodiment 1120, the three magnetic sensors 1340 located on the upward facing side of the sensor PCB 1350 may be used to generate motion signals that may correspond with lateral, up and down movements, rotations, and, translations, tilts, yaws, and/or permutations and combinations thereof of a movable element of the actuator assembly 1120, and provide the motion signals to the processing element for use in generating output signals.

The three of the magnetic sensors 1340 located on the downward facing side of the sensor PCB 1350 may be used to determine signals that may indicate deformations or lack of deformations in deformable elements of the actuator assembly 1120 to the processing element. An output signal or signals may be generated for transmission to an electronic computing system or other computer, control or other processor or logic-device based system (not illustrated) that represents the displacement and/or deformations of the actuator assembly 1120. These output signals may be generated in a predetermined format that can be interpreted by the electronic computing system to correspond with particular actions at the actuator element (e.g., movements, deformations, switches, etc.). The output signals may be generated to directly correspond or related to movements, variations, switch actions, etc., and/or may be mapped to more specific commands, such as commands to move, displace, and/or otherwise operate on virtual objects, grab or release virtual objects, deform virtual objects, and/or provide other command, control, data, and/or display functions.

A method of processing signals from the magnetic sensors 1340, in order to more accurately detect the movement of the actuator assembly 1120, may include the stages of generating a center calibration prism including a predetermined set of boundaries of the magnetic field components detected by each of the magnetic sensors 1340, and repeatedly re-defining the center calibration prism to auto-zero the released state position.

In some embodiments, a user interface device such as user interface device 1100 of FIG. 48, the user interface device 2800 of FIG. 66, or in other user interface devices described previously herein, may be configured to provide push-button type control when a user taps on the actuator. In addition, the user interface device may be enabled to sense a series or pattern of taps or other contacts, for instance one or two taps, that may be used to indicate, for instance, a right click for a single tap or a left click for two taps in quick succession. Detection of particular tapping actuations may be determined at a processing element by, for example, measuring switch, motion, deformation, and/or other actions, and translating the measured actions accordingly. In other embodiments, tapping upon certain areas, for instance the front, back, left, or top of the actuator may be sensed so to indicate different push-button type controls to an electronic computing system.

The deformation element may be used for providing additional signaling and/or control functionality. For example, a user interface device may include a deformable actuator element, a deformation element coupled to the deformable actuator element to provide an indication of deformation of the deformable actuator element from a non-deformed position, a displacement element coupled to the deformable actuator element to provide an indication of displacement or movement of the deformable actuator element from a released state position, and a sensing element positioned in proximity to the deformation element and displacement element. The sensing element may be configured for generating a first signal representative of a displacement of the deformable actuator element from the released state position in one or more dimensions, and a second signal representative of a deformation caused by a squeezing force applied to the deformable actuator.

In an exemplary embodiment, both the deformation and displacement signals may be provided to another component, device, or system, such as an electronic computing system. The first and second signals may be combined, multiplexed, provided in parallel, provided sequentially, and/or otherwise aggregated or combined to provide an output signal including output data to the other component, device, or system based on both applied force, resulting in deformation, as well as displacement, resulting in rotation, translation, and/or other positional movement.

While example embodiments of a deformable-actuator user interface device have been described in a specific set of details previously herein, modifications and adaptations thereof will be apparent to persons of ordinary skill in the art. For example, a different number, arrangement, or shape of permanent magnets, sensors, springs, switches, actuator elements, base elements, and/or other elements as described previously may be used with a different number, arrangement, or type of other elements to provide the user interface functionality described previously.

Varying the dimensions, quantity, materials used, or gauge of wire used in springs may vary the tactile response of the deformable-actuator user interface device to the user. Varying the type, size, position, and/or other characteristics of permanent magnets, which may be done in conjunction with specific magnetic sensors, may be used to adjust and/or optimize performance. Furthermore, varying the size of the actuator element or otherwise varying other elements that may alter the pivot point(s) within the deformable-actuator user interface device may also be employed to provide a different tactile response to the user. The addition of elastomeric bumpers, rubber over-molding for certain components, or other dampening material may also be used to alter the tactile response to the user.

While we have described and illustrated a number of different embodiments of manual user interface devices in accordance with various aspects of the invention, modifications and adaptations thereof will occur to persons skilled in the art. For example, while the permanent magnets have been described as being supported by the manual actuator and moved relative to corresponding stationary magnetic sensors, the converse arrangement may also be utilized. That is to say, the magnetic sensors could be mounted on the manual actuator and moved relative to corresponding stationary permanent magnets.

In addition, other elements, such as accelerometers, compasses, gyroscopes, and the like may be used in some embodiments to improve signal conditioning, processing, and/or interpretation. Removable or interchangeable covers, knobs, handles, and grip attachments may be used with any of the embodiments of the manual user interface device. Other forms of spring elements may also be used, such as elastic spring elements or other elastic or flexible components.

Various additional movement actions and corresponding sensor processing is possible in accordance with the present invention. For example, in some embodiments, a user interface device may be further configured to allow an actuator element or movable element of an actuator assembly to be pulled upward by a user from a base element (or other reference position) and/or pushed downward. For example when a user is gripping a virtual object such as with a deformation element as described previously herein, with the virtual object responding accordingly (e.g., rising from a ground or rest position). In this way, a user may both grip virtual objects and raise them (e.g., by an upward pull action to the actuator element or movable element) or lower them (e.g., by a downward push action to the actuator element or movable element).

Various example embodiments have been described previously herein to provide movable actuator apparatus and functionality. Additional example embodiments describe deformable actuator apparatus and functionality. In some embodiments, features illustrated with respect to these various bodies may be combined in further embodiments. For example, configurations and functions described in conjunction with embodiments including various spring mechanisms may be combined with configurations and functions described in conjunction with deformable actuator assemblies. Other combinations of the various aspects, elements, components, features, and/or functions described herein may be combined in various configurations.

In addition, details regarding additional aspects, elements, components, features, functions, apparatus, and/or methods which may be used in conjunction with the embodiments described previously herein in various implementations are described in related applications of the assignee of the instant application. These related applications include the priority applications listed previously herein, which are incorporated by reference herein in their entirety, as well as U.S. Utility patent application Ser. No. 12/756,068, entitled MAGNETIC MANUAL USER DEVICES.

In some configurations, the apparatus may include means for performing various functions as described herein. For example, in one aspect, the aforementioned means may be a processor or processors and associated memory in which embodiments reside, such as in processing elements, on circuit boards or substrates, or in other electronic configurations perform the functions recited by the aforementioned means. In another aspect, the aforementioned means may be a module or any apparatus configured to perform the functions recited by the aforementioned means.

In one or more exemplary embodiments, the processing functions, methods and processes described herein and/or in the related applications may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, processors may be processors, such as communication processors, specifically designed for implementing functionality in communication devices or other mobile or portable devices.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The present invention is not intended to be limited to the aspects shown and described previously herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the invention.

The invention claimed is:

1. A magnetically sensed user interface device, comprising:
   a spring mechanism;
   an actuator element mechanically coupled to the spring mechanism;
   a base element mechanically coupled to the spring mechanism;
   a processing element; and
   a motion sensing apparatus comprising three or more permanent magnets and three or more three-axis magnetic sensor elements for sensing magnetic fields generated by each of the magnets in multiple-axes at a compact point in space, wherein the motion sensing apparatus is coupled between the actuator element and the base element to magnetically sense a motion of the actuator element and provide, to the processing element, one or more motion signals corresponding to the sensed.

2. The user interface device of claim 1, wherein each of the magnetic sensor elements comprise single die integrated circuits.

3. A magnetically sensed user interface device, comprising:
a spring mechanism;
an actuator element mechanically coupled to the spring mechanism;
a base element mechanically coupled to the spring mechanism;
a processing element; and
a motion sensing apparatus comprising three or more permanent magnets and three or more corresponding three-axis integrated circuit hall-effect magnetic sensor elements for sensing magnetic fields generated by each of the magnets in multiple-axes at a compact point in space, wherein the motion sensing apparatus is coupled between the actuator element and the base element to magnetically sense a motion of the actuator element and provide, to the processing element, motion signals corresponding to the sensed motion based on outputs of each of the magnetic sensor elements and wherein the processing element is programmed to generate an output signal for provision to a communicatively coupled electronic computing system corresponding to the sensed motion of the actuator element.

4. The user interface device of claim 3, wherein the motion sensing apparatus senses the motion in three degrees of freedom of motion.

5. The user interface device of claim 3, wherein the motion sensing apparatus senses the motion in four or more degrees of freedom of motion.

6. The user interface device of claim 3, including electronics to provide the output signal corresponding to the sensed motion via a USB interface to the electronic computing system.

7. The user interface device of claim 3, wherein each of the magnets are configured to move with the actuator element relative to a corresponding magnetic sensor element.

8. The user interface device of claim 3, wherein each of the magnetic sensor elements are configured to move with the actuator element relative to a corresponding magnet.

9. The user interface device of claim 3, wherein the actuator element is pivotably mounted to the base element.

10. The user interface device of claim 3, wherein the spring mechanism comprises a helical coil center spring.

11. The user interface device of claim 10, further comprising a motion resistance apparatus positioned to provide resistance to a motion of the helical coil center spring.

12. The device of claim 3, wherein the spring mechanism comprises a plurality of spaced coil springs.

13. The user interface device of claim 12, wherein the spaced coil springs are circumferentially spaced.

14. The user interface device of claim 12, wherein two or more of the plurality of spaced coil springs are of a different aspect ratio, coil pitch, or wire cross-section.

15. The user interface device of claim 3, wherein the processing element is further programmed to generate, based at least in part on the motion signals, an output signal corresponding to a downward push or upward pull of the actuator element relative to the base element.

16. The user interface device of claim 3, wherein each of the magnetic sensor elements comprise single die integrated circuits.

17. The user interface device of claim 3, wherein the processing element is further programmed to generate, based at least in part on the motion signals, an output signal corresponding to four or more of a lateral shift, a rotation, a translation, a tilt, a roll, and a yaw of the actuator element relative to the base element.

18. The user interface device of claim 3, wherein the actuator element further includes one or more dome switches configured to receive a push input, wherein the processing element is further programmed to generate, responsive to the push input, a pushbutton control signal for provision as an output to an electronic computing system.

19. The user interface device of claim 18, wherein the one or more dome switches are further configured to provide a tactile feedback response to a user in response to a received push input.

20. The user interface device of claim 3, wherein the actuator further comprises a deformable element including the magnets and magnetic sensor elements and wherein the processing element is further programmed to generate and provide, based at least in part on motion signals from the magnetic sensor elements corresponding to a deformation of the deformable element, an output signal representing deformation of the actuator assembly upon deformation by a user.

* * * * *